United States Patent
Camacho Villanueva et al.

(10) Patent No.: US 10,425,324 B2
(45) Date of Patent: Sep. 24, 2019

(54) METHOD OF COMPUTING BALANCED ROUTING PATHS IN FAT-TREES

(71) Applicant: Fabriscale Technologies AS, Fornebu (NO)

(72) Inventors: Jesus Camacho Villanueva, Valencia (ES); Tor Skeie, Oslo (NO); Sven-Arne Reinemo, Oslo (NO)

(73) Assignee: Fabriscale Technologies AS, Fornebu (NO)

( * ) Notice: Subject to any disclaimer, the term of this patent is extended or adjusted under 35 U.S.C. 154(b) by 0 days.

(21) Appl. No.: 15/679,974

(22) Filed: Aug. 17, 2017

(65) Prior Publication Data
US 2019/0058652 A1    Feb. 21, 2019

(51) Int. Cl.
*H04L 12/721* (2013.01)
*H04L 12/755* (2013.01)
*H04L 12/44* (2006.01)

(52) U.S. Cl.
CPC ............ *H04L 45/14* (2013.01); *H04L 45/021* (2013.01); *H04L 12/44* (2013.01)

(58) Field of Classification Search
CPC ..... H04L 41/0813; H04L 49/15; H04L 49/10; H04L 41/083; H04L 49/358; H04L 41/0836; H04L 12/44; H04L 45/14; H04L 45/021; G06F 9/5077
See application file for complete search history.

(56) References Cited

U.S. PATENT DOCUMENTS

| | | | |
|---|---|---|---|
| 5,561,768 A | * | 10/1996 | Smith .............. G06F 15/17343 712/13 |
| 7,496,797 B2 | | 2/2009 | Rooholamini et al. |
| 7,724,674 B2 | | 5/2010 | Lysne |
| 7,860,096 B2 | | 12/2010 | Johnsen et al. |
| 8,139,507 B2 | | 3/2012 | Powers et al. |
| 8,743,890 B2 | | 6/2014 | Johnsen et al. |
| 9,007,895 B2 | | 4/2015 | Schlansker et al. |

(Continued)

OTHER PUBLICATIONS

Feroz Zahid, et al.; "SlimUpdate: Minimal Routing Update for Performance-based Reconfigurations in Fat-Trees"; Conference Paper; Sep. 2015. (9 pgs.).

(Continued)

*Primary Examiner* — Dady Chery
(74) *Attorney, Agent, or Firm* — Oblon, McClelland, Maier & Neustadt, L.L.P.

(57) ABSTRACT

A device and method for providing balanced routing paths in a computational grid including determining a type of topology of the computational grid having a plurality of levels, wherein each level includes a plurality of switches, determining whether the type of topology of the computational grid is a fat-tree, determining whether the fat-tree is odd, determining whether the fat-tree is a regular fat-tree, computing a first set of routing paths for the computational grid based on the determining of whether the fat-tree is odd and is a regular fat-tree, computing a second set of routing paths for the computational grid using a topology agnostic routing technique, and configuring forwarding tables in said switches with the first set of computed routing paths when the topology is determined to be a fat-tree and with the second set of computed routing paths when the topology is determined to not be a fat-tree.

18 Claims, 38 Drawing Sheets

(56) References Cited

U.S. PATENT DOCUMENTS

| | | | |
|---|---|---|---|
| 9,014,201 | B2 | 4/2015 | Bogdanski |
| 2013/0121149 | A1 | 5/2013 | Guay et al. |
| 2013/0301645 | A1 | 11/2013 | Bogdanski et al. |
| 2013/0301646 | A1 | 11/2013 | Bogdanski et al. |
| 2014/0064287 | A1 | 3/2014 | Bogdanski et al. |
| 2014/0269342 | A1 | 9/2014 | Baron |
| 2015/0030034 | A1 | 1/2015 | Bogdanski et al. |
| 2016/0014049 | A1* | 1/2016 | Zahid .............. H04L 45/48 709/226 |
| 2017/0187614 | A1* | 6/2017 | Haramaty .......... H04L 45/48 |
| 2018/0062925 | A1* | 3/2018 | Tasoulas ........... G06F 9/5077 |

OTHER PUBLICATIONS

"Multi-homed fat-tree routing with InfiniBand"; (8 pgs.).
Bartosz Bogdanski, et al.; "Discovery and Routing of Degraded Fat-Trees"; (6 pgs.).
Feroz Zahid, et al.; "Efficient Network Isolation and Load Balancing in Multi-Tenant HPC Clusters"; Preprint Submitted to Journal of Future Generation Computer Systems; (30 pgs.).
Jesus Escudero-Sahuquillo, et al.; "A New Proposal to Deal with Congestion in InfiniBand-Based Fat-Trees"; Article in Journal of Parallel and Distributed Computing; Jan. 2014; (19 pgs.).
Fabriscale; "HPC Advisory Council"; Lugano, Mar. 2015; (32 pgs.).
Feroz Zahid, et al.; "A Weighted Fat-Tree Routing Algorithm for Efficient Load-Balancing in InfiniBand Clusters"; Conference Paper PDP 2015, Turku, Finland; Mar. 5, 2015; (27 pgs.).
Bogdan Prisacari, et al.; "Fast Pattern-Specific Routing for Fat Tree Networks"; ACM Transactions on Architecture and Code Optimization; vol. 14, No. 4; Article 36; Dec. 2013 (27 pgs.).
"Deploying HPC Cluster with Mellanox InfiniBand Interconnect Solutions"; Reference Design; Mellanox Technologies; Jan. 2017 (40 pgs.).
Eitan Zahavi; "Fat-Trees Routing and Node Ordering Providing Contention Free Traffic for MPI Global Collectives"; CASS 2011; Mellanox Technologies LTD; EE Department—The Technion; (27 pgs.).
"InfiniBand FAQ"; Mellanox Technologies; Last Updated: Dec. 22, 2014; (16 pgs.).
Eitan Zahavi, et al.; "Optimized InfiniBand Fat-Tree Routing for Shift All-to-All Communication Patterns"; Concurrency and Computation: Practice and Experience; Published Online in Wiley InterScience; www.interscience.wiley.com; (15 pgs.).
Wei Lin Guay, et al.; "A Fat-Tree Routing Algorithm Using Dynamic Allocation of Virtual Lanes to Alleviate Congestion in InfiniBand Networks"; (11 pgs.).
Bartosz Bogdanski, et al.; "A Fully Connected and Deadlock-Free Switch-to-Switch Routing Algorithm for Fat-Trees"; ACM Transactions on Architecture and Code Optimization; vol. 8, No. 4; Article 55; Jan. 2012. (20 pgs.).
Guay et al.; "USPTO Response to Office Action Under 37 CFR 1.111"; U.S. Appl. No. 13/671,467, filed Jul. 6, 2015; (9 pgs.).
Wei Lin Guay, et al.; "A Fat-tree Routing Algorithm Using Virtual Lanes to Alleviate Congestion"; 2011 IEEE International Parallel & Distributed Processing Symposium;(12 pgs.).
Feroz Zahid, et al.; "A Weighted fat-tree Routing Algorithm for Efficient Load-Balancing in InfiniBand Clusters"; PDP 2015, Turku, Finland; Mar. 5, 2015. (26 pgs.).
Feroz Zahid, et al.; "Slim-Update: Minimal Routing Update for Performance-based Reconfigurations in Fat-Trees"; Conference Paper; Sep. 2013. (9 pgs.).
Cyriel Minkenberg; "Interconnection Network Architectures for High-Performance Computing"; Advanced Computer Networks—Guest Lecture; May 21, 2013; IBM Research—Zurich; (101 pgs.).
Bartosz Bogdanski; "Optimized Routing for Fat-Tree Topologies"; Thesis Submitted for the Degree of Philosophiae Doctor Department of Informatics; Faculty of Mathematics and Natural Sciences, University of Oslo; Jan. 2014; (155 pgs.).
Bartoz Bogdanski; "Optimized Routing for Fat-Tree Topologies"; Thesis Submitted for the Degree of Philosophiae Doctor Department of Informatics; Faculty of Mathematics and Natural Science, University of Oslo; Jan. 2014; (156 pgs.).
"InfiniBand Architecture Overview"; Mellanox Technologies; (276 pgs.).

* cited by examiner

METHOD OF COMPUTING BALANCED ROUTING PATHS IN FAT-TREES

FIELD OF THE INVENTION

The present disclosure relates to a system and method of computing balanced routing paths in fat-tree network topologies.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The fat-tree network topology has several advantages over traditional routing topology. However, in the situation of an odd-fat tree (a special type of fat tree defined below) balancing of connections within the switching architecture can be a problematic.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to one embodiment, there is described a method of providing balanced routing paths in a computational grid. The method includes the steps of determining a type of topology of the computational grid, the computational grid having a plurality of levels, wherein each level includes a plurality of switches, determining whether the type of topology of the computational grid is a fat-tree, upon determining that the topology is a fat-tree: determining whether the fat-tree is odd, upon determining that the fat-tree is not odd, determining whether the fat-tree is a regular fat-tree, computing a first set of routing paths for the computational grid based on the determining of whether the fat-tree is odd and whether the fat-tree is a regular fat-tree, upon determining that the topology is not a fat-tree: computing a second set of routing paths for the computational grid using a topology agnostic routing technique, and configuring forwarding tables in said switches with the first set of computed routing paths when the topology is determined to be a fat-tree and with the second set of computed routing paths when the topology is determined to not be a fat-tree.

According to one embodiment, there is described a device for providing balanced routing paths in a computational grid. The device includes processing circuitry configured to determine a type of topology of the computational grid, the computational grid having a plurality of levels, wherein each level includes a plurality of switches, determine whether the type of topology of the computational grid is a fat-tree, determine whether the fat-tree is odd, upon determining that the topology is a fat-tree, determine whether the fat-tree is a regular fat-tree, upon determining that the fat-tree is not odd, compute a first set of routing paths for the computational grid based on the determination of whether the fat-tree is odd and whether the fat-tree is a regular fat-tree, compute a second set of routing paths for the computational grid using a topology agnostic routing technique, upon determining that the topology is not a fat-tree, and configure forwarding tables in said switches with the first set of computed routing paths when the topology is determined to be a fat-tree and with the second set of computed routing paths when the topology is determined to not be a fat-tree.

According to one embodiment, there is described a non-transitory computer readable medium having stored thereon a program that when executed by a computer causes the computer to implement a method of providing balanced routing paths in a computational grid. The method includes the steps of determining a type of topology of the computational grid, the computational grid having a plurality of levels, wherein each level includes a plurality of switches, determining whether the type of topology of the computational grid is a fat-tree, upon determining that the topology is a fat-tree: determining whether the fat-tree is odd, upon determining that the fat-tree is not odd, determining whether the fat-tree is a regular fat-tree, computing a first set of routing paths for the computational grid based on the determining of whether the fat-tree is odd and whether the fat-tree is a regular fat-tree, upon determining that the topology is not a fat-tree: computing a second set of routing paths for the computational grid using a topology agnostic routing technique, configuring forwarding tables in said switches with the first set of computed routing paths when the topology is determined to be a fat-tree and with the second set of computed routing paths when the topology is determined to not be a fat-tree.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1A:
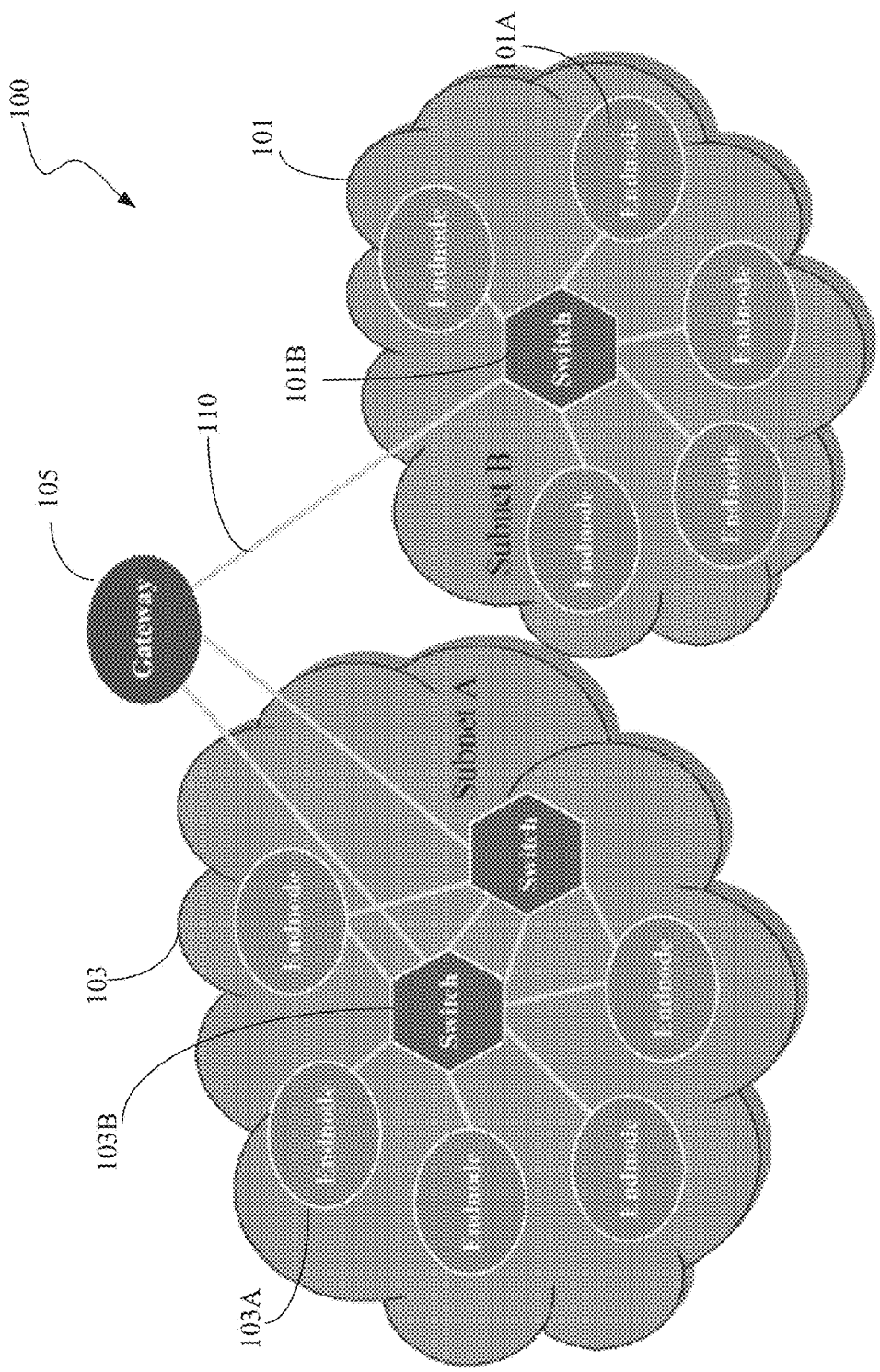
FIG. 1A illustrates according to an embodiment, an exemplary switched-fabric-network architecture.

According to one embodiment of the present disclosure, FIG. 1A depicts an exemplary switched-fabric-network architecture 100. The switched fabric architecture of FIG. 1A includes point-to-point switch based interconnects that are designed for fault tolerance and scalability. A point-to-point fabric indicates that every link has exactly one device connected at each end of the link. Accordingly, the I/O performance of such a switched architecture is enhanced by controlling the loading and termination characteristics.

By one embodiment, the basic building blocks of switched-fabric architecture are: Host channel adapters (HCAs), switches, subnet managers, and gateway. FIG. 1A depicts switched-fabric architecture 100 including two sub-networks 101 and 103, labeled subnet A and subnet B, respectively. Each sub-network includes a plurality of interconnects (i.e., switches 101B and 103B) connected by point-to-point links 110 to end-nodes (101A and 103A) and a Gateway 105. Each end node includes an FICA that is configured to set up and maintain the link with a host device. A host device is for example a compute host, monitoring host, administration host, distributed file system host (e.g. Lustre host), server host, or storage host. Switches may include more than one port and forward packets from one port to another in order to continue the transmission of the packet within a subnet. A router can be used to forward packets from one subnet to another subnet, if required. Subnet management is handled through Software Defined Networking (SDN), which controls the network's physical elements and provides traffic engineering features, often via open, industry-standard interfaces.

By one embodiment, the HCA is an interface card or controller that bridges between a wire and the system bus of a host device. Each end node includes at least one HCA, which sets up and maintains the link between the host device and the rest of the entities on the network. Examples of such entities are: another HCA, a target device, or a switch. HCAs provide port connections to other devices. The switches 101B and 103B as depicted in FIG. 1A are used to physically connect devices within a network and forward incoming data traffic toward its destination. Switches have multiple ports that process and forward data across cables to the specific device(s) for which it is intended, thereby regulating the flow of traffic within the network. The network architecture as shown in FIG. 1A is referred to as a switched-fabric-architecture because when traffic is forwarded there is a logical connection from one port to another, similar to the old-style telephone switchboards.

By one embodiment, a Subnet Manager (SM) is a software entity that configures a local subnet and ensures its continued operation. It sets up primary and secondary paths between every end point so that traffic flow forwarding decisions are preprogrammed and data arrives at the destination node in the least amount of time. It must be appreciated that there must be at least one SM present in a subnet in order to manage all switch and router setups, and to reconfigure the subnet when a link goes down or a new link comes up. The SM can reside on any of the devices within the subnet. Furthermore, it must be appreciated that there may be multiple SMs in a subnet, as long as only one is active at any moment. Non-active SMs, known as Standby Subnet Managers, keep copies of the active SM's forwarding information and verify that the active SM is operational. If an active SM goes down, a standby SM takes over responsibilities to ensure that the entire fabric continues with its operation.

Figure 1B:
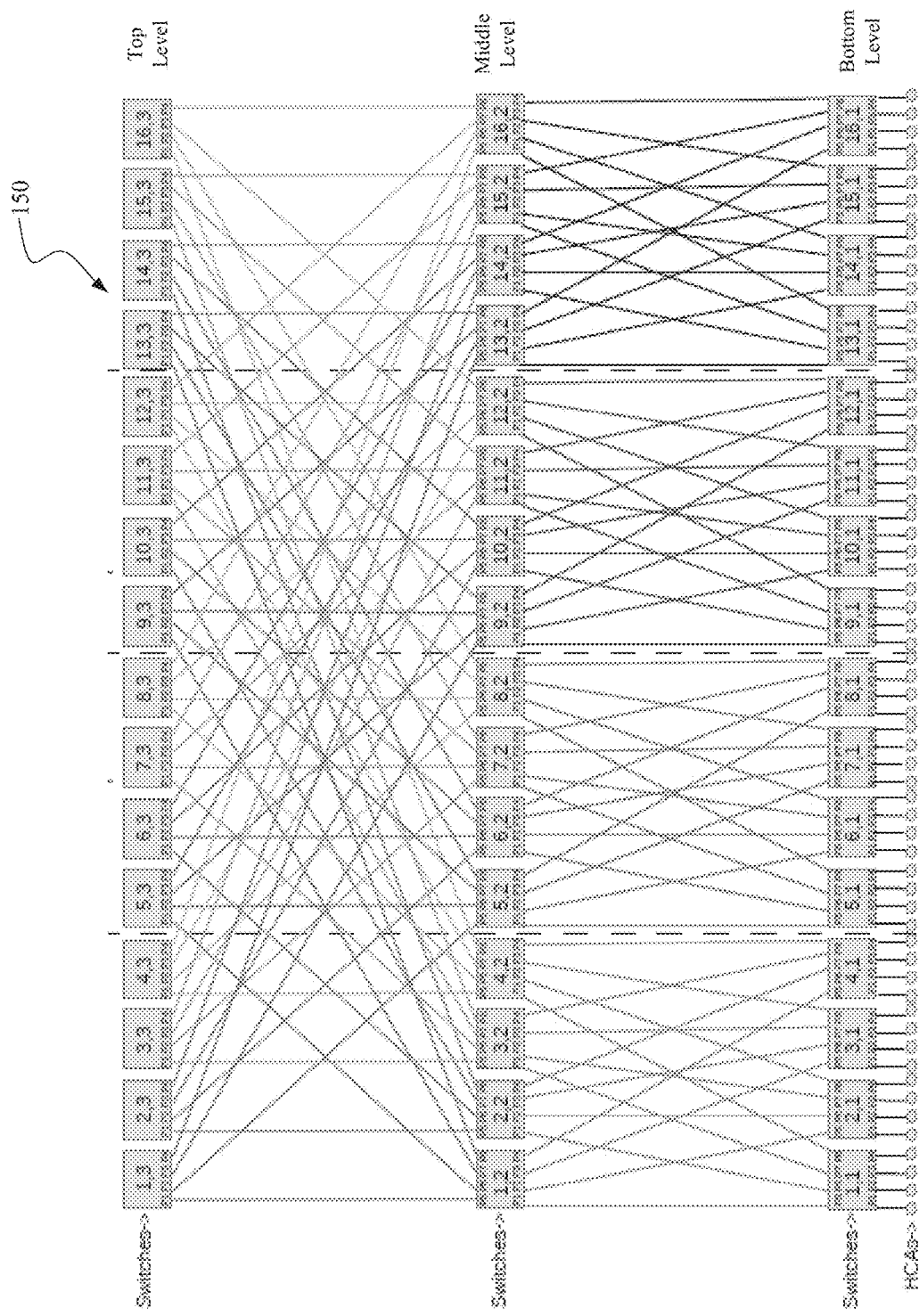
FIG. 1B depicts an exemplary full-size regular fat tree topology according to one embodiment.

By one embodiment, the switched-fabric-architecture can be a regular fat tree. FIG. 1B depicts a full-size regular fat tree topology 150 including a plurality of levels (depicted as bottom level, middle level, and top level, respectively). As shown in FIG. 1B, in a full-size fat tree topology, each level includes the same number of switches, wherein each switch has the same number of downward ports. Note that the switches in the top level include only ports in the downward direction. Further, the number of ports per switch in the top level is exactly half of the number of ports included in switches belonging to any other level of the full-size fat tree topology. Moreover, each switch at the bottom level includes a plurality of HCAs.

Figure 1C:
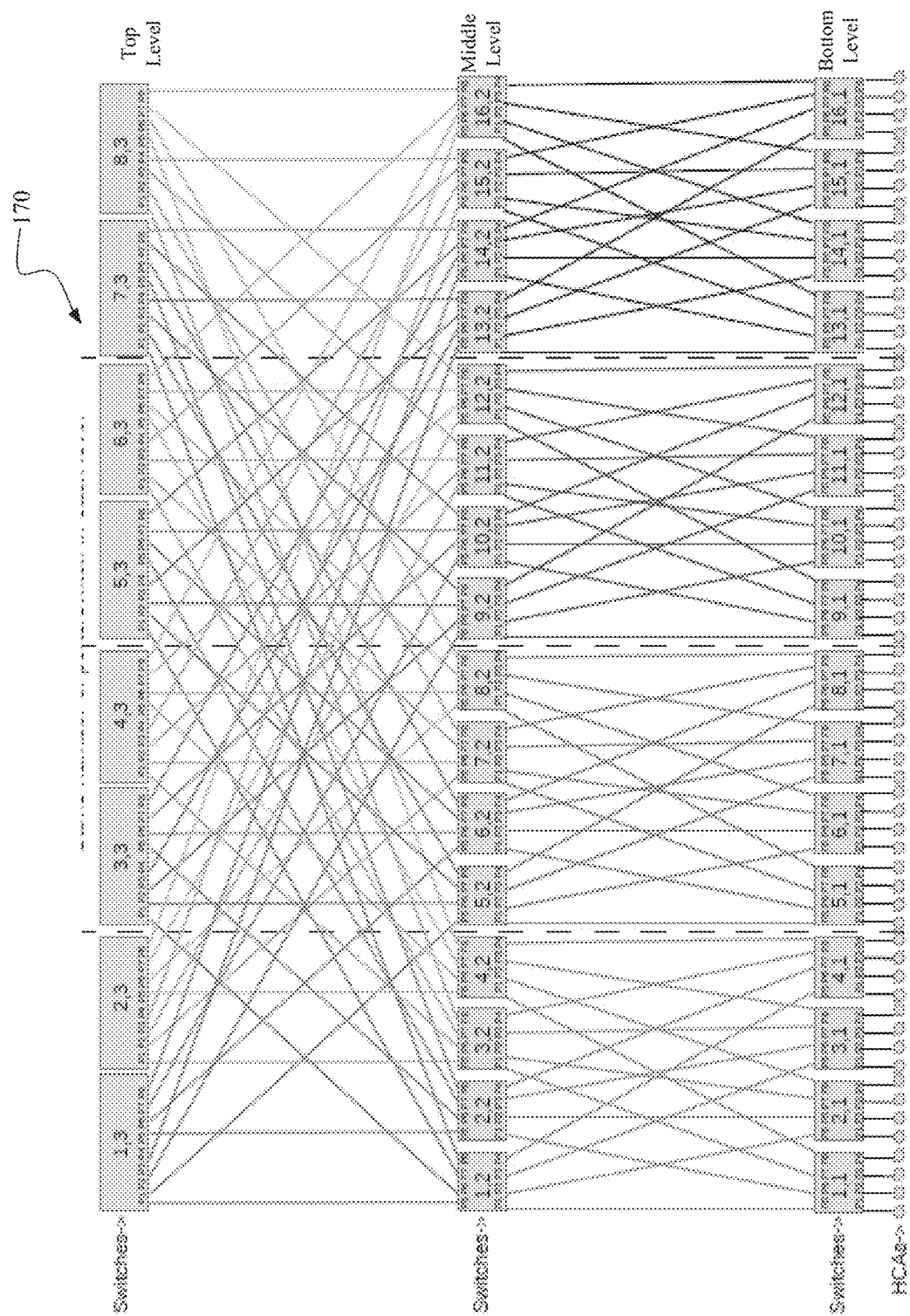
FIG. 1C depicts according to an embodiment, a half-size fat-tree topology.

FIG. 1C depicts according to an embodiment, a half-size fat-tree topology 170. In such a topology, the number of switches in the top level is exactly half the number of switches in any other level of the tree topology. Moreover, in such an architecture, the number of ports per switch (at any level) is the same. In other words, the switches in the top level include a number of downward ports that is twice in magnitude of the number of downward ports in switches at other levels.

In what follows is described a routing algorithm that provides redundant routing paths in a computational grid interconnected via switches. The routing algorithm of the present disclosure provides the following advantageous abilities: (a) it reduces the amount of downtime (experienced, for example, by data centers) that is caused by network faults, (b) improves utilization of high-performance data communication networks such as InfiniBand networks substantially. Moreover, the routing mechanism described herein is network agnostic (i.e., independent of the network layout), and provides for a dynamic and fast fault-tolerance technique to reduce application downtime. By one embodiment, there is provided a software defined networking (SDN) interface that provisions for applications to configure the network based on specific requirements without relying on human intervention. Moreover, by an embodiment, there is provided a web-based GUI that allows for monitoring of fabric faults in a convenient fashion.

Figure 2:
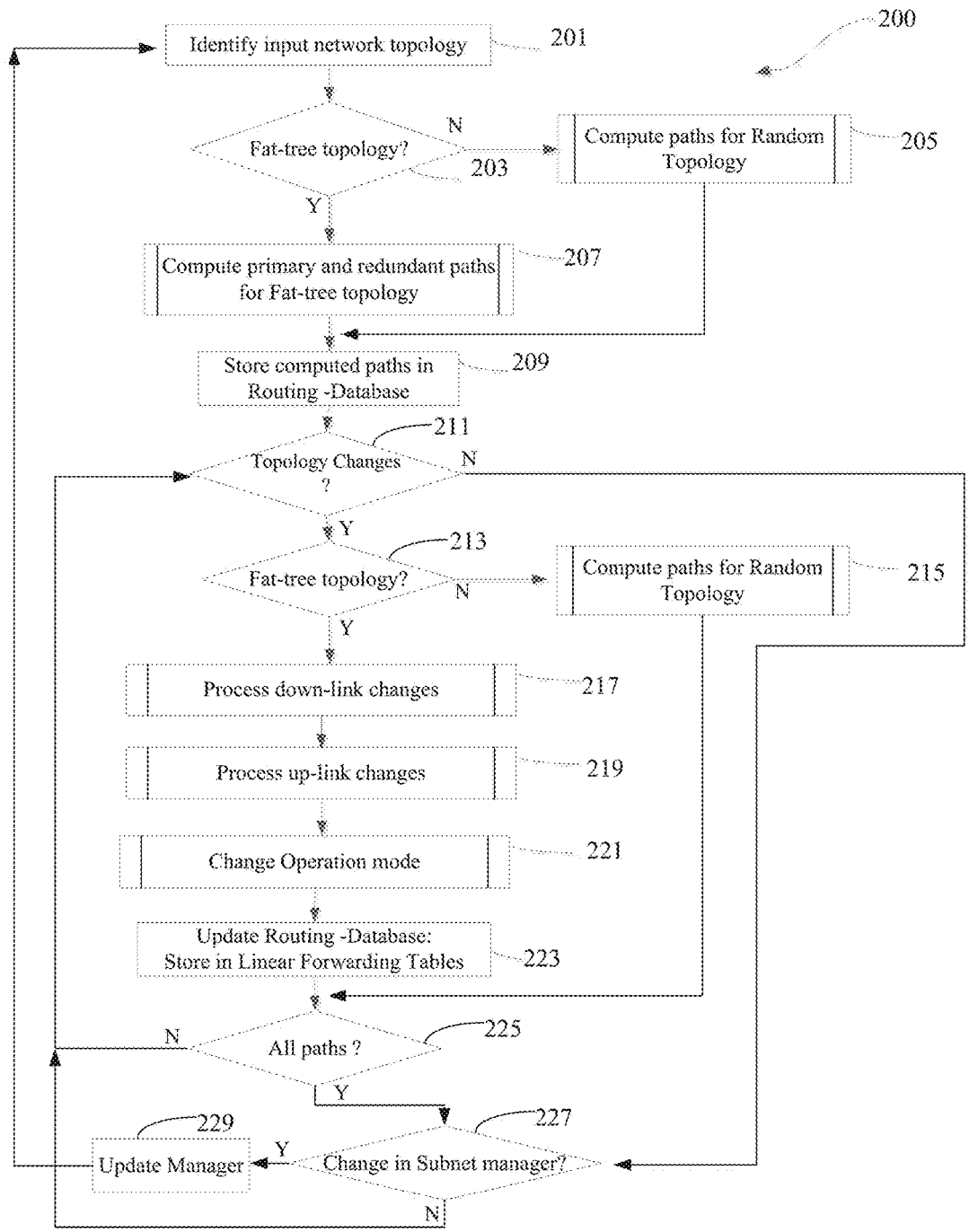
FIG. 2 depicts according to one embodiment, a flowchart illustrating the steps performed by a method in computing routing paths (primary paths and redundant paths) in a network topology, and recovering from a topology change.

FIG. 2 depicts, according to one embodiment, a flowchart 200 illustrating the steps performed by a method in computing routing paths (i.e., a primary routing path and redundant routing paths for a given source-destination pair) in a network topology.

The method begins in step 201, wherein a topology of an input network is determined. By one embodiment, the network topology can be identified based on in-band messages transmitted by the nodes of the network. For example, InfiniBand protocol (implemented in switched-fabric networks) provides a standard management specification that enables exploring the fabric using in-band messages such that the switches, compute nodes, and the links between them can be obtained. The extraction algorithm traverses the discovered connectivity graph created by performing these standard management queries. The result of the extraction algorithm is an index assignment and edge-labeling for each switch and compute node. In this manner, the topology of the input network can be obtained. Furthermore, verification may be obtained as to whether the input topology is a fat-tree topology.

The method further proceeds to step 203, wherein a query is made to determine whether the network topology determined in step 201 is a fat-tree topology. If the response to the query is negative, (i.e., the identified network topology is a random network topology), the method proceeds to step 205, else if the response to the query is affirmative, the process continues to step 207.

In step 205, the method executes a process of computing paths for the random topology. By one embodiment, an algorithm such as M-roots (also referred to as 'Multiple-Roots') is executed to determine routing paths and assign virtual lanes. The method thereafter proceeds to step 209.

In step 207, the method executes a process of computing primary and redundant (i.e., backup) routing paths for the fat-tree network topology. Details regarding this process are described later with reference to FIGS. 11A-11C. Upon computing the routing paths, the process proceeds to step 209. In step 209, the method stores the computed routing paths for the identified network topology in a routing database. For example, the network routing information may be stored in a route-forwarding table. By one embodiment, the base paths are stored in a Linear Forwarding Table (LFTs) in the physical switches. After a fault or recovery, the newly computed paths are marked in the database, and such that only marked paths need to be copied to the corresponding LFTs. This provides a significant speed increase compared to methods that rewrite entire LFTs after a fault or recovery.

The method further proceeds to step 211, wherein a query is made to determine whether any topology changes are detected. A topology change may occur due to a failed network link, a failed switch, and the like. If the response to the query is negative (i.e., no faults are detected in the network elements), the method proceeds to step 227. However, if the response to the query in step 211 is affirmative, the method proceeds to step 213. In step 213, a query is performed to determine whether the topology under consideration is a fat-tree topology. If the response to the query is negative, the method proceeds to step 215. If the response to the query if affirmative, the process proceeds to step 217.

In step 215, upon determining that the topology of the network is a random topology, the method executes the function of re-computing the routing paths (similar to that as executed in step 205), while taking into account the failed components of the network. Thereafter the method proceeds to step 225.

If the network topology is a fat-tree topology, the method executes in step 217, the process of handling topology changing events for down-links (i.e., occurrence of faults) in the network. Further, in step 219, the method executes the process of handling topology changing events for up-links (i.e., recovery from faults) of the network. The processes in step 217 and 219 that correspond to the changing network events in the down-links and up-links of the network specifically correspond to the process of identifying a failed switch port or failed switch, and further determining all source-destination node pairs, whose routing paths utilize the failed portion of the network. Alternate routing paths are determined that compute the routing paths which exclude the failed portions of the network. Details regarding the processes of handling topology changing events for down-links and up-links of the network are described later with reference to FIGS. 19 and 20, respectively.

The process then proceeds to step 221, wherein a process that performs a change in operation mode of the network is executed. By one embodiment, networks may include for instance, two modes of operations: a first mode that corresponds to no faults in the network scenario, wherein a first routing mechanism is executed, and a second mode, which corresponds to faults in the network, wherein a second routing mechanism is executed. By one embodiment, for some networks, there may be two modes of operation: mode 1 corresponding to the case when there are no faults detected, and mode 2 corresponding to the case when one or more faults is/are detected. As such, after the detection of a first fault, the operating mode of the network is switched from mode 1 to mode 2, and when the network recovers from the faults (i.e., all links are operational), the mode of the network is switched from mode 2 to mode 1. It must be appreciated that each mode of the network may have a unique routing mechanism. Details regarding the change in mode operation of the network are described later with reference to FIG. 21.

Further, the method proceeds to step 223, wherein the updated routing paths (i.e., paths that are computed upon detection of one or more failures or recoveries in the network) are used to update the routing tables stored in the routing database. By one embodiment, two update operations may be performed: a trap-path update and an end-to-end update. In trap-path update, routing from a switch to the SM node (node where the Subnet Manager is running) is updated. It must be appreciated that this path requires to be updated because one needs to ensure that every switch in the network will be able to communicate with the SM node (for example, to transmit data to other subnets). The end-to-end path update is for providing a new route after a fault or recovery for every affected path is detected. In doing so, one is ensured that every switch in the network will be able to continue communicating with a given destination switch (within the network) in order to send data while avoiding failed links. Also non_end-to-end paths (i.e. paths from non-bottom switch to HCA) and end-to-non_end paths (i.e. from bottom switch to non-bottom switch) are updated if required.

The method further proceeds to step 225 to perform a query as to determine whether all affected routing paths have been accounted for. Specifically, a query is made to determine whether an alternate routing path for each originally computed routing path, which is affected by the failure is computed. If the response to the query is negative, the process loops back to step 211, to repeat the steps 213 to 223. However if the response to the query in step 225 is affirmative, the method proceeds to step 227.

In step 227, the process makes a query to determine whether there is a change in the node of the network that is assigned to function as the subnet manager. In other words, the process determines whether the node that is currently assigned to function as the subnet manager is functioning correctly. If the response to the query in step 227 is affirmative, the process proceeds to step 229, wherein a new node is assigned to function as the subnet manager. Thereafter, the process proceeds to step 211 to repeat the process of computing routing paths and monitoring the network. If the response to the query in 227 is negative, the process loops back to step 211. It must be appreciated that as shown in FIG. 2, the process of routing and monitoring the network is executed in a continuous and automatic manner. However, the process may be terminated (and thereafter restarted) based on user input.

It must be appreciated that the above described process may be performed by a controller/server that includes circuitry (described later with reference to FIG. 22), and resides for instance, in the subnet manager or a predetermined node of the network. Alternatively, the controller/server may be located outside the network, and be implemented for instance, in a distributed processing manner such as a 'cloud network'. By one embodiment, the controller/server may be implemented by a computing device such as a computer system (or programmable logic). The computing device may be a special purpose machine including processor that configured to perform the process depicted in FIG. 2. Moreover, the computing device may include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)). Note that the terms 'controller' and 'server' are used interchangeably, and imply a computing device that includes a processor which is configured to perform the functions recited herein.

Figure 3:
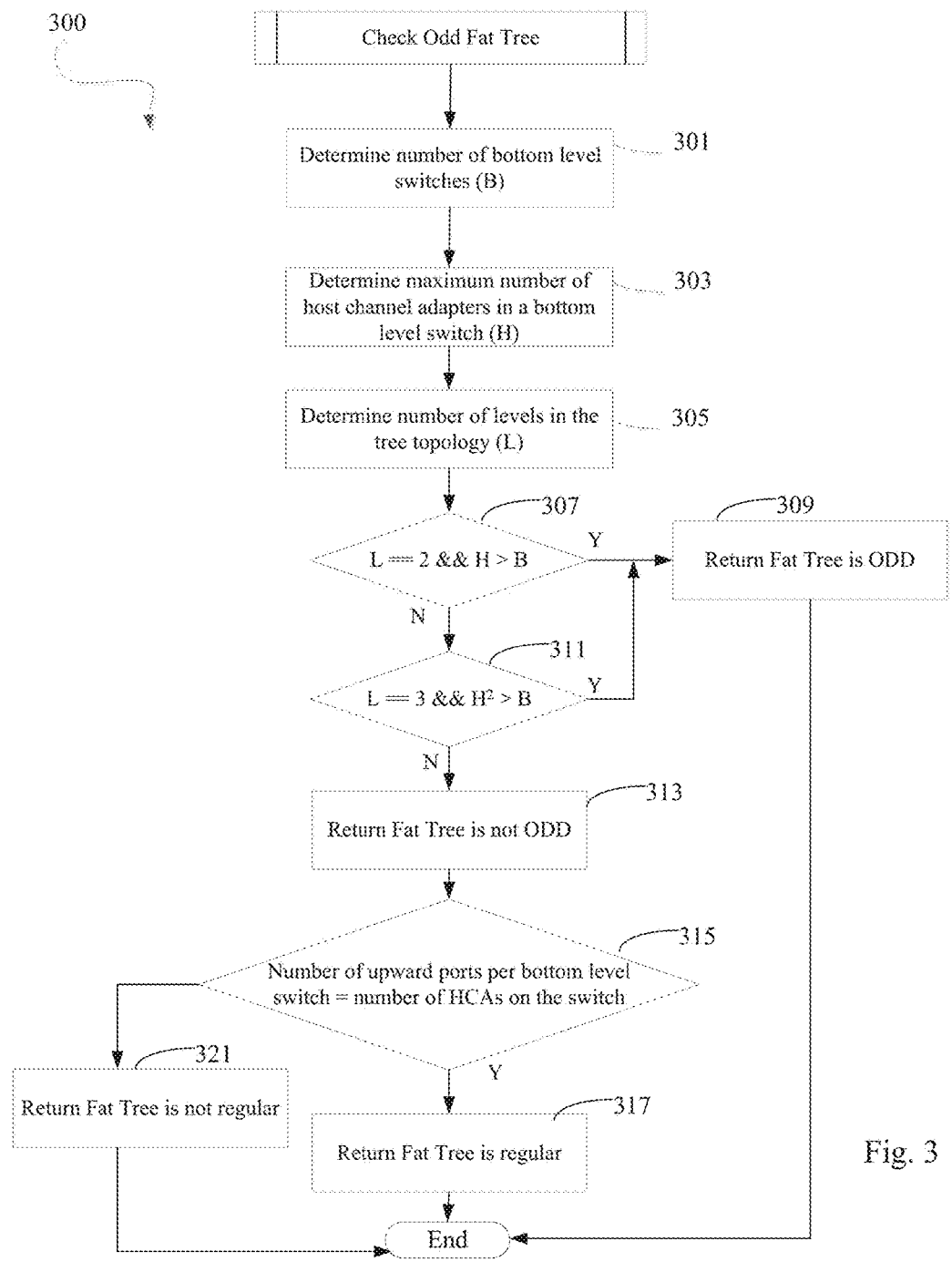
FIG. 3 depicts an exemplary flowchart outlining the steps performed to determine whether a network topology is an odd fat-tree, and if that is not the case, whether the network topology is regular or not.

By one embodiment of the present disclosure, the controller is configured to determine whether the input network tree topology is an odd fat-tree. FIG. 3 depicts an exemplary flowchart 300 outlining the steps performed to determine whether a network topology is an odd fat-tree.

The process commences in step 301, wherein a number of bottom level switches (B) are determined. Further, in step 303, the process determines the maximum number of host channel adaptors (H) that are attached to a particular bottom level switch. The process in step 305 determines a number of levels (L) in the input tree topology.

In the formulas described herein, "<=", "<", "==", ">", and ">=" are relational operators, "&&" is a logical AND operator with lower priority than relational operators, and "!" is a logical NOT operator with higher priority than relational operators. % is a modulo operator. ++ is an operator that increases a variable by 1, while -- is an operator that decreases a variable by 1.

In step 307, a query is made to determine whether the following condition is valid:

$$L==2 \&\& H>B \tag{1}$$

Specifically, a query is made to determine whether the number of levels in the input tree topology is equal to two, and whether the parameter H is greater than the parameter B. If the response to the query in step 307 is affirmative, the process proceeds to step 309, wherein the controller determines that the input tree topology is an odd fat-tree. If the response to the query in step 307 is negative, the process proceeds to step 311, wherein a query is made to determine whether the following condition is valid:

$$L==3 \&\& H^2>B \tag{2}$$

Specifically, a query is made to determine whether the number of levels in the input tree topology is equal to three and whether the parameter H to the power of two is larger than B. If the response to the query in step 311 is affirmative, the process proceeds to step 309, wherein the controller determines that the input tree topology is an odd fat-tree, whereafter the process terminates. If the response to the query in step 311 is negative, the process proceeds to step 313. In step 313, the controller determines that the input tree topology is not an odd fat-tree, whereafter the process proceeds to step 315, wherein a query is made to determine whether the input tree topology is regular or not. Specifically, a query is made to determine whether the number of upward ports per bottom level switch equals the number of HCAs on the switch. If affirmative, process proceeds to 317, wherein the controller determines that the input tree topology is regular, whereafter the process terminates. If the response to the query in step 315 is negative, the process proceeds to step 321, wherein the controller determines that the input tree topology is not regular, whereafter the process terminates. By one embodiment, a determination as to whether an input tree topology is an odd fat-tree is made so as to develop a routing mechanism for the odd fat-tree in a manner such that the paths (i.e., primary path and redundant paths) are well balanced across the odd fat-tree network. It must be appreciated that the routing mechanism which is applicable to a generic tree-topology network may be not equally effective (from a perspective of balancing the network) when applied to an odd fat-tree because of the lower number of disjoint paths from every source switch to a given destination in the odd fat-tree.

In what follows is provided a detailed description of the routing mechanism for various tree-topologies. In order to facilitate a better understanding of the algorithms described herein, a description of the various counters, modes of operation of the networks (based on the type of tree topology), and other parameters is first described. Additionally, it must be appreciated that the routing algorithms described herein are applicable to a tree having a plurality of levels. However, for the sake of convenience, the following description is provided with reference to a tree-topology that has either two or three levels.

Figure 4:
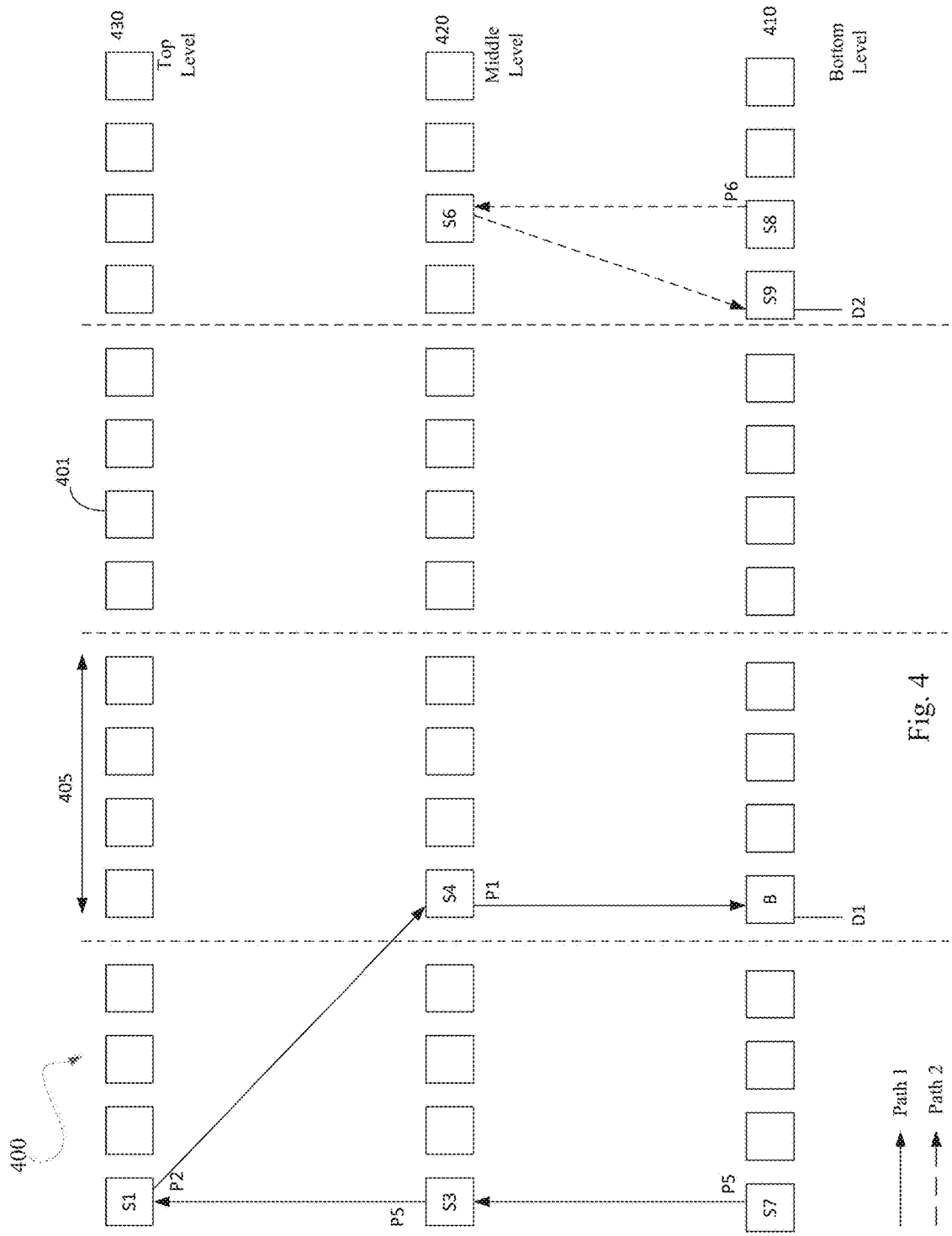
FIG. 4 illustrates an exemplary tree-topology including three levels.

Referring to FIG. 4 there is illustrated an exemplary tree-topology 400 including three levels: a bottom level 410, a middle level 420, and a top level 430. Each level includes a predetermined number of switches 401. By one embodiment, each switch at the bottom level 410 includes a plurality of HCAs attached to each switch. Further, by one aspect of the present disclosure, the routing algorithms are configured to compute a primary path (also referred to as a base path) and a predetermined number of redundant paths, for each source (i.e., switch at the bottom level)-destination (i.e., HCA) pair.

The tree-topology 400 in FIG. 4 can be partitioned (in a vertical fashion) into a plurality of subgroups 405. As shown in FIG. 4, in the case that a source switch and the destination HCA belong in different sub-groups, a total of four hops are required to reach the destination HCA. On the other hand when the source switch and the destination HCA are in the same sub-group, a total of two hops are required to reach the destination. For instance, consider path labeled as path 1 in FIG. 4. Path 1 corresponds to a base path from source switch S7 to a destination HCA (D1). The path from source switch S7 to destination HCA (D1) includes four hops: first hop from source switch S7 to switch S3 (in the middle level) via taking port P5 in S7, second hop from switch S3 to switch S1 (top level) via the port P5, a third hop from switch S1 to switch S4 (middle level switch in adjacent sub-group) via port P2, and a fourth hop from switch S4 to switch B (to which the destination HCA (D1) is attached) via port P1.

In a similar manner, a route labeled path 2 is a base path from source S8 to destination HCA (D2), which is attached to switch S9. Note that the source switch (S8) and the destination HCA (D2) lie in the same sub-group. Accordingly, a total of two hops are required: a first hop from the source switch S8 to switch S6 (middle level) via port P6, and a second hop from switch S6 to switch S9, to which the destination HCA (D2) is attached.

According to one embodiment of the present disclosure, each switch/port (i.e. a 2-tuple, <switch, port>, consisting of a switch ID and a port ID for a port at the switch) is assigned a plurality of variables. Each variable of the plurality of variables is computed based on a plurality of counters. A magnitude of the variable for each port determines whether the particular switch/port is utilized in a routing path from a source switch to a destination HCA. By one embodiment, each port in the switch is assigned a total of seven variables (c0-c6). In what follows is provided a definition of each variable and the corresponding counters that are used to determine the magnitude of the variable.

A first variable c0 is defined as the number of hops required to reach a particular destination. For instance, referring to FIG. 4, the value of the c0 variable for switch S7 (corresponding to path 1) is 4, as 4 hops are required to reach the destination HCA (D1). Similarly, the value of the c0 variable for the switch S8 (with respect to path 2) is 2, as 2 hops are required to reach the destination HCA (D2).

A second variable c/is defined as a temporary switch/port variable. The variable is reset each time a new source-destination pair is computed. By one embodiment, the purpose of the c1 variable is to split redundant paths for the same source-destination pair. In other words, the purpose of the c1 variable is to build paths traversing different links to avoid use of the same links. In this manner, the routing algorithm is able to route the redundant paths in a balanced manner. It must be appreciated that the c1 variable is incremented for every base path as well as for every redundant path, in every switch/port traversed for the current source-destination pair.

Figure 5:
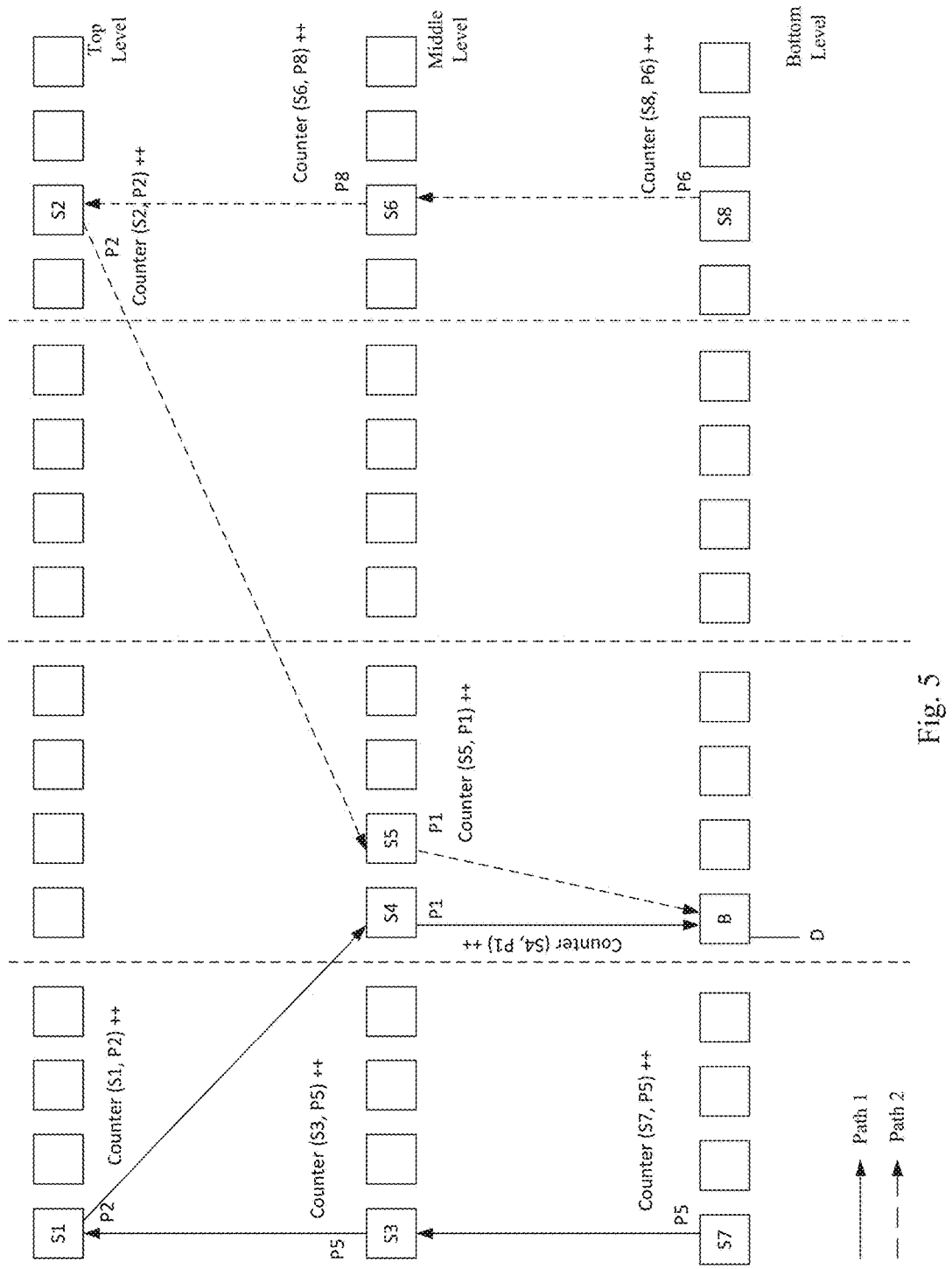
FIG. 5 illustrates an example depicting the computation of a first counter by one embodiment of the present disclosure.

FIG. 5 illustrates an exemplary example depicting the computation of the counter counter(switch, port). FIG. 5 illustrates a three-level tree, wherein a first path (path 1) is routed from switch S7 to HCA labeled 'D'. By one embodiment, only all end-to-end base paths increment the counter (switch, port) at each switch that is traversed in the path from the source to the destination. For instance, referring to path 1 in FIG. 5, the value of counter(S7, P5) is incremented by one, as path 1 utilizes port 5 (P5) on switch S7 to traverse to switch S3 in the middle level. In a similar manner, the values of counter(S3, P5), counter(S1, P2), counter(S4, P1) are also incremented by one, as these switches (and corresponding ports) are utilized in traversing path 1.

In a similar manner, with respect to path 2 as shown in FIG. 5, the values of counter(S8, P6), counter(S6, P8), counter(S2, P2), and counter(S5, P1) are incremented by one as these switches (and their corresponding ports) are utilized while traversing path 2. Note that every subsequently computed base path increases the corresponding counter counter (switch, port) when traversing the switches and ports that are utilized by the base path from the source switch to destination HCA.

Figure 6:
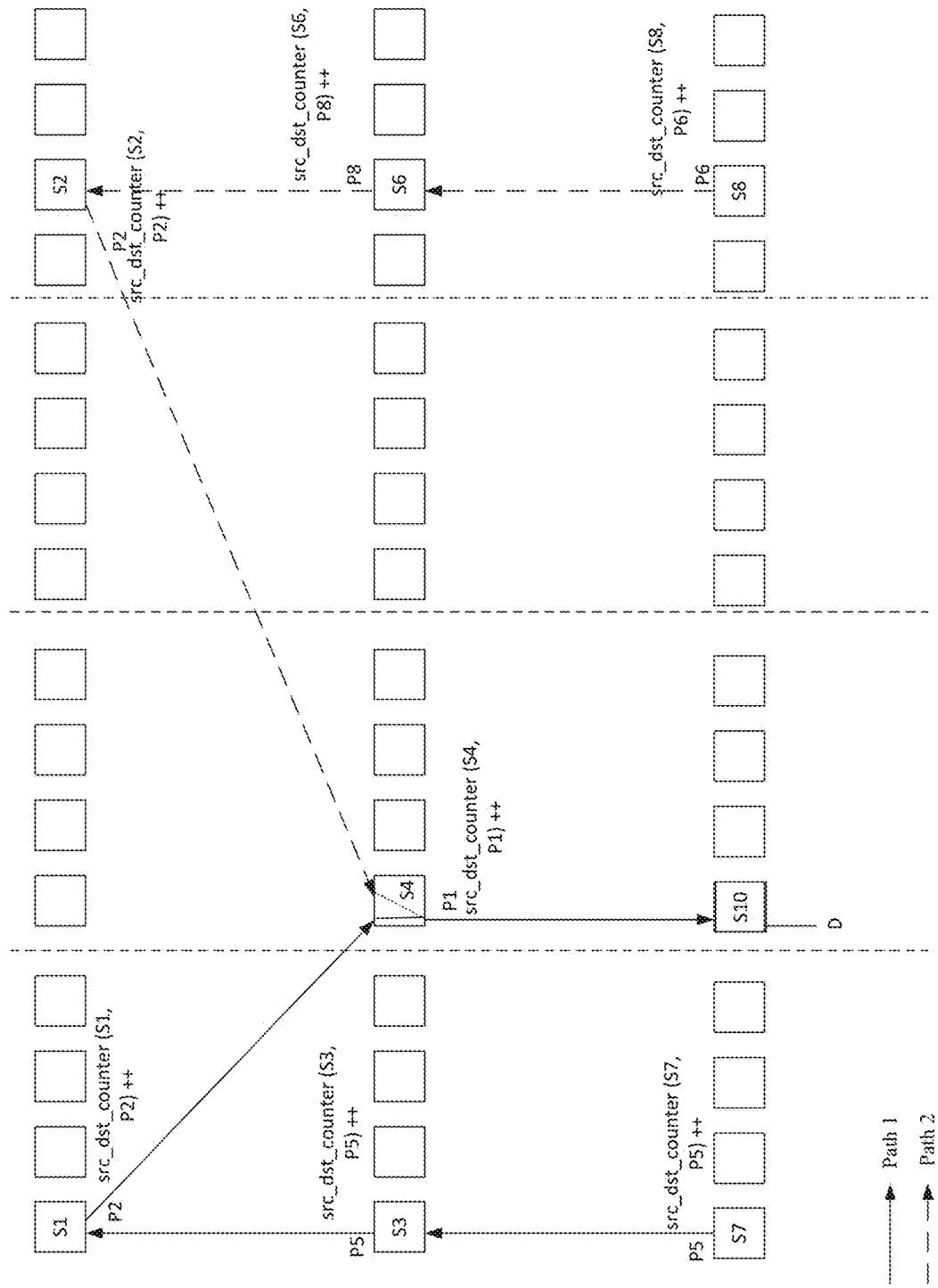
FIG. 6 illustrates an example illustrating the computation of a second counter.

FIG. 6 depicts an exemplary example illustrating the computation of a second counter: source_destination_counter(switch, port). For sake of convenience this counter is referred to herein as src_dst_counter(switch, port). Note that the 'src' corresponds to a current switch that lies on the path from a source switch to a destination HCA. For instance, referring to path 1 (e.g., a base path) in FIG. 6, which traverses the route: switch S7→S3→S1→S4→S10→D, the values of counters: src_dst_counter(S7, P5), src_dst_counter (S3, P5), src_dst_counter(S1, P2), src_dst_counter(S4, P1) are incremented by one. It must be appreciated that the src_dst_counter(switch, port) is incremented (for each utilization of a switch and the corresponding port) in the computation of the base path and all redundant paths for a given source switch-destination HCA pair. In this aspect the src_dst_counter(switch, port) functions in a similar manner as the counter(switch, port). Thus, the src_dst_counter (switch, port) enables the balancing of the base and redundant paths (i.e., avoid taking similar switches and/or ports) when computing paths from a source switch to a destination HCA.

However, the src_dst_counter(switch, port) is reset to a value of zero for path computations (base path and redundant paths) of subsequent source switch-destination HCA pairs. In this aspect the src_dst_counter(switch, port) differs from the previously described counter(switch, port). For example, referring to FIG. 6, the base path from source switch S8 to the same destination HCA (D), utilizes the switch S4 and port P1 to reach the destination (D). In this iteration of route computation for S8 to D, note that the value of the src_dst_counter(S4, P1) counter is 1, as this counter, is first incremented for the computation associated with path P1, then reset to zero, and then incremented again to 1 for the computation associated with path P2. By one embodiment, the value of the variable c1 is determined by the src_dst_counter(switch, port) counter.

By one embodiment, a variable c2 is defined as the minimal next switch/port counter (among all ports in a switch having a minimal path, i.e., a lowest number of hops path to a destination). The variable c2 is incremented for every base path in each switch/port for all source-destination pairs.

By one embodiment, for odd fat-trees, variable c2 performs a different function: the variable c2 is used to split redundant paths for different source-destination pairs, when the corresponding base paths share a common switch/port. Specifically, as described below with reference to FIGS. 7A to 7C, first redundant paths are split (i.e., use different routes to ensure balancing of paths) when the corresponding base paths share a switch/port in hop number 0, i.e. the hop (connection) from the source switch to the next switch, also called the first hop. In a similar manner, second redundant paths are split, when the base paths share a switch/port in the first hop. Further, third redundant paths are split when the corresponding base paths share a switch/port in the second hop.

Figure 7A:
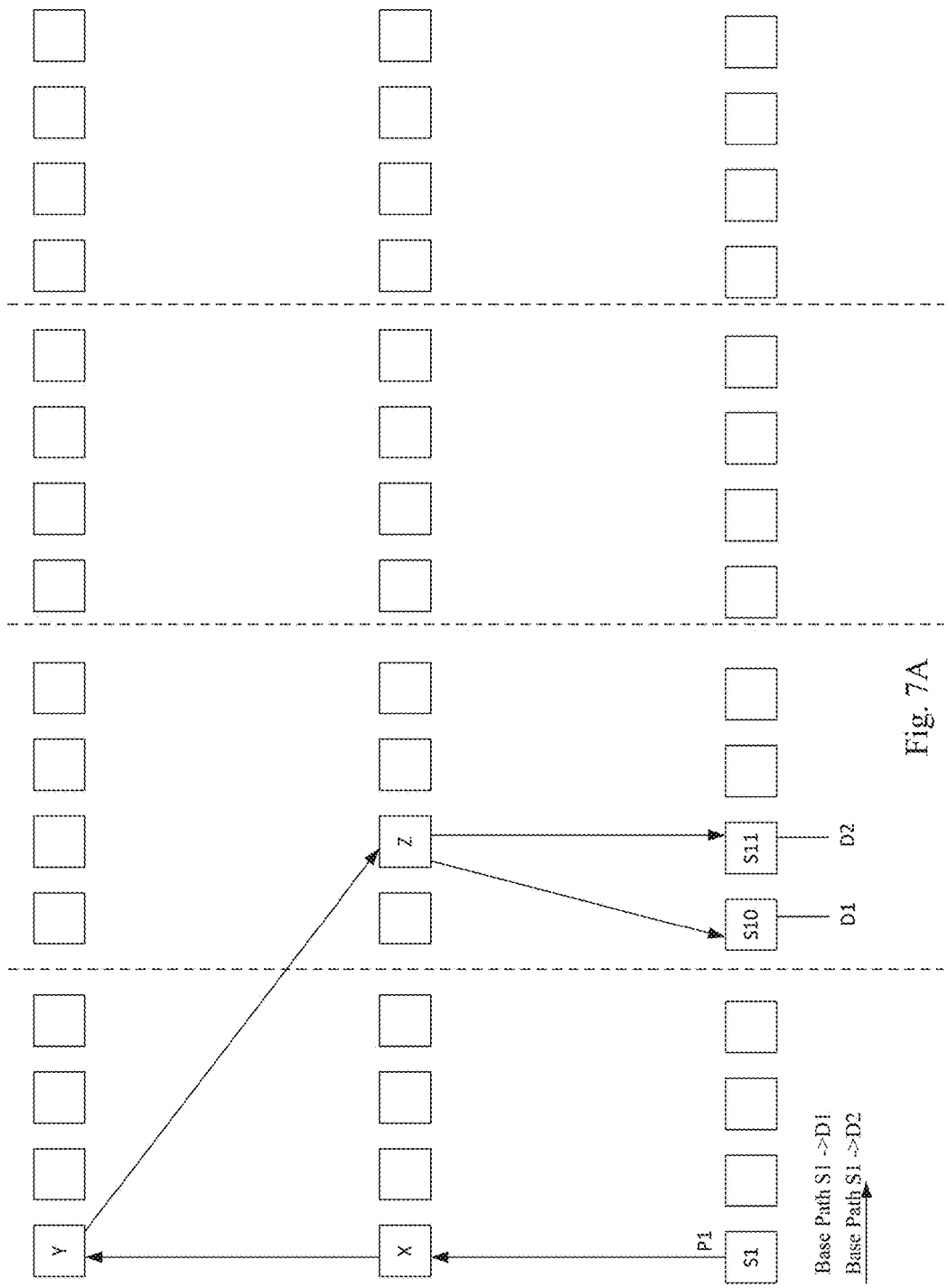
FIG. 7A depicts exemplary base paths from a source switch to destination host-channel-adapters (HCAs)
Figure 7B:
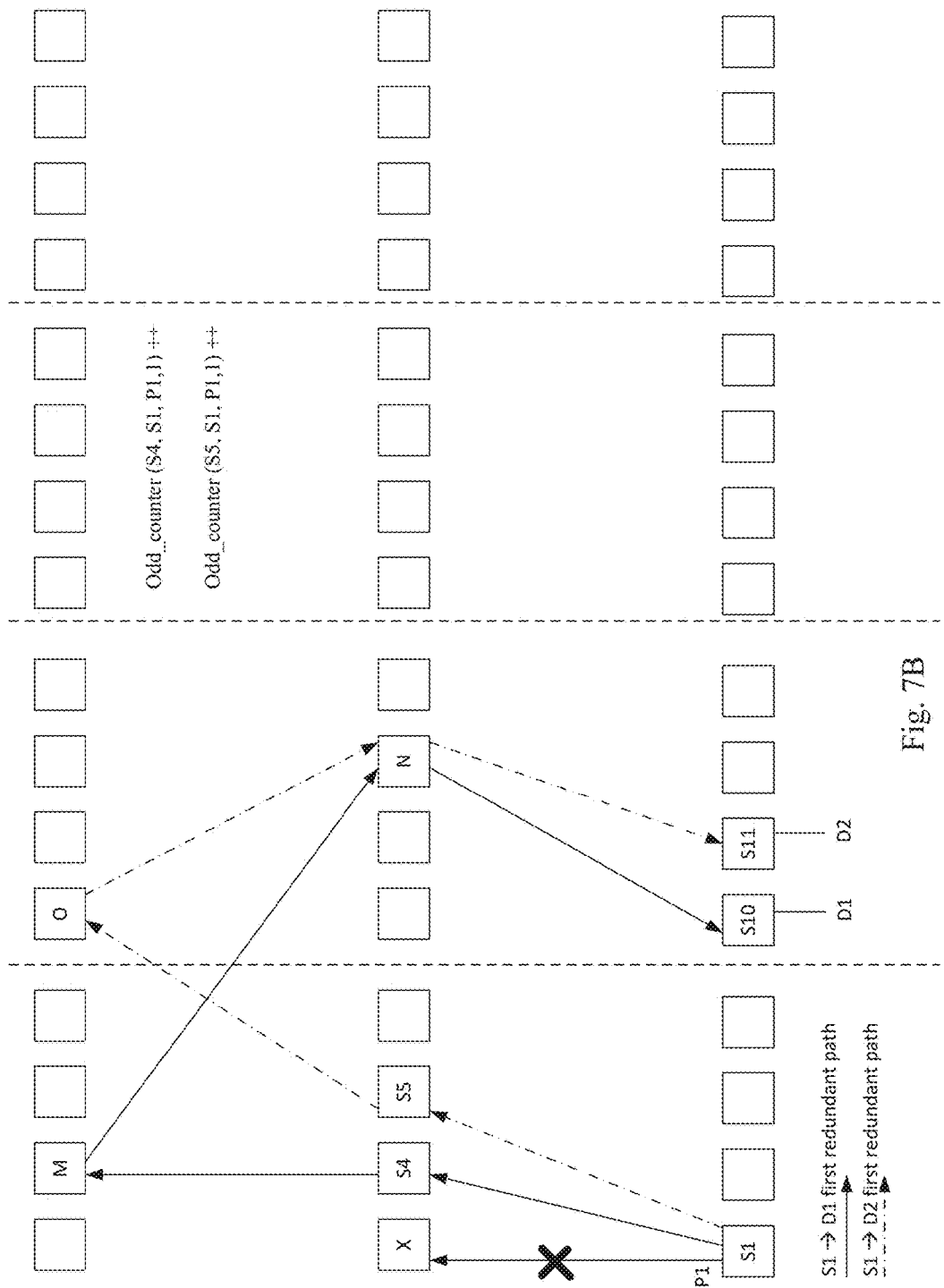
FIG. 7B depicts a scenario of a link failure in the network of FIG. 7A and computation of redundant paths.
Figure 7C:
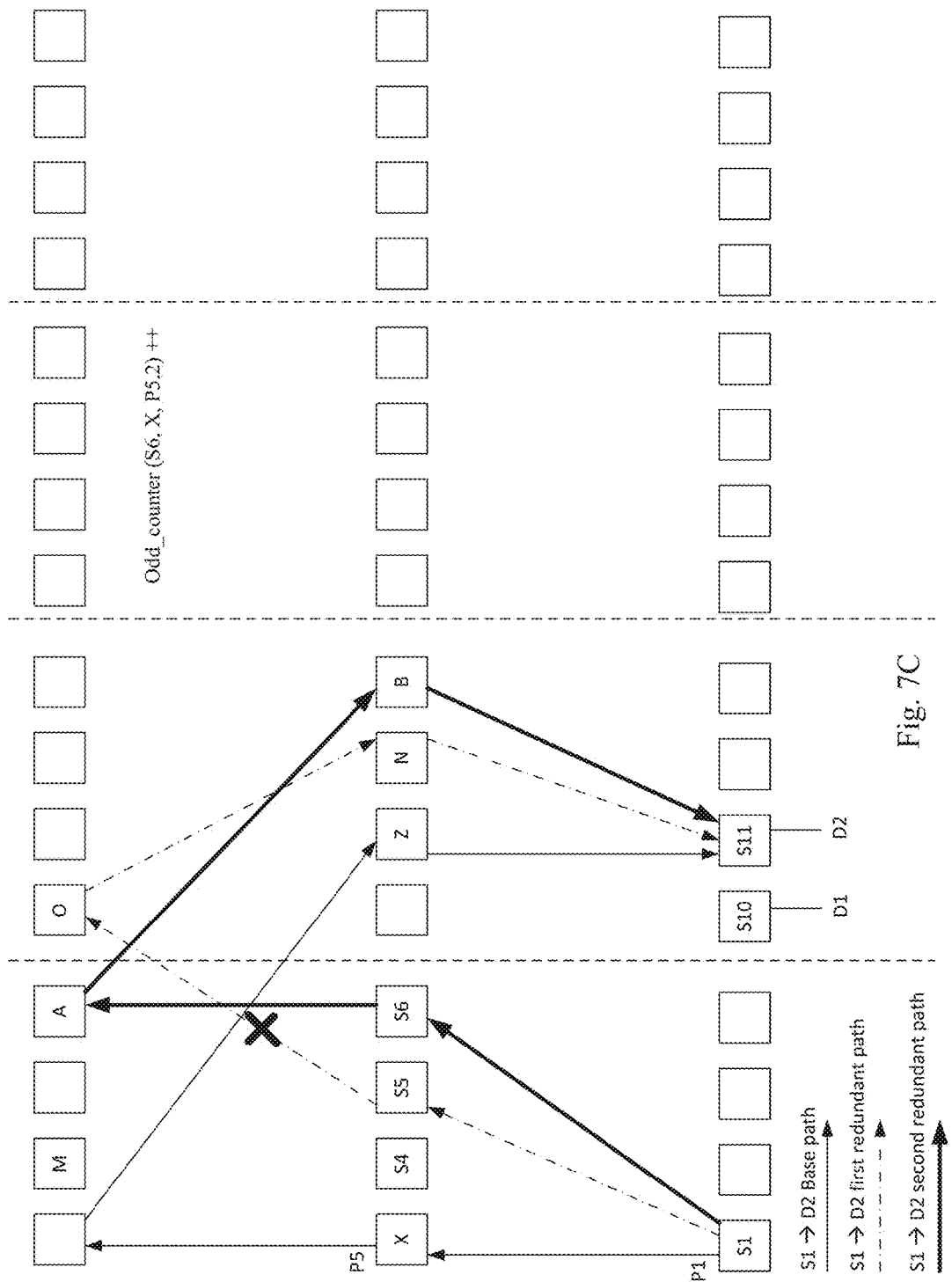
FIG. 7C depicts the computation of redundant paths for the network of FIG. 7B after a topology change.

FIGS. 7A to 7C depict an exemplary example illustrating the computation of a third counter: odd_counter( ). By one embodiment, the odd_counter( ) takes as input four parameters: next_switch(best_port), auxiliary_switch, auxiliary_port, and path_number. The parameter next_switch (best_port) corresponds to the ID of the switch that lies next (determined from a current switch under consideration) in the routing path, if best port is chosen as the port to utilize in the current switch. Note that the routing algorithm includes a function (described later) that computes the best port of a switch that is to be utilized in a route computation. Note also that current switch under consideration, current switch, and switch under consideration, are equivalent terms throughout this description.

The parameter path_number corresponds to a path ID. By one embodiment, for a given source switch-destination HCA pair, a base path (having path number 0), and a predetermined number (P) of redundant paths (having path numbers 1, 2, 3 . . . P) are computed by the routing algorithm.

The parameter auxiliary_switch corresponds to the ID of a switch that is utilized by the base path, at hop=path_number−1. In a similar manner, the parameter auxiliary_port corresponds to the port of the switch in the base path that is utilized at hop=path_number−1.

By one embodiment of the present disclosure, the counter: odd_counter( ) is utilized in the path computations of odd fat-trees. Further, odd_counter( ) is incremented taking into account the above described four parameters. Referring to FIG. 7A is depicted base paths from source switch S1 to destination HCAs D1 and D2, respectively. Note that each of the base paths (S1→D1, and S1→D2) take four hops to reach their respective destinations (as the destination HCAs lie in a different sub-group than the source switch), and the base paths differ only in the fourth hop (i.e., the hop from switch Z to S10, and switch Z to S11).

Referring to FIG. 7B, consider the scenario where the link connecting switch S1 to X fails, or alternatively, the port P1 that is used for both base paths (S1→D1, and S1→D2) is in a malfunctioned state. In this case, redundant paths for the two base paths are computed in a balanced manner as follows: for the base path S1→D1, a best port (other than P1) is selected. Assume that the best port selected leads to switch S4 in the middle level. Accordingly, the counter odd_counter(S4, S1, P1, 1) is incremented. Note that the redundant path under consideration has path number 1. Thus, the source switch in the base path which is utilized at hop=path_number−1 corresponds to S1, and switch S4 corresponds to the parameter next_switch(best_port). Further, P1 corresponds to the parameter auxiliary_port i.e., the port of the switch in the base path that is utilized at hop=path_number−1, (i.e. hop 0). The first redundant path is routed via S1→S4→M→N→S10.

In a similar manner, the first redundant path for the base path from S1→D2 is routed from S1→S5→O→N→S10. Note that in this case, the first redundant path chooses S5 (as opposed to S4) as the switch to be utilized in the middle level, as the value of the counter: odd_counter(S5, S1, P1, 1) is zero (before being incremented to one after S5 has been chosen) while odd_counter(S4, S1, P1, 1) is already one, thereby discouraging the usage of switch S4 for the first redundant path from S1→D2. In this manner, a balanced routing of redundant paths is achieved.

FIG. 7C depicts a scenario wherein a fault occurs in the first redundant path for S1→D2. For instance, consider the link joining switch S5 to switch O fails. In this case, the second redundant path is computed to take the route S1→S6→A→B→S11. In this case, counter odd_counter (S6, X, P5, 2) is incremented, as the redundant path under consideration is path number 2, the source switch in the base path which is utilized at hop=path_number−1 corresponds to X, switch S6 corresponds to the parameter next_switch (best_port), and port P5 corresponds to the parameter auxiliary_port i.e., the port of the switch in the base path that is utilized at hop=path_number−1, (i.e. hop 1). In this manner, the counter, odd_counter( ) splits redundant paths by taking into account the switch/port utilized by the base path at hop=redundant path_number−1. In other words, the counter odd_counter( ) attempts to split, first redundant paths, when the base paths utilize the same switch/port. Moreover, by one embodiment, the variable c2 is determined by computing the values of the odd_counter( ).

By one embodiment of the present disclosure, a variable c3 is defined as an overall switch/port variable for base path computations. In the instance of redundant paths, the variable c3 takes into account the current redundant path number and the chosen port in the base path in order to split paths. Further, another variable c4 is defined as a variable that corresponds to a next switch that lies in a routing path, if a currently computed best port is chosen in a current switch. Additionally, variable c5 is an overall switch/port variable for the base path. Note that c5 is utilized in the cases where variable c3 is not taken into account. Variable c6 corresponds to a variable which is equal to a sum of all port variables for base paths.

By an aspect of the present disclosure is defined a counter pn1_h4_counter( ), which takes as two input parameters: by_hop_1b, and best_port. By one embodiment, the counter pn1_h4_counter( ) is utilized only when the source switch and the destination HCA are in different subgroups (i.e., in a three level switch, the source and destination are four hops away). The parameter bp_hop_1b corresponds to the port taken by the base path in a middle level switch to reach an upper level switch i.e., port taken in a second hop. The best_port parameter corresponds to an alternate port that may serve as the best port (in case the previously computed best port fails) in the middle level switch.

Figure 8A:
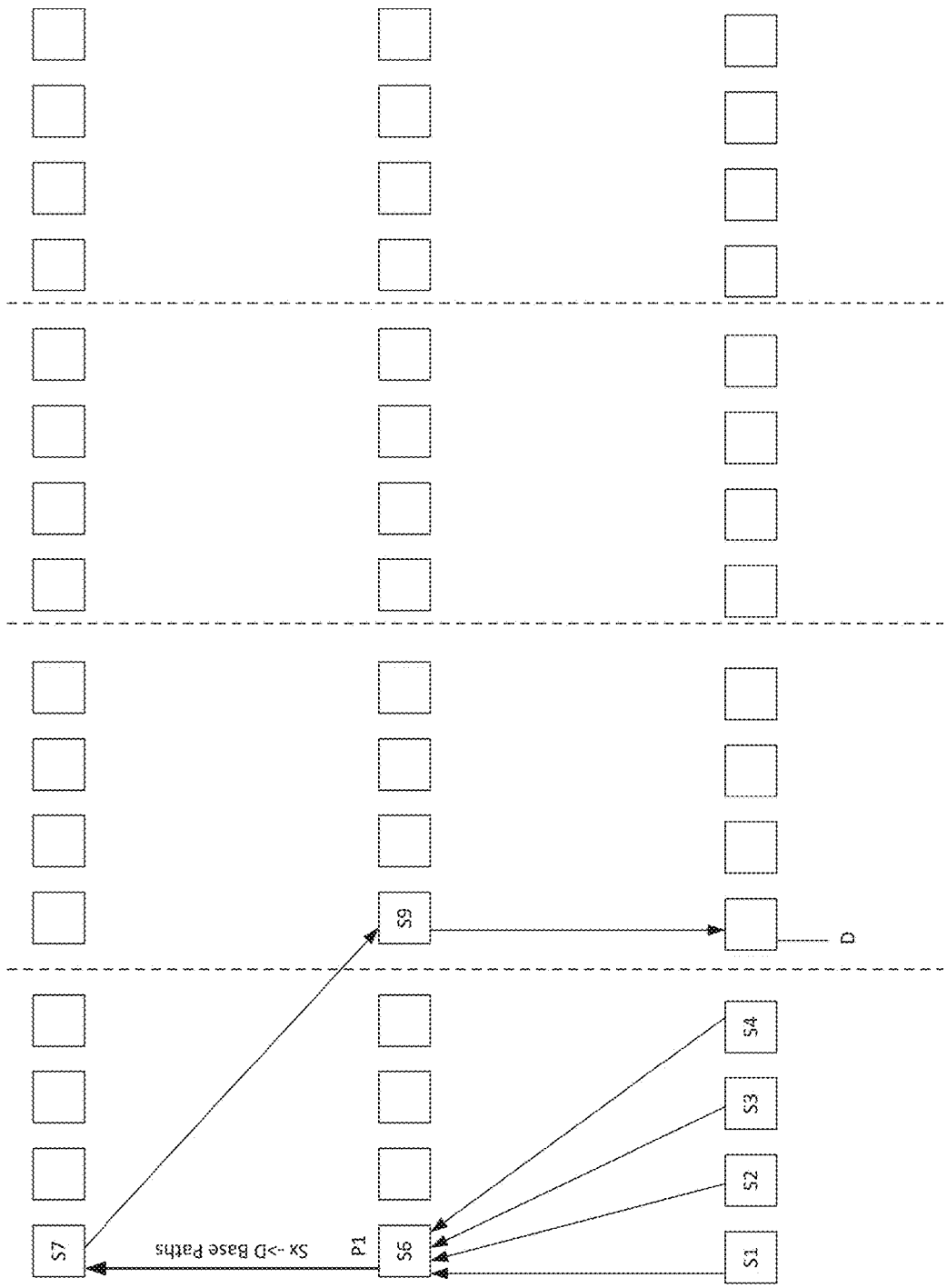
FIG. 8A depicts the working of a counter to balance first redundant paths in a second hop.
Figure 8B:
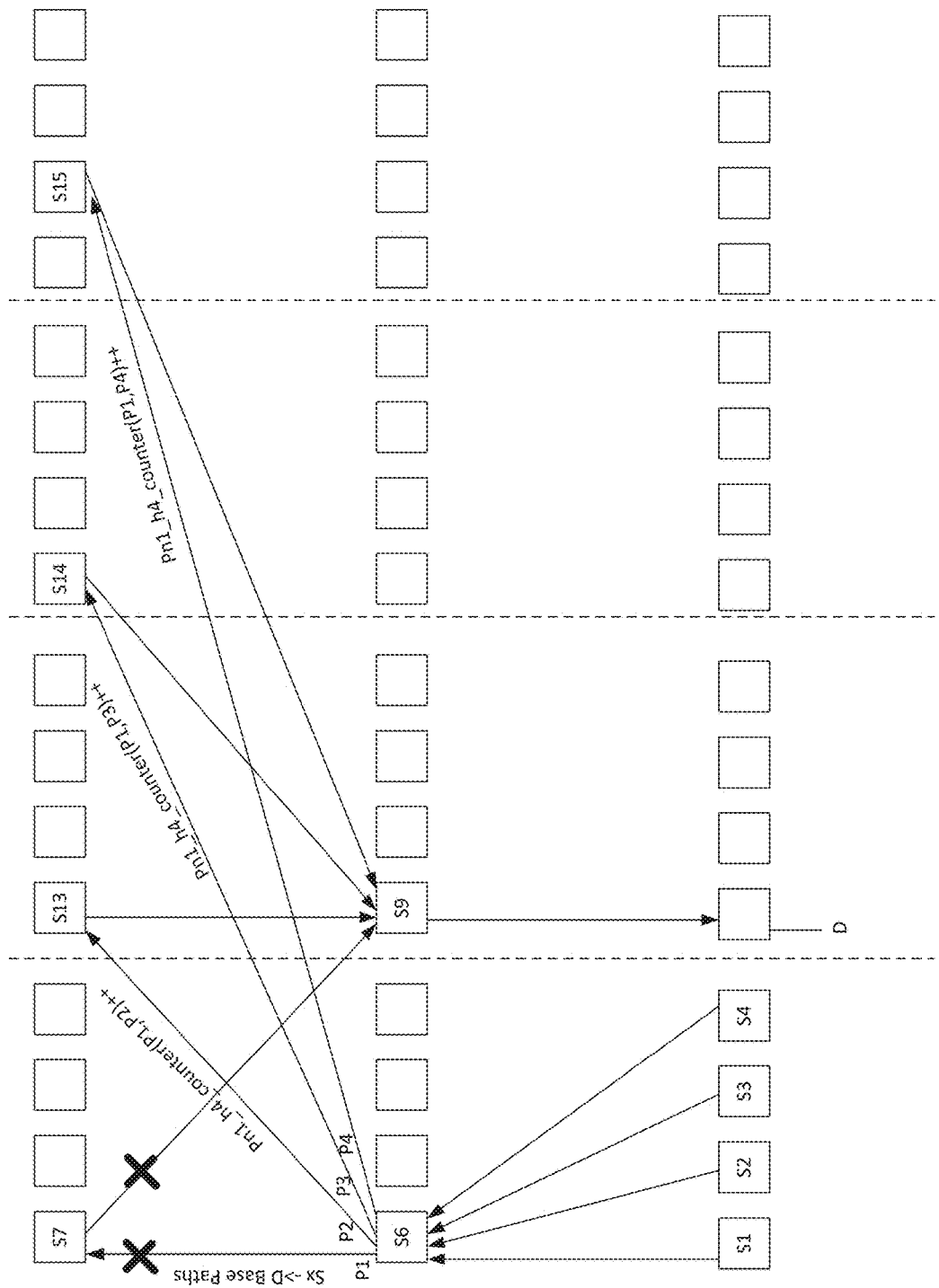
FIG. 8B depicts computation of a new best port for the first redundant path computation of FIG. 8A.

By one embodiment, the counter pn1_h4_counter( ) is used to balance, when the fat-tree is not an odd fat-tree, first redundant paths of different source-destination pairs, when the base paths corresponding to the different source destination pairs utilize the same link in the second hop. Specifically, the counter pn1_h4_counter( ) is utilized to balance first redundant paths in the second hop as illustrated in FIG. 8A and FIG. 8B. FIG. 8A depicts a three level fat-tree, wherein the base paths for source-destination pairs (S1, D), (S2, D), (S3, D), and (S4, D) utilize the same link in the second hop (outgoing link on port P1 of switch S6 in the middle level that connects to switch S7 in the top level).

In such a setting, consider the scenario where the link connecting switch S6 to switch S7 fails. Thus as shown in FIG. 8B, all the end-to-end base paths are incomplete as link connecting S6 to S7 (and thereby link connecting S7 to S9) cannot be used. Thus, by one embodiment, in order to ensure that the first redundant paths of the source-destination pairs (S1, D), (S2, D), (S3, D), and (S4, D) do not use link connecting switch S6 to S7, the counter pn1_h4_counter( ) is applied.

Specifically, as shown in FIG. 8B, a new best port (of switch S6) for the first redundant path for pair (S1, D) is computed. Assume that the new best port is port P2. Accordingly as shown in FIG. 8B, the first redundant path is routed from switch S6 to switch S13 in the second hop. Subsequently, the counter pn1_h4_counter(P1, P2) is incremented in order to dissuade (if possible), the first redundant path of the next pair (S2, D) to use the same port (P2). Thus, while determining an output port for the first redundant path of (S2, D), the value of the counter pn1_h4_counter(P1, P2) is 1 and the value of the counter pn1_h4_counter(P1, P3) is 0. Accordingly, as shown in FIG. 8B, the first redundant path for the pair (S2, D) utilizes port P3 on switch S6 to traverse to switch S14 in its second hop, whereafter the counter pn1_h4_counter(P1, P3) is incremented. In a similar manner, the first redundant path for pair (S3, D) utilizes port P4 on switch S6 to traverse to switch S15 in its second hop.

However, while determining the output port for the first redundant path of pair (S4, D), the values of the counters pn1_h4_counter(P1, P2), pn1_h4_counter(P1, P3), and pn1_h4_counter(P1, P4) are all equal to one. In such a scenario, the output port on switch S6 that is to be assigned to the first redundant path for pair (S4, D) may be determined in a random manner, a lowest port ID, or the like. First port searched depends on check_port computed at step 1542 in FIG. 15C. Thus, assuming port P2 is assigned to the first redundant path for (S4, D), the corresponding value of counter pn1_h4_counter(P1, P2) is further incremented to have a value of 2. In this manner, the pn1_h4_counter( ) is utilized to balance the redundant paths.

By one embodiment of the present disclosure, there is described another counter: pn2_end_counter( ). This counter receives three input parameters: bp_hop_0b, path_number, and best_port. As stated previously, the parameters path_number, and best_port correspond to the path ID and the port that is to be utilized in the current switch, respectively. The parameter bp_hop_0b is the output port that is taken (by a base path) in a bottom level switch.

Figure 9A:
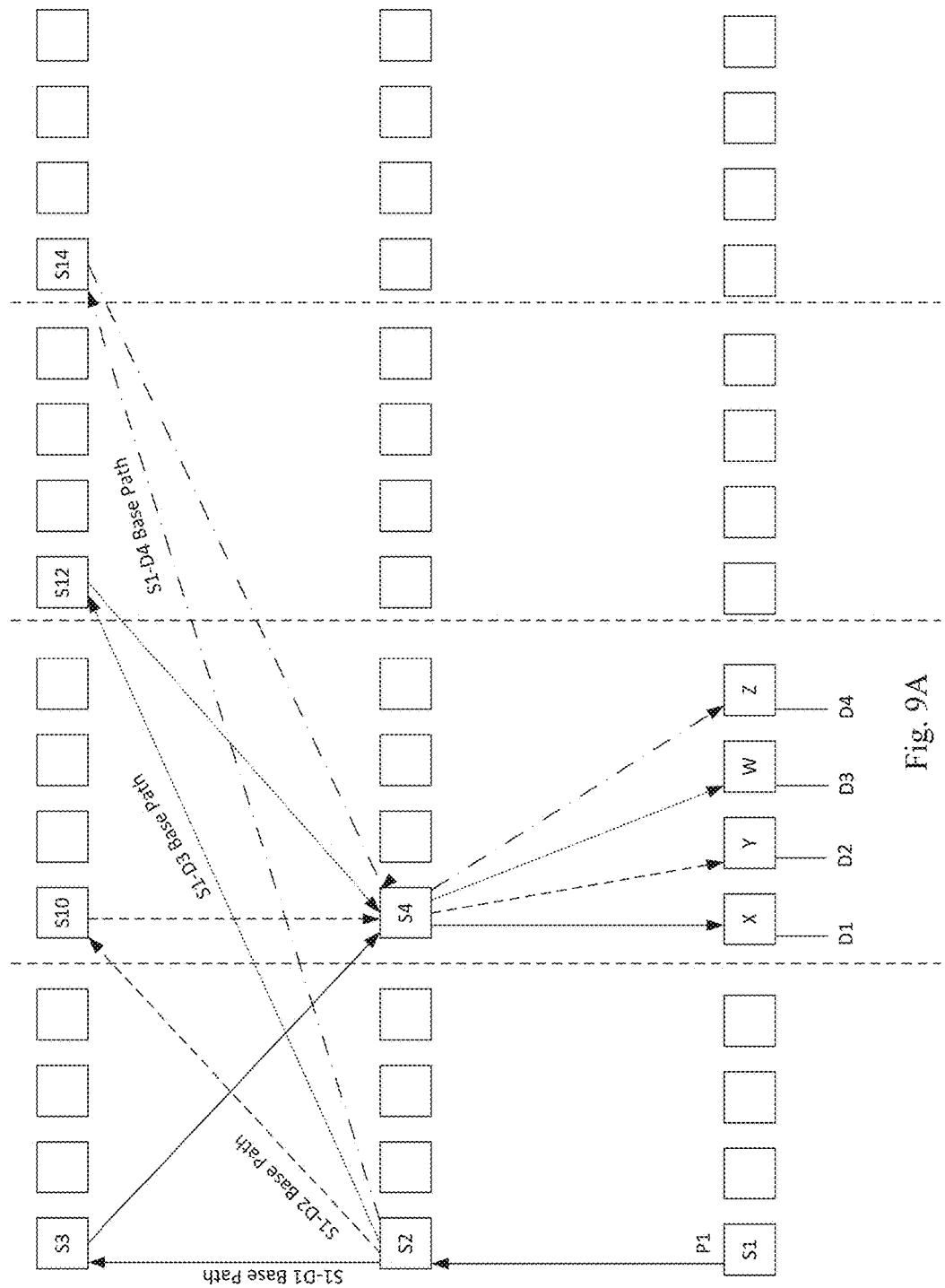
FIG. 9A illustrates exemplary source—destination paths in a three-level fat-tree.

By one embodiment, the counter pn2_end_counter( ) is used to balance second redundant paths (in the first hop) for the scenario when multiple source destination pairs utilize the same path in the first hop. For instance, referring to FIG. 9A, there is depicted four base paths of source-destination pairs: S1→D1, S1→D2, S1→D3, and S1→D4, respectively. Note that all the base paths utilize port P1 in switch S1. Thus, in the event that port P1 fails (or alternatively, a link connecting switch S1 to switch S2 via port P1 fails), the second redundant paths are balanced by utilizing the counter pn2_end_counter( ), such that the redundant paths do not utilize port P1 in the first hop.

Figure 9B:
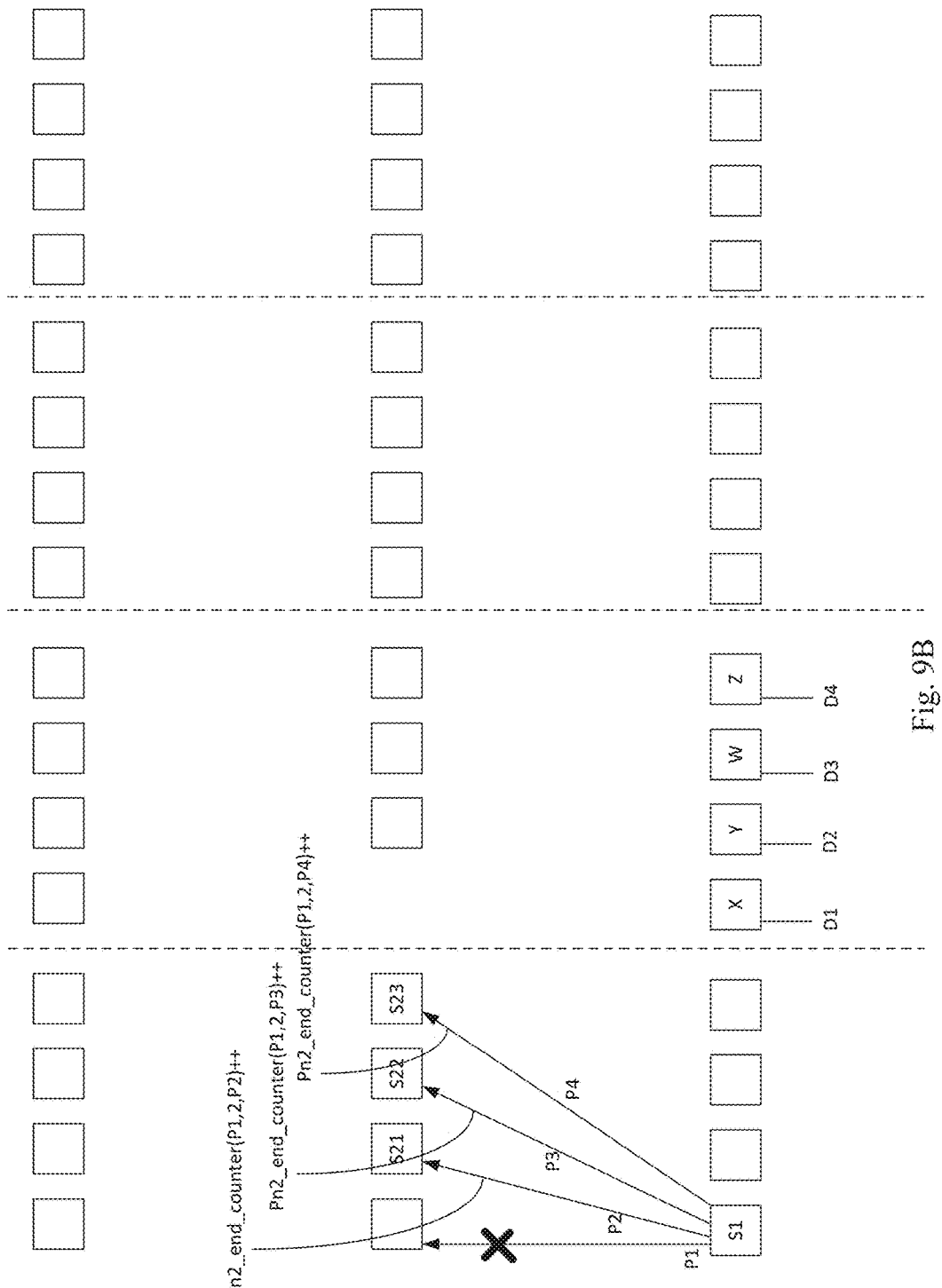
FIG. 9B illustrates a scenario of a failed link in the network of FIG. 9A and computation of redundant paths.

FIG. 9B depicts the assignment of the first hop for the second redundant paths for the source-destination pairs: S1→D1, S1→D2, S1→D3, and S1→D4, respectively. For sake of clarity only the first hop of the respective second redundant paths are depicted in FIG. 9B.

As shown in FIG. 9B, the counter for the second redundant path, pn2_end_counter(P1, 2, P2) is incremented when port P2 is assigned to the second redundant path for source destination pair S1→D1. In a similar manner, the counters pn2_end_counter(P1, 2, P3) and pn2_end_counter(P1, 2, P4) are incremented upon assigning ports P3 and P4 to the second redundant paths for source destination pairs, S1→D2, and S1→D3, respectively. Further, while determining the port (on switch S1) that is to be assigned to the pair S1→D4, note that the value of counters pn2_end_counter (P1, 2, P2), pn2_end_counter(P1, 2, P3), and pn2_end_counter(P1, 2, P4) are all equal to one. Thus, by one embodiment, the port on switch S1 that is to be assigned to the second redundant path from S1→D4, can be selected in a random manner from the ports P2, P3, and P4, or alternatively, the lowest number port i.e., port P2 may be assigned. First port searched depends on check_port computed at step 1566 in FIG. 15D.

It must be appreciated that although the above description regarding the counter: pn2_end_counter( ) is described with reference to balancing the second redundant paths for the different source-destination pairs, the above technique of utilizing the pn2_end_counter( ) counter is equally applicable to the first redundant path computations (e.g., in cases where the source and destination are separated by two hops. By a preferred embodiment of the present disclosure, in the case where the source switch and the destination HCA belong two different sub-groups (i.e., separated by 4 hops), it is preferred to assign the same first hop (as the base path) to the first redundant path, and perform the balancing operation with respect to the second redundant paths as described above with reference to FIG. 9A and FIG. 9B.

By one embodiment of the present disclosure, there is described another counter: switch-destination-counter labeled as switch_dst_counter( ). The switch_dst_counter( ) is applied to end-to-end base paths, wherein a top level switch in a fat-tree, and takes as input parameters: switch ID, which corresponds to the ID of the top level switch, and destination port that corresponds to the ID of the HCA which is attached to a bottom level switch.

Figure 10:
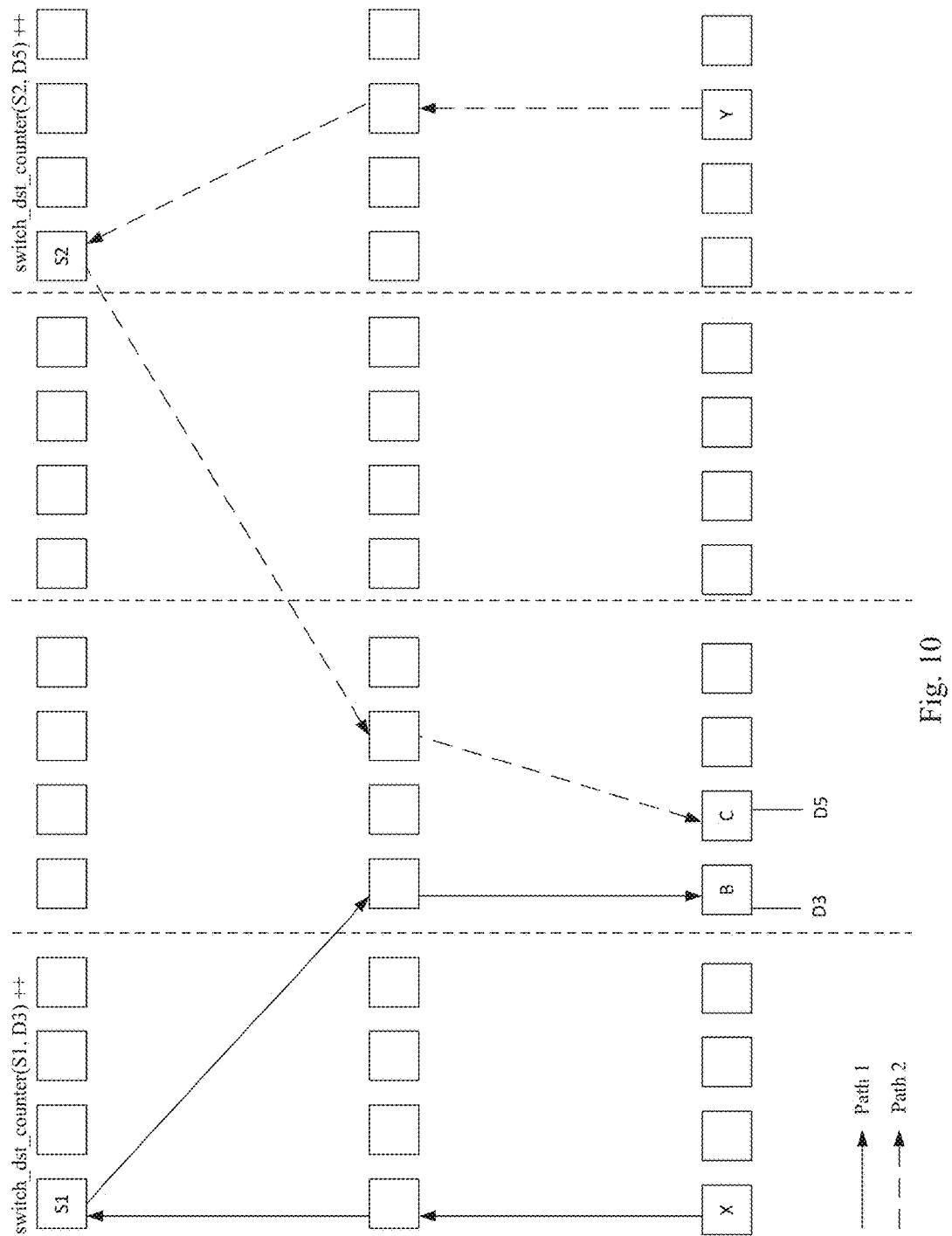
FIG. 10 depicts an exemplary illustration of a switch-destination counter according to one embodiment; redundant paths avoid depicted base paths due to the illustrated top-level counters.

FIG. 10 is an exemplary illustration depicting the computation of the switch_dst_counter( ). As shown in FIG. 10, a first path (i.e., path 1) is routed from source node X to destination HCA D3. The path from switch X to HCA D3 is a four hop path, wherein switch S1 is utilized in the top level. Accordingly, the value of the counter, switch_dst_counter (S1, D3) is incremented by one in an effort to avoid utilizing switch S1 in the top level by another base path. In a similar manner, the switch_dst_counter(S2, D5) is incremented by one, upon the switch S2 in the top level being assigned to the path from switch Y to destination HCA D5. Any subsequent base path that utilizes a top level switch in a four-hop path, increments the value of the respective switch_dst_counter( ) by one. Note that the switch_dst_counter( ) is also applicable in the case of a three-level fat-tree, wherein the source and destination HCAs are separated by two hops. In this case, the switch_dst_counter( ) is applied to the middle level switches in a similar manner as described above. Moreover, by one embodiment, the counter, switch_dst_counter( ) is applicable based on type of network topology, a mode of operation of the network (described later), and a hop number of the path under consideration. For instance, the counter switch_dst_counter( ) is not applied in the cases where, the network topology is a 3-level regular fat-tree full size network, or a 2-level regular fat-tree half-size (operation in a first mode), or during a first hop in any 3-level fat-tree.

In summary, Table I below depicts the above described variables and the associated counter functions that are used to determine values to the respective counters.

TABLE I variables for ports of a switch and the corresponding counters that determine their value.

| Variable | Counters involved in computation |
|---|---|
| c0 | hops_until_destination(port) |
| c1 | src_dst_counter(current_switch, port) |
| c2 | odd_counter(next_switch(best_port), auxiliary_switch, auxiliary_port, path_number) counter(switch, port) |
| c3 | pn1_h4_counter(bp_hop_1b, best port) pn2_end_counter(bp_hop_0b, path number, best port) counter(switch, port) |
| c4 | switch_dst_counter(switch, dst_port) |
| c5 | counter(switch, port) |
| c6 | counter(switch, port) |

Figure 11A:
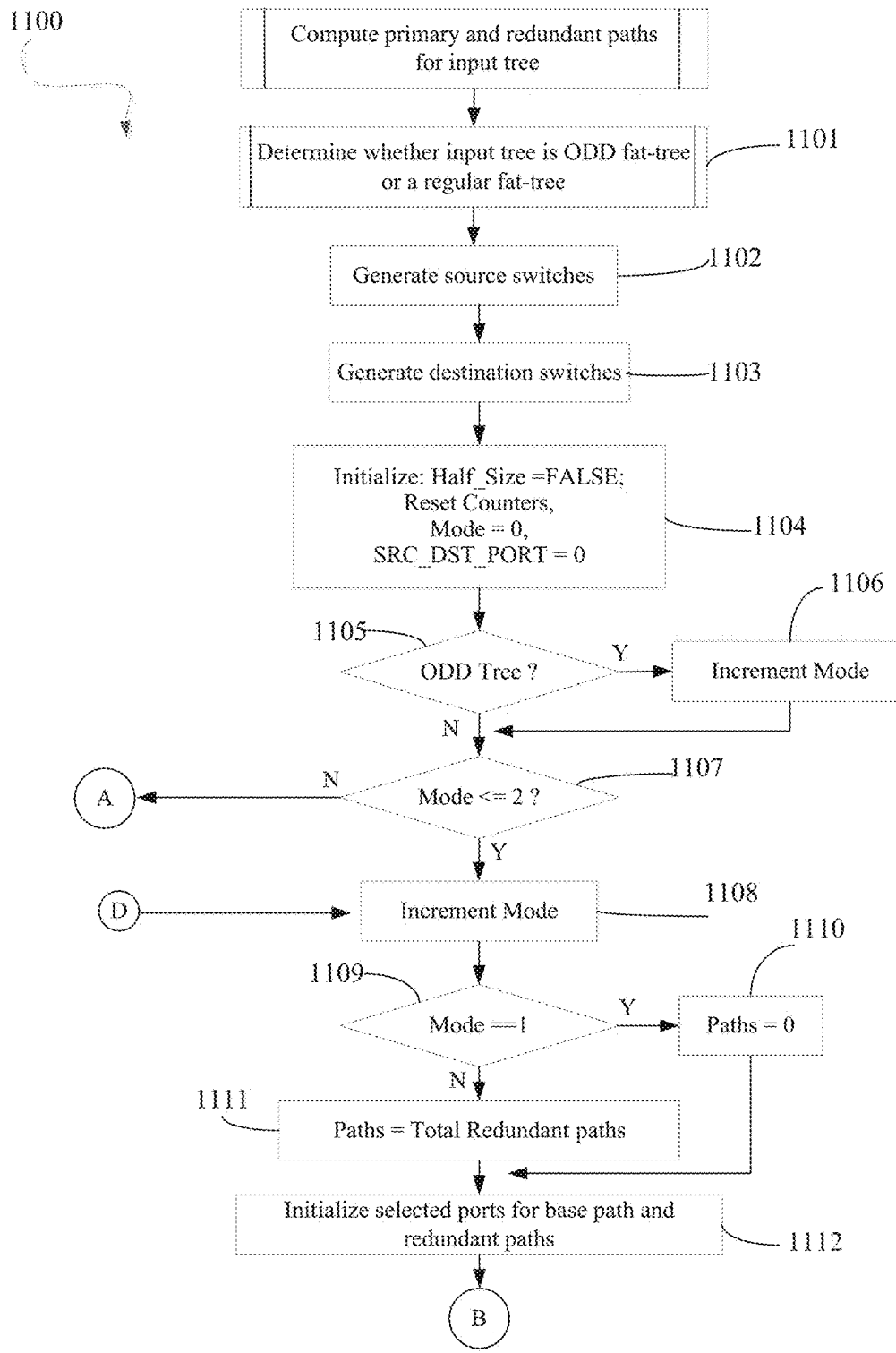
FIGS. 11A, 11B, and 11C depict a flowchart illustrating the steps performed in computing primary and redundant paths in input tree network.
Figure 11B:
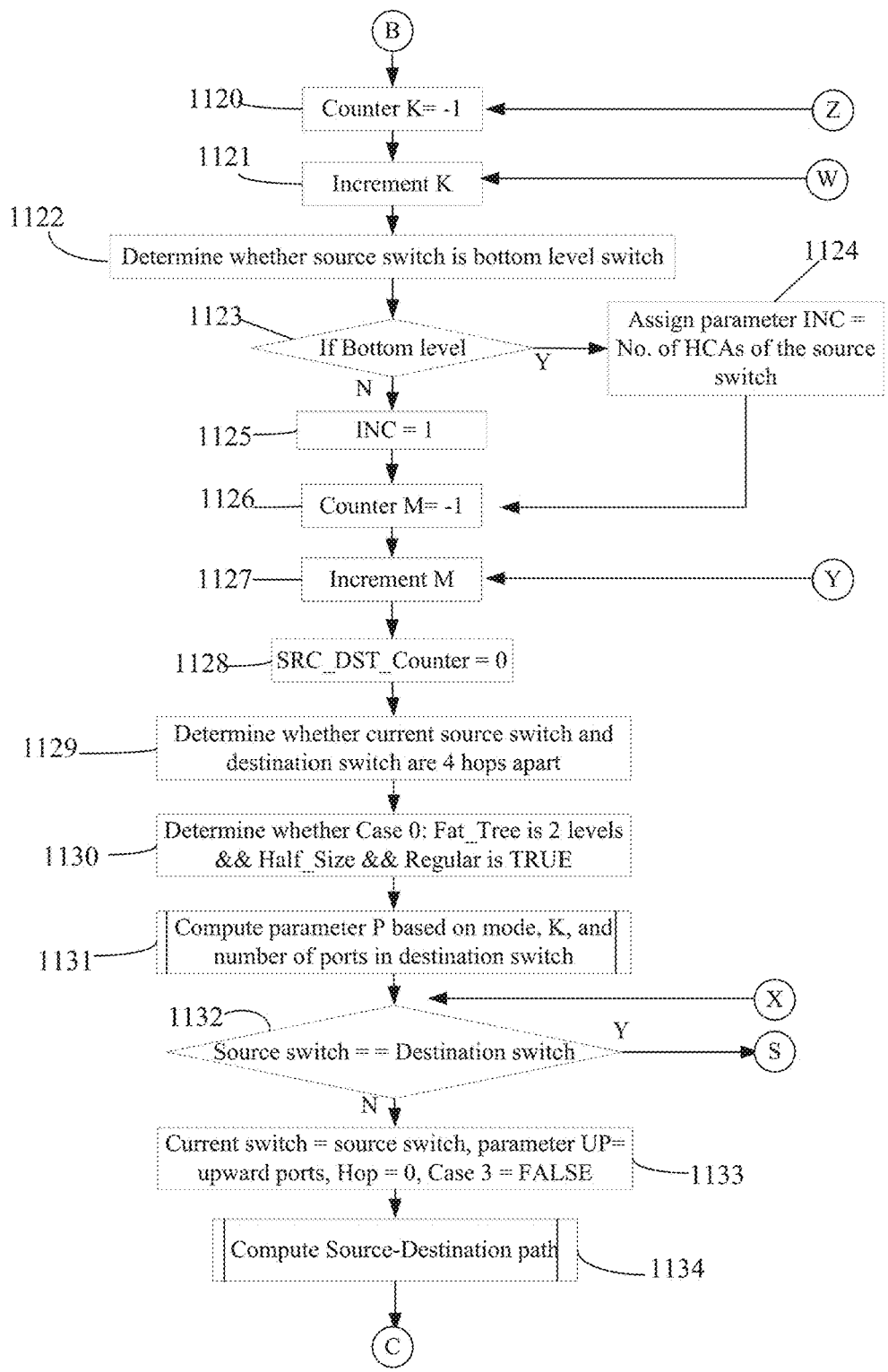
Figure 11C:
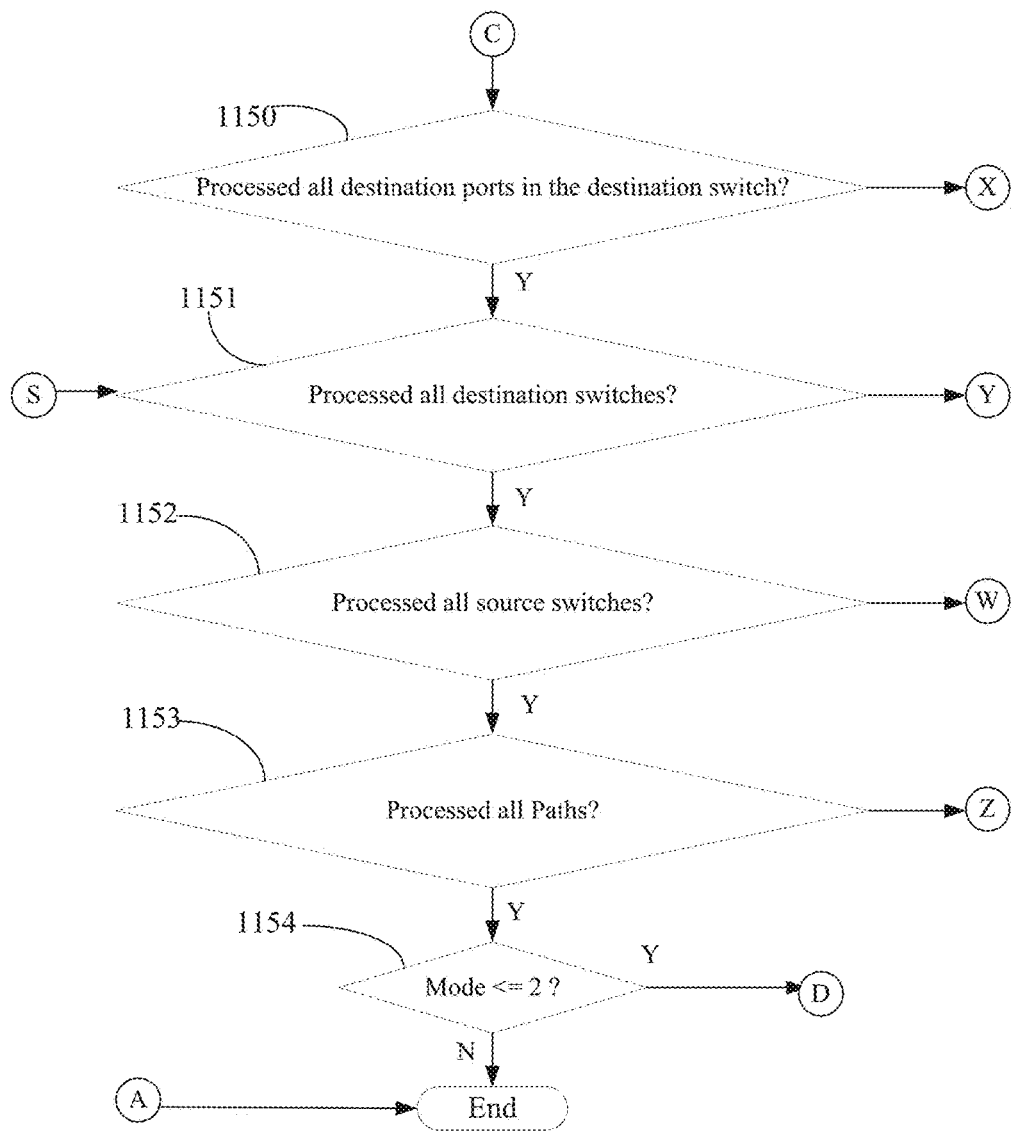

Turning now to FIGS. 11A, 11B, and 11C, there is depicted a flowchart illustrating the steps performed in computing primary and redundant paths for an input tree.

The process commences in step 1101, wherein a query is made to determine whether the input tree topology is one of an Odd fat tree and a regular fat tree. The steps performed in order to determine whether the input tree is an odd fat tree are described previously with reference to FIG. 3.

In steps 1102 and 1103, the process generates source switches and destination switches, respectively. By one embodiment, the source and/or destination switches are generated by ordering the switches by starting at a bottom level switch and searching the remaining switches via the ports attached based on a breadth-first search algorithm (BFS). In doing so, this process provides the advantageous ability of ordering (i.e., grouping) switches based on sub-groups.

Further, in step 1104, a half_size parameter is assigned to FALSE, counters are reset to zero, a parameter corresponding to an operating mode is assigned as mode=0, and a source_destination_port corresponding to the port taken from current switch to reach a particular destination under consideration is initialized to zero.

In step 1105 a query is made to determine whether the input tree is an ODD tree. If the response to the query is affirmative, the process proceeds to step 1106. However, if the response to the query in step 1105 is negative, the process continues to step 1107.

In step 1106, the parameter mode is incremented by one whereafter the process continues to step 1107.

In step 1107, a query is made to determine the value of the parameter mode. Specifically, a query is made to determine whether the parameter mode has a value which is less than or equal to two. If the response to the query is affirmative, the process continues to step 1108. If the response to the query is negative, the process terminates.

In step 1108, the value of the parameter mode is incremented by one.

The process thereafter continues to step 1109, wherein a query is made to determine whether the value of the parameter mode is equal to one. If the response to the query is affirmative, the process continues to step 1110. However, if the response to the query is negative, the process continues to step 1111.

In step 1110, a parameter paths corresponding to a base path is initialized to zero (meaning base path), whereafter the process continues to step 1112.

In step 1111, the parameter paths is initialized to the total number of paths (i.e., base path and redundant paths) that are to be computed for a given source-destination pair.

In step 1112 ports that are to be used for the routing of the base path and the redundant path in the switch under consideration are initialized to zero. For instance, by one embodiment, the parameters: bp_hop_0b, corresponding to the port that is to be selected in hop zero (i.e., the first hop) for the base path; bp_hop_0c, corresponding to the port selected in hop zero for the current redundant path; bp_hop_0r corresponding to the port selected in hop zero for the first full redundant path; and the parameter bp_hop_1b corresponding to the port selected in hop-1 (i.e., the second hop) for the base path are all initialized to zero.

Upon initializing the ports for the base path and the redundant paths (step 1112), the process proceeds to step 1120 as shown in FIG. 11B.

In step 1120 the value of counter k is initialized to −1. The counter k is a parameter corresponding to a position of a source switch in a set of source switches that are generated using the BFS algorithm.

In step 1121, the value of counter k is incremented by one.

In step 1122, a query is made to determine whether the current switch under consideration is a bottom level switch. Specifically, as shown in step 1123, if the response to the query is affirmative the process proceeds to step 1124. If the response to the query is negative, the process proceeds to step 1125.

In step 1124, a parameter INC is assigned a value which corresponds to the number of host channel adapters that are attached to the source switch (i.e., at the bottom level) which is under consideration. The process thereafter continues to step 1126.

In step 1125 (when the switch under consideration) is not a bottom level switch, the parameter INC is assigned a value of 1.

In step 1126, a counter in is initialized to a value of −1. The counter m is a parameter corresponding to a position of a destination switch in a set of destination switches that are generated using the BFS algorithm.

Further, in step 1127, the value of the counter in is incremented by one. In step 1128, the src_dst_counter (described previously with reference to FIG. 6) is initialized to a value of zero.

The process in step 1129 determines whether the current source switch and the destination switch under consideration are 4 hops away (i.e., belong to different subgroups) and stores the Boolean value of the determining in the variable src_dst_4hop. For example, considering a three level fat tree, if the source and destination switches belong to different sub-groups, then the distance (number of hops) from the source switch to the destination switch is 4 hops and src_dst_4hop is therefore set to TRUE.

Further, in step 1130 a query is made to determine whether the current input tree is a fat tree that is 2 levels, and the input tree is a half-size tree and regular.

In step 1131, a function is executed to compute a parameter P that corresponds to the starting port number in the destination switch under consideration, which is to be evaluated first (i.e., verify if the particular port on the destination switch can be utilized to reach the host-channel adaptor). For instance, assume that the destination switch has 10 ports, and the value of the parameter P is 4. Thus, the ports on the destination switch are evaluated in the order 4, 5, 6, 7 . . . 10, 1, 2, and 3. This is done for purpose of balancing the routing paths in the input tree, as balancing may not be the same, especially when counters have same value on each port. Thus, as described next in FIG. 12, a different starting port based on the source switch is utilized to avoid paths reaching the same destination that emerge from different switches in the top level of the input tree. Specific details regarding the computation of the parameter P are described next with reference to FIG. 12.

In step 1132, a query is made to determine whether the source switch is equal to the destination switch. If the response to the query is affirmative, the process continues to step 1151 (FIG. 11C). However, if the response to the switch is negative, the process continues to step 1133.

In step 1133, the current switch under consideration starts from the source switch and the parameter up is assigned the number of upward ports on the switch. Further, the parameter hop is initialized to 0 and an identifier (case3) which corresponds to more than one minimal path from the next switch to the destination is initialized to false.

In step 1134, a function is executed to compute, in a hop-by-hop manner, a routing path from the source switch to the destination switch. Details regarding the route computation are described later with reference to FIGS. 16A-D. The process thereafter proceeds to step 1150 as shown in FIG. 11C.

In step 1150, a query is made to determine whether all the ports in the destination switch have been processed. If the response to the query is affirmative, the process continues to step 1151. If the response to the query is negative, the process loops back to step 1132.

In step 1151, a query is made to determine whether all destination switches have been processed. If the response to the query is affirmative, the process continues to step 1152, else the process loops back to step 1127.

In step 1152, a query is made to determine whether all source switches have been processed. If the response to the query is affirmative, the process continues to step 1153, else the process loops back to step 1121.

Further, in step 1153, a query is made to determine whether all paths (i.e. number of predetermined back up paths and base path) have been processed. If the response to the query is affirmative, the process continues to step 1154, else the process loops back to step 1120.

In step 1154, a query is made to determine whether the parameter mode is less than equal to 2. If the response to the query is affirmative, the process continues to step 1108, else the process terminates.

Figure 12:
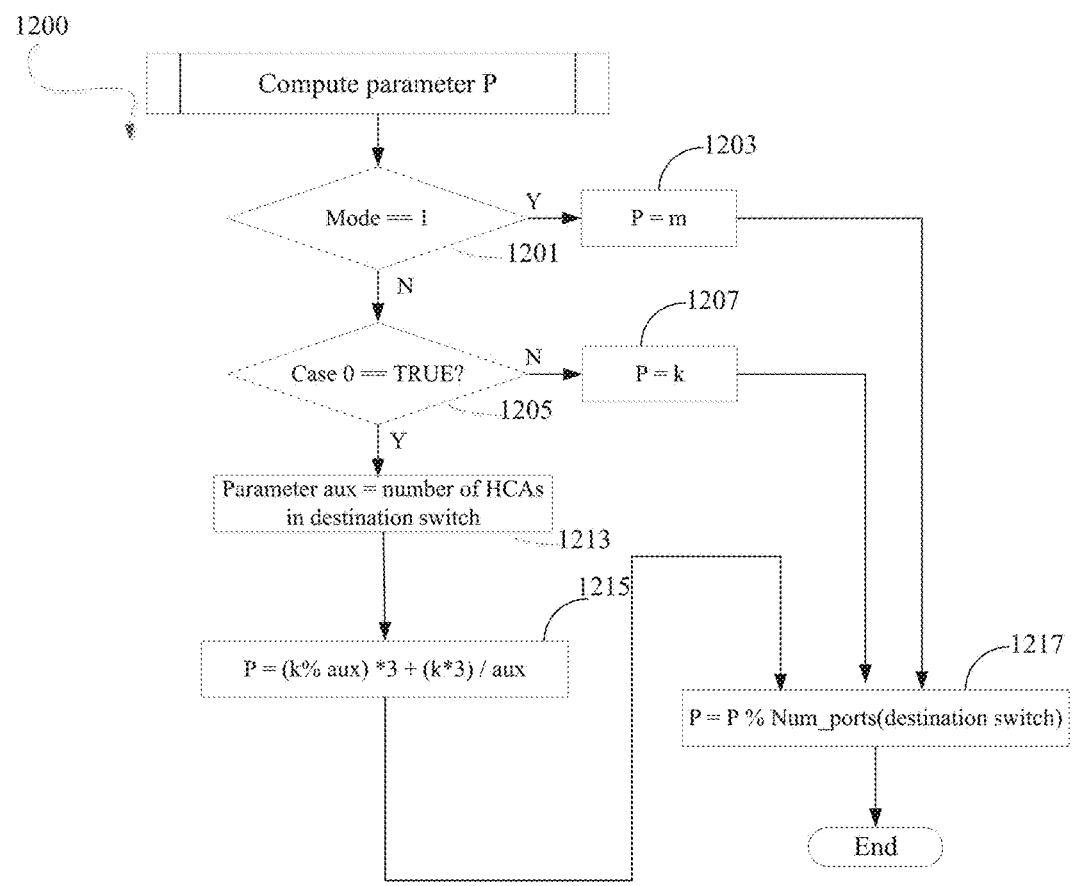
FIG. 12 depicts a flowchart illustrating the steps performed in computing a parameter P corresponding to a port on a destination switch.

FIG. 12 depicts a flowchart 1200 illustrating the steps performed in computing a parameter P corresponding to a port on a destination switch.

In step 1201, a query is made to determine whether the value of parameter mode is 1. If the response to the query is affirmative, the process continues to step 1203. However, if the response to the query is negative, the process continues to step 1205.

In step 1203, the parameter P is assigned the value of counter m that corresponds to a position of the destination switch in a set of destination switches that are generated using the BFS algorithm. Thereafter the process continues to step 1217.

In step 1205, a query is performed to determine whether the input tree satisfies a particular set of criteria (represented as case0). Specifically, a query is made to determine whether the input tree is a 2-level tree, and whether the tree is half-size and a regular tree. If the response to the query is negative, the process continues to step 1207, else the process continues to step 1213.

In step 1207, the parameter P is assigned a value of the counter k that corresponds to a position of the source switch in a set of source switches that are generated using the BFS algorithm. Thereafter the process continues to step 1217.

In step 1213, a parameter aux is assigned a value corresponding to the number of host-channel adapters in the destination switch. Thereafter, in step 1215, the parameter P is updated as follows: $P=(k \% aux)*3+(k*3)/aux$.

Finally, in step 1217, the parameter P is computed as P=P % (Number of ports of the destination switch), whereafter the process of FIG. 12 terminates.

Figure 13:
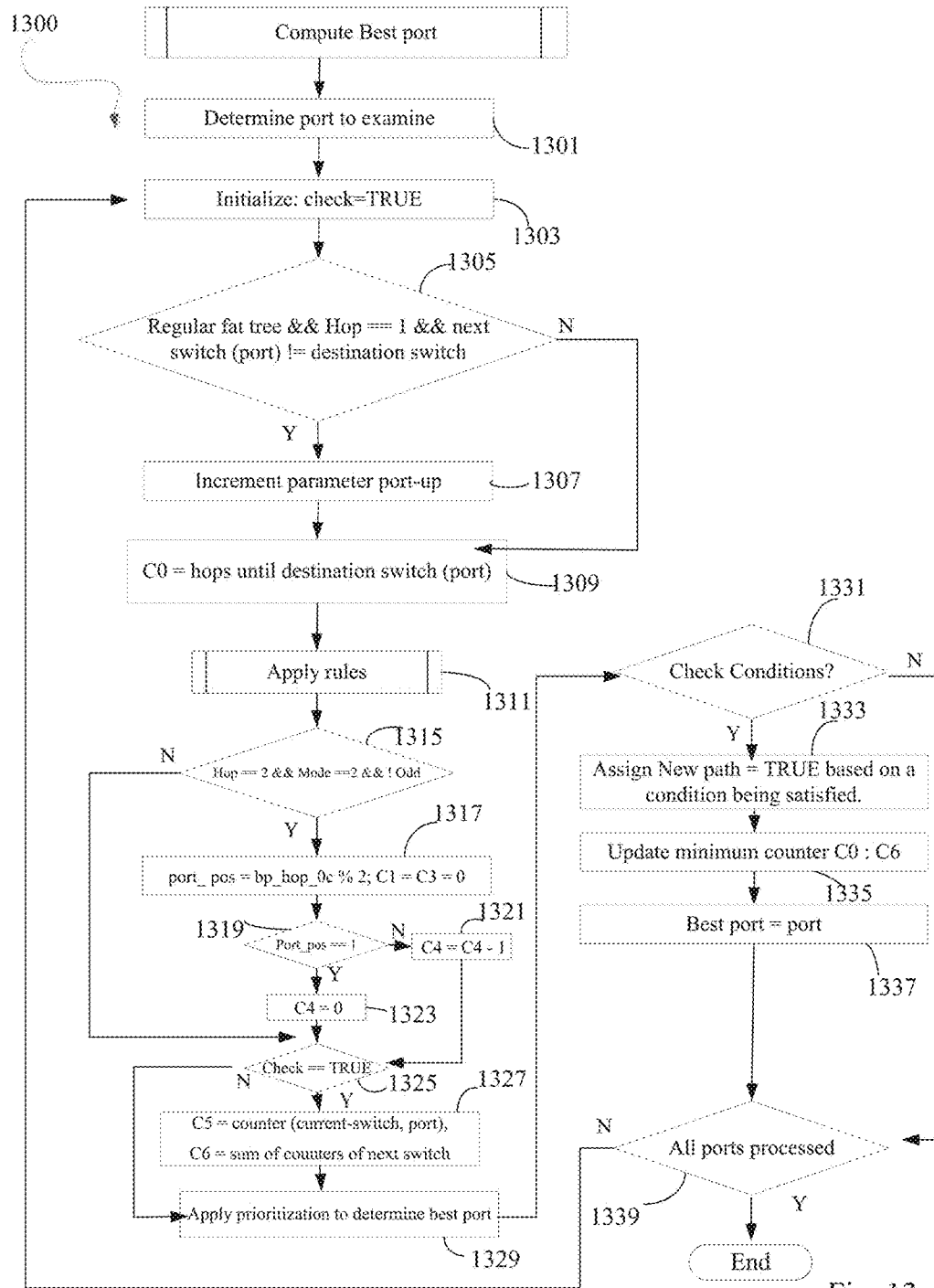
FIG. 13 depicts a flowchart illustrating the steps performed in computing a best (i.e., optimal) port of a switch that is to be used in a route that includes the switch.

Turning now to FIG. 13 is depicted a flowchart 1300 illustrating the steps performed in computing a best (i.e., optimal) port of a switch that is to be utilized for a route that traverses the switch.

In step 1301, each port in the current switch under consideration is evaluated to determine whether the port could be used to route a path.

In step 1303, a parameter check is initialized to TRUE (e.g., the parameter check is initialized to a value of 1).

In step 1305, a query is made to determine whether the input tree is a regular fat tree, and the value of parameter hop is 1, and the next switch is not the destination switch. If the response to the query is affirmative, the process continues to step 1307, else the process continues to step 1309.

In step 1307, a parameter port_up is incremented by one. In step 1309, the counter c0 is initialized to a value that corresponds to the number of hops required to reach the destination switch.

In step 1311, a function (labeled apply rules) is executed to determine which routing rule of a priority of rules is to be applied to determine the routing path. By one embodiment, the type of rule to be applied is determined based on a path number, a type of fat-tree, a hop number, and a number of hops to reach the destination. Details regarding the apply rules function are described next with reference to FIG. 14.

Further, in step 1315, a query is made to determine whether the parameter hop and mode are both equal to 2 and that the input tree topology is not Odd. If the response to the query is affirmative, the process continues to step 1317, else the process jumps to step 1325.

In step 1317, a counter corresponding to port-position (referred to as port_pos) is initialized as: port_pos=bp_hop_0c % 2, wherein hp_hop_0c corresponds to the port selected in hop zero for the current redundant path. Moreover the switch counters c1 and c3 are initialized to zero.

Further, in step 1319 a query is performed to determine whether the counter port_pos is equal to one. If the response to the query is affirmative, the process proceeds to step 1323, else the process continues to step 1321.

In step 1321, the value of counter c4 is decremented by one, whereafter the process continues to step 1325. In contrast, in step 1323, the value of counter c4 is set to zero.

In step 1325, a further query is made to determine whether the parameter check is true. If the response to the query is affirmative, the process continues to step 1327, else the process continues to step 1329.

In step 1327, the value of counter c5 is initialized based on the parameter counter(current_switch, port), which is described previously with reference to FIG. 5. Moreover, the counter c6 is set to a value which corresponds to a sum of counters of the next switch obtained via counter (next_switch, auxiliary_port).

Thereafter the process continues to step 1329, wherein a prioritization policy is applied to determine the best port on the current switch under consideration. In order to compute the prioritization, variables *_lower and *_equals (for the counters c0 to c6) are defined as follows:

$$c0_{lower} = \begin{cases} 1, & \wedge c0 < c0_{min} \\ 0, & \wedge \text{otherwise} \end{cases} \quad (1)$$

$$c0_{equals} = \begin{cases} 1, & \wedge c0 = c0_{min} \\ 0, & \wedge \text{otherwise} \end{cases} \quad (2)$$

$$c1_{lower} = \begin{cases} 1, & \wedge c1 < c1_{min} \\ 0, & \wedge \text{otherwise} \end{cases} \quad (3)$$

$$c1_{equals} = \begin{cases} 1, & \wedge c1 = c1_{min} c0_{equals} = 1 \\ 0, & \wedge \text{otherwise} \end{cases} \quad (4)$$

$$c2_{lower} = \begin{cases} 1, & \wedge c2 < c2_{min} \\ 0, & \wedge \text{otherwise} \end{cases} \quad (5)$$

$$c2_{equals} = \begin{cases} 1, & \wedge c2 = c2_{min} c1_{equals} = 1 \\ 0, & \wedge \text{otherwise} \end{cases} \quad (6)$$

$$c3_{lower} = \begin{cases} 1, & \wedge c3 < c3_{min} \\ 0, & \wedge \text{otherwise} \end{cases} \quad (7)$$

$$c3_{equals} = \begin{cases} 1, & \wedge c3 = c3_{min} c2_{equals} = 1 \\ 0, & \wedge \text{otherwise} \end{cases} \quad (8)$$

$$c4_{lower} = \begin{cases} 1, & \wedge c4 < c4_{min} \\ 0, & \wedge \text{otherwise} \end{cases} \quad (9)$$

$$c4_{equals} = \begin{cases} 1, & \wedge c4 = c4_{min} c3_{equals} = 1 \\ 0, & \wedge \text{otherwise} \end{cases} \quad (10)$$

$$c5_{lower} = \begin{cases} 1, & \wedge c5 < c5_{min} \\ 0, & \wedge \text{otherwise} \end{cases} \quad (11)$$

$$c5_{equals} = \begin{cases} 1, & \wedge c5 = c5_{min} c4_{equals} = 1 \\ 0, & \wedge \text{otherwise} \end{cases} \quad (12)$$

$$c6_{lower} = \begin{cases} 1, & \wedge c6 < c6_{min} \\ 0, & \wedge \text{otherwise} \end{cases} \quad (13)$$

By one embodiment, the process determines the values of variables *_lower and *_equals of equations (1) to (13). Upon computing the values of the variables, in step 1331, a query is made to determine whether at least one condition of a plurality of conditions is satisfied. If the response to the query is negative, the process continues to step 1339, else the process continues to step 1333. Specifically, if the response is affirmative, the current port is selected, else the process performs the prioritization for the next port. By one embodiment, the plurality of conditions is expressed as follows:

| Priority Conditions in Decreasing Order | Conditions |
|---|---|
| Condition 1 | $c0_{lower}$ |
| Condition 2 | $c0_{equals}$ AND $c1_{lower}$ |
| Condition 3 | $c1_{equals}$ AND! (path_taken) AND ! new_path_found) |
| Condition 4 | $c1_{equals}$ AND $c2_{lower}$ |
| Condition 5 | $c2_{equals}$ AND $c3_{lower}$ |
| Condition 6 | $c3_{equals}$ AND $c4_{lower}$ |
| Condition 7 | (odd fat tree) AND $c4_{equals}$ AND $c5_{lower}$ |
| Condition 8 | (odd fat tree) AND $c5_{equals}$ AND $c6_{lower}$ |

Further, in step 1333 parameter new path (new_path_found) is assigned TRUE (based on the condition that no path has been previously taken via another path and no new path previously being found) signifying that a path from the current switch has been found. Thereafter, in step 1335, the counters are updated as follows: $c0_{min}$, $=c0$; $c1_{min}=c1$; $c2_{min}=c2$; $c3_{min}=c3$; $c4_{min}=c4$; $c5_{min}=c5$; and $c_{min}=c6$, and the port that satisfies the above conditions is deemed as the best port to be used in the current switch. Note that $c0_{min}$, $c1_{min}$ etc. is in the figures written as c0_min, c1_min etc.

In step 1339, a query is made to determine if all ports of the current switch have been evaluated. If the response to the query is negative, the process continues to step 1303, else the process terminates.

Figure 14:
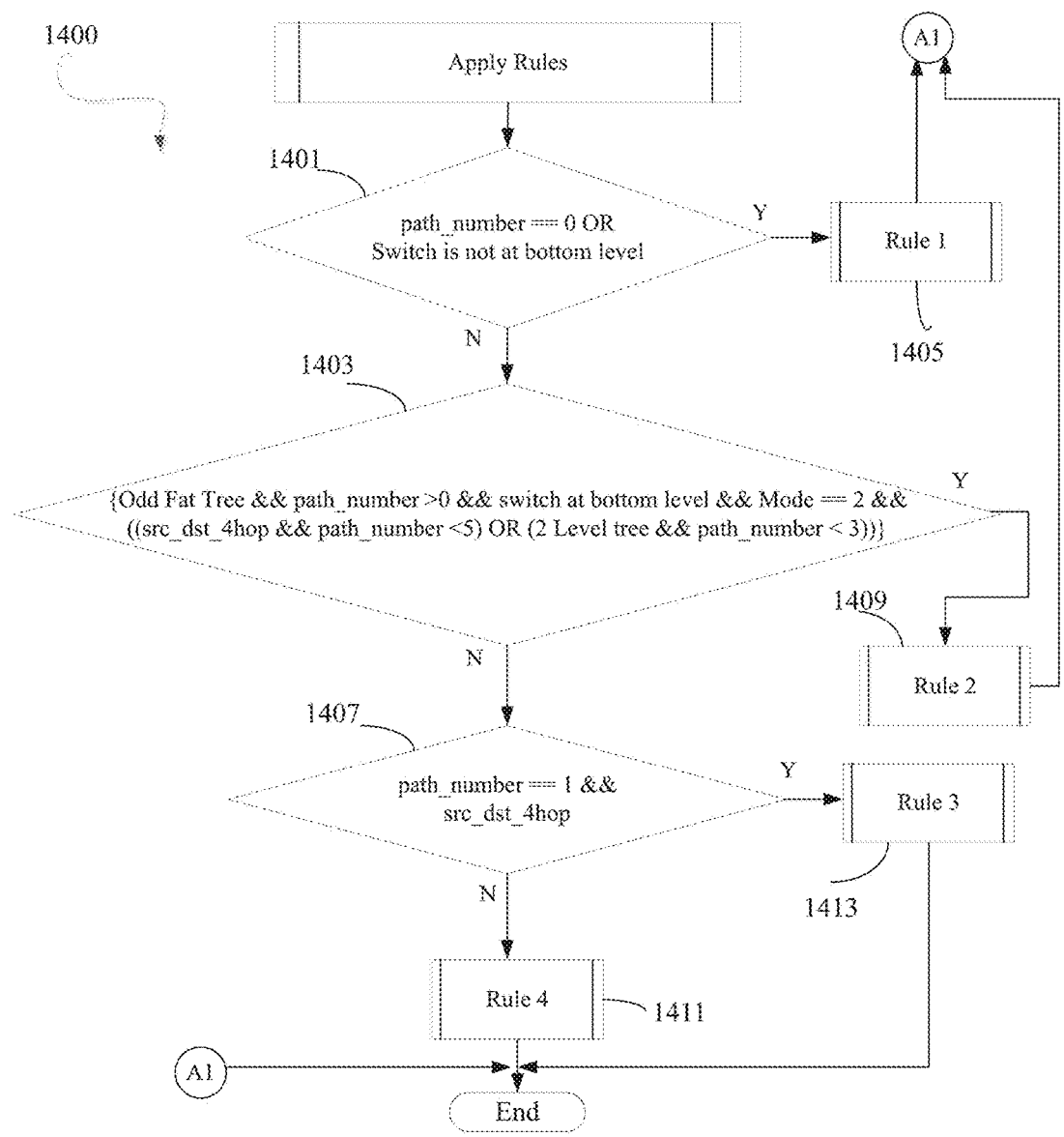
FIG. 14 illustrates a flowchart depicting the steps performed in determining a rule of a plurality of rules that is to be applied in determining the best port.

FIG. 14 illustrates a flowchart 1400 depicting the steps performed in determining a rule of a plurality of rules that is to be applied in determining the best port. By one embodiment, each rule of the plurality of rules manipulates the values of counters c0 to c6 in order to determine the best port to be utilized in a switch.

In step 1401, a query is made to determine whether path_number (corresponding to the path that is under consideration) is equal to 0 or whether the switch under consideration is not a bottom level switch. If the response to the query is affirmative, the process continues to step 1405 to apply a first rule (Rule 1) whereafter the process MOO terminates. However, if the response to the query in step 1401 is negative, the process continues to step 1403, wherein another query is made to determine whether the following condition: (Odd Fat Tree AND path_number>0 AND switch at bottom level AND Mode==2 AND (src_dst_4hop AND path_number<5) OR (2 Level tree AND path_number<3)) is TRUE.

If the response to the query in step 1403 is affirmative, the process continues to step 1409 to apply a second rule (Rule 2) whereafter the process 1400 terminates. However, if the response to the query in step 1403 is negative, the process continues to step 1407, wherein another query is made to determine whether the following condition: path_number==1 && src_dst_4hop (i.e., the source and destination switches are separated by 4 hops) is true. If the response to the query in step 1407 is affirmative, the process continues to step 1413 to apply a third rule (Rule 3) whereafter the process 1400 terminates. However, if the response to the query in step 1407 is negative, the process continues to step 1411 to apply a fourth rule (Rule 4) whereafter the process 1400 terminates. Details regarding the rules 1-4 are described next with reference to FIGS. 15A to 15E.

Figure 15A:
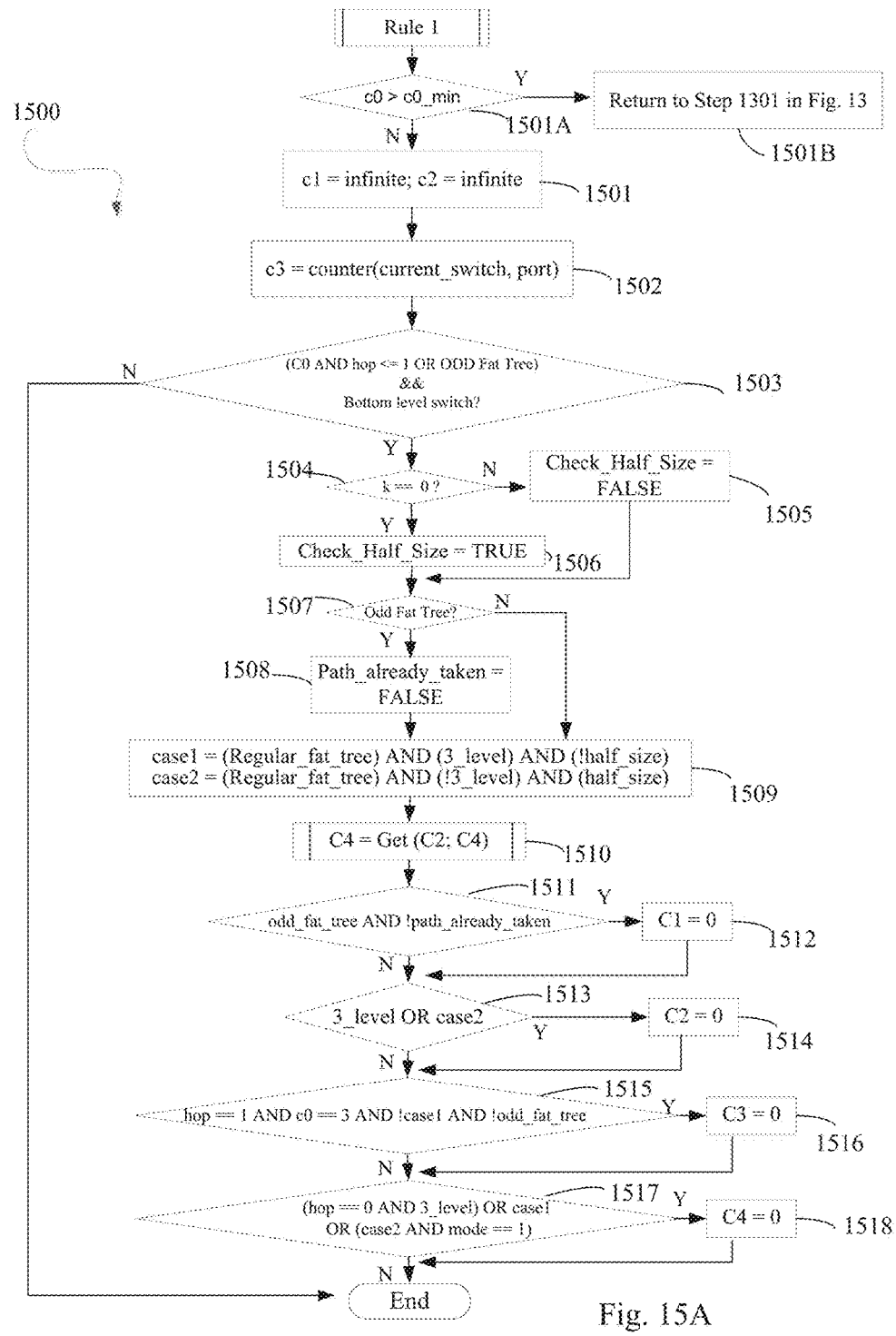
FIG. 15A depicts a flowchart illustrating the steps performed while applying a first rule.

FIG. 15A depicts a flowchart 1500 illustrating the steps performed while applying the first rule. The process commences in step 1501A, wherein a query is made to determine whether the value of c0 counter is greater than $c0_{min}$. If the response to the query is affirmative the process continues to step 1501B, else the process continues to step 1501. Specifically, the process in step 1501A avoids ports that increase the number of hops in the route computation of a source-destination pair. If the response in step is affirmative, then in step 1501B, the process returns to step 1301 in FIG. 13, else the process continues to step 1501.

The process in step 1501 initializes the values of counters a and c2 to infinity. Further, in step 1502, value of counter c3 for the current switch and port is retrieved. Next, crucial ports for base path are computed as follows.

In step 1503 a query is made to determine whether the condition c0 AND hop is less than equal to 1, OR ODD Fat Tree) and the current switch under consideration is a bottom level switch. If the response to the query is negative, the process terminates. However, if the response to the query is affirmative, the process continues to step 1504.

In step 1504, a query is made to determine whether the parameter k is equal to zero. If the response to the query is affirmative, the process continues to step 1506, else the process continues to step 1505. In steps 1505 and 1506, the parameter check_half_size is set to FALSE and TRUE, respectively, whereafter the process continues to step 1507.

In step 1507, a query is made to determine whether the input tree topology is an Odd fat tree. If the response to the query is negative, the process continues to step 1509. However, if the response to the query is affirmative, the process continues to step 1508.

In step 1508, the parameter path_already_taken (corresponding to whether there exists a path through the current switch/port) is set to FALSE. In step 1509, case1 is set as: (Regular_fat_tree) AND (3_level) AND (!half_size), and case2 is set as: (Regular_fat_tree) AND (!3_level) AND (half_size). 3_level indicates whether the input tree topology is a three level fat tree (TRUE) or not (FALSE).

Thereafter, in step 1510, the counter c4 is set to a value which is computed based on a function (i.e., Get(c2, c4) function, that obtains values of several counters) described later with reference to FIGS. 17A and 17B.

In step 1511, a query is made to determine whether the input tree is an odd fat tree and no path is already taken through the current port. If the response to the query is affirmative, the process continues to 1512, wherein the value of counter c1 is set to zero. Thereafter the process continues to step 1513. If the response to the query in step 1511 is negative, the process continues to step 1513, wherein another query is made to determine whether the input tree topology is a three level fat tree and case2 (step 1509) is TRUE.

If the response to the query of step 1513 is affirmative, the process continues to step 1514 wherein the value of counter c2 is set to zero, whereafter the process continues to step 1515. If the response to the query in step 1513 is negative, the process continues to step 1515.

In step 1515, a query is made to determine whether the following condition is valid: hop==1 AND c0==3 AND !case1 AND !odd_fat_tree. If the response to the query is affirmative, the process continues to step 1516, wherein the value of counter c3 is set to zero, whereafter the process continues to step 1517. However, if the response to the query in step 1515 is negative, the process continues to step 1517.

In step 1517 a further query is made to determine whether the following condition is valid: (hop==0 AND 3_level) OR case1 OR (case2 AND mode==1). If the response to the query is affirmative the process continues to step 1518, wherein the value of counter c4 is set to zero, whereafter the process terminates. Note that if the response to the query in step 1517 is negative, the process terminates.

Figure 15B:
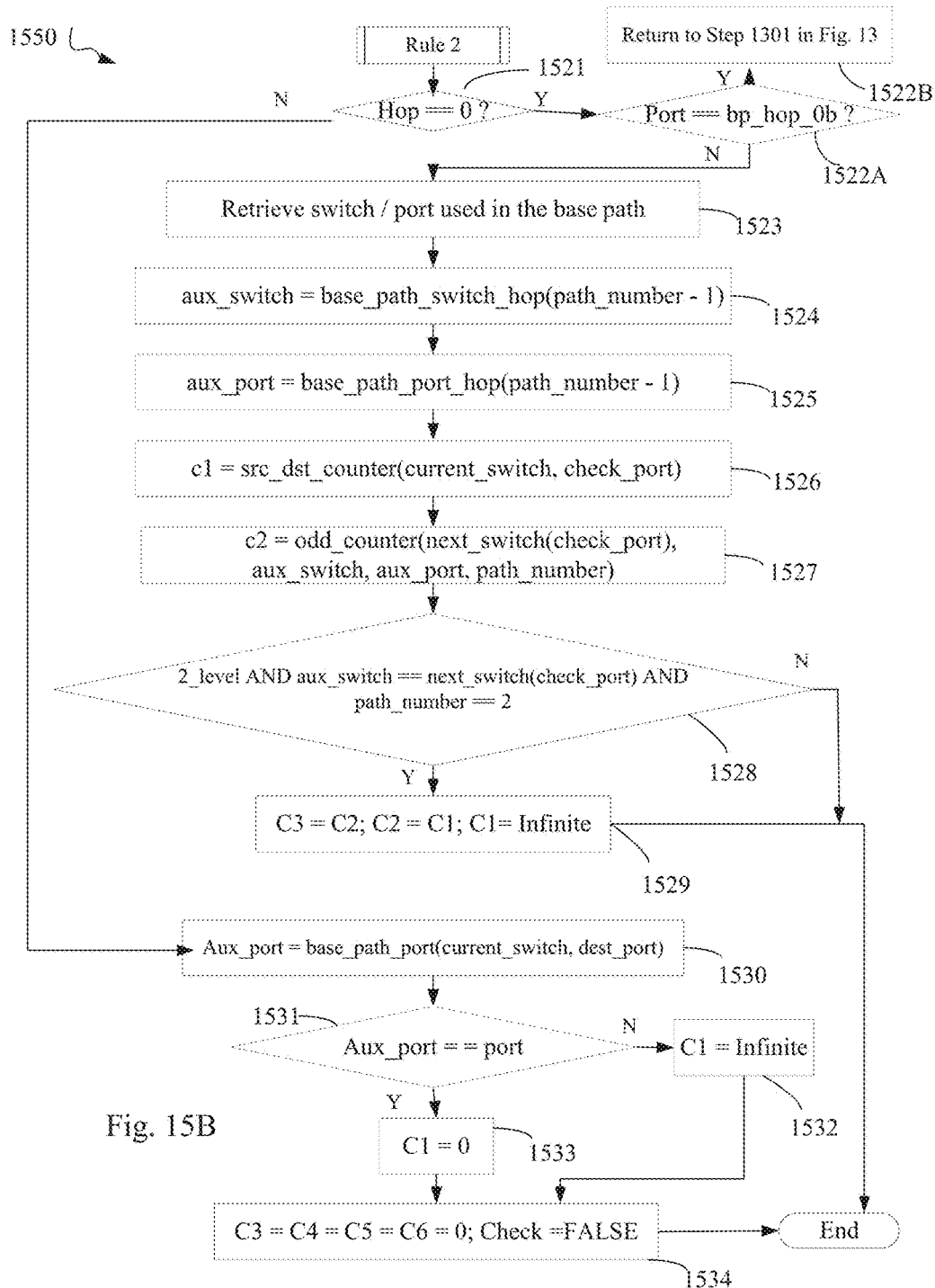
FIG. 15B depicts a flowchart illustrating the steps performed while applying a second rule.

Turning now to FIG. 15B, there is depicted a flowchart 1550 illustrating the steps performed while applying the second rule.

In step 1521, a query is made to determine whether hop is equal to zero. If the response to the query is negative, the process continues to step 1530. However, if the response to the query is affirmative, the process continues to step 1522A. In step 1522A, a further query is made to determine whether the current port under consideration is the same port as that used by the base path in the bottom level switch. If the response to the query in step 1522A is affirmative, the process continues to step 1522B, wherein the process exits the process of FIG. 15B, and continues to step 1301 in FIG. 13. However, if the response to the query is negative, the process continues to step 1523.

In step 1523, the switch and port traversed by the base path during hop==path number-1 are retrieved. Specifically, as shown in steps 1524 and 1525 the switch and port traversed by the base path in hop number==path number-1, are obtained, and stored in the variables aux_switch and aux_port, respectively.

In step 1526, counter for the current switch-port (i.e., src_dst_counter as described previously with reference to FIG. 6) used only for the current path (i.e., base and redundant ones for the same source-destination pair) is obtained and stored in counter c1. Note that this counter is reset for each new source-destination pair.

In step 1527, counter c2 is set as follows: c2=odd_counter (next_switch(check_port), aux_switch, aux_port, path_number). Specifically, the counter takes into account the next switch, path number, and switch and port taken in base path in a hop number related to the current path number. Further the process continues to step 1528.

In step 1528, a query is made to determine whether the following condition is valid: 2_level AND aux_switch==next_switch(check_port) AND path_number==2. If the response to the query is affirmative, the process continues to step 1529, else the process terminates.

In step 1529, the values of counters are manipulated as follows: c3=c2; c2=c1; and c1=infinity. Thereafter, the process terminates.

Note that if the response to the query in step 1521 is negative, the process continues to step 1530, wherein the port utilized by the base path in the current switch (i.e., the switch under consideration) is stored in the variable aux_port, i.e. auxiliary port. Thereafter, the process continues to step 1531, wherein the process prioritizes using the same port as the base path for the switch when hop is not equal to zero. Specifically, as shown in step 1531, if auxiliary port is equal to the port under consideration, then the counter c1 is set to zero in step 1533, else in step 1532, the counter c1 is set to infinity. Thereafter, the process continues to step 1534, wherein the counters which are not taken into account by the second rule are set to zero. Specifically, as shown in step 1534, the counters c3, c4, c5, and c6 are all set to zero and the parameter check is set to false. Thereafter, the process 1550 of FIG. 15B terminates.

Figure 15C:
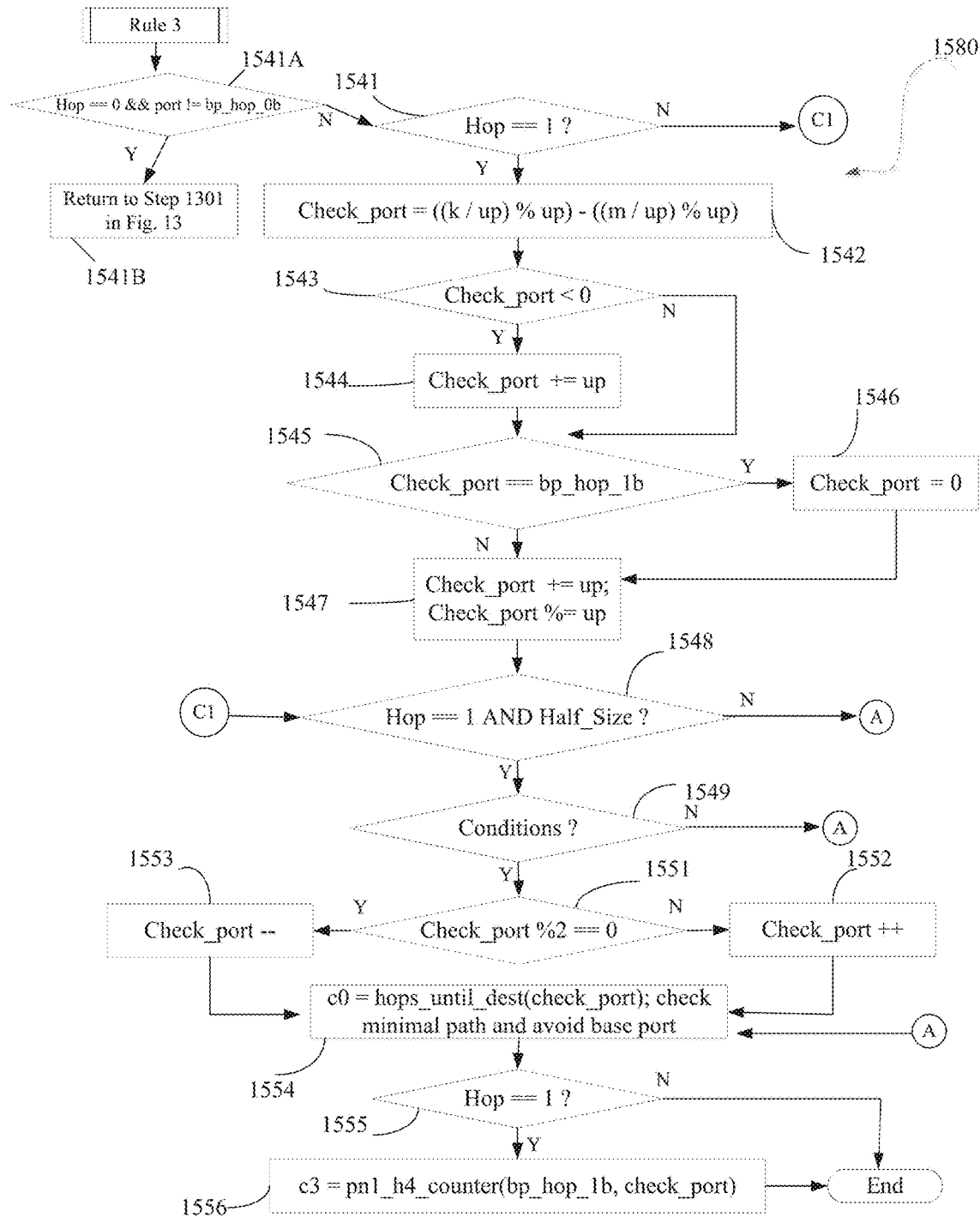
FIG. 15C depicts a flowchart illustrating the steps performed while applying a third rule.

Turning now to FIG. 15C, there is depicted a flowchart 1580 illustrating the steps performed while applying the third rule. The process commences in step 1541A wherein a query is made to determine whether hop is equal to zero and the current port under consideration is not equal to the port utilized by the base path in the bottom level switch. If the response to the query is affirmative, the process continues to step 1541B, wherein the process loops back to step 1301 in FIG. 13. However, if the response to the query is negative, the process continues to step 1541.

In step 1541, a query is made to determine whether hop is equal to one. If the response to the query is affirmative, the process continues to step 1542. If the response to the query is negative, the process continues to step 1548.

In step 1542, parameter check_port is computed as: check_port=((k/up) % up)-((m/up) % up), wherein up is number of upwards ports of the current switch.

The process in step 1543 performs a query to determine whether the value of the parameter check_port is less than zero. If the response to the query is affirmative, the process continues to step 1544, else the process continues to step 1545.

In step 1544, the parameter check_port is increased by the parameter up (i.e. the number of upwards ports of the switch), whereafter the process continues to step 1547.

In step 1545, another query is performed to determine whether check_port is equal to bp_hop_1b (i.e., port selected in hop 1 by the base path). If the response to the query is affirmative, the value of check_port is set to zero in step 1546, whereafter the process continues to step 1547.

If the response to the query in step 1545 is negative, the process continues to step 1547 wherein the parameter check_port is incremented by the parameter up, and further the computation check_port=check_port % up is performed (wherein the % sign corresponds to the modulo operation).

The process then continues to step 1548, wherein another query is performed to determine if hop is equal to 1, and whether the input tree topology is Half-size. If the response to the query is affirmative, the process continues to step 1549, else the process continues to step 1554.

In step 1549, a query is made to determine whether a set of conditions is satisfied. Specifically, the query determines if the following conditions are satisfied.

(! ((bp_hop_0c % 2==1 AND check_port % 2==1 AND p % 2==1) OR (bp_hop_0c % 2==1 AND check_port % 2==0 AND p % 2==0) OR (bp_hop_0c % 2==0 AND check_port % 2==1 AND p % 2==0) OR (bp_hop_0c % 2==0 AND check_port % 2==0 AND p % 2==1)))
Specifically, the query determines that when fat-tree is half_size, the redundant paths are routed based on the port chosen in hop 0 (i.e., bp_hop_0c), current port, and the destination port.

If the response to the query in step 1549 is affirmative, the process continues to step 1551, else the process continues to step 1554.

In step 1551, the process makes a query to determine whether the value of check_port % 2 is equal to zero. If the response to the query is affirmative, the process continues to step 1553, wherein the value of check_port is decremented by one. If the response to the query of step 1551 is negative, the process continues to step 1552, wherein the value of the parameter check_port is incremented by one. Thereafter, as shown in FIG. 15C, the process continues to step 1554.

In step 1554, the counter c0 is set to a value that corresponds to the number of hops until the destination switch is reached. Further, in step 1554, a query is also made to determine whether the path is a minimal path. Specifically, a query is made to determine whether c0 is greater than $c0_{min}$. If the response to the query is affirmative, the process continues back to step 1301 in FIG. 13. Moreover, by one embodiment, a further query is made to avoid taking the same port as that used by the base path in current hop. Specifically, a query is made to determine whether hop is equal to one and the current port is equal to the output port selected in a middle level switch by the base path (i.e., bp_hop_1b). If the response to this query is affirmative, the process continues to step 1301 of FIG. 13, else the process continues to step 1555.

In order to avoid taking the same port as the base path, in step 1555 a query is made to determine whether hop number is equal to one. If the response to the query is affirmative, the process in step 1556 retrieves the value of pn1_h4_counter when the port for second hop in the base path equals the value of the parameter bp_hop_1b and the second hop in the redundant path number 1 equals the value of the parameter check_port. Thereafter, the process of FIG. 15C terminates. If the response to the query in step 1555 is negative, the process of FIG. 15C terminates.

Figure 15D:
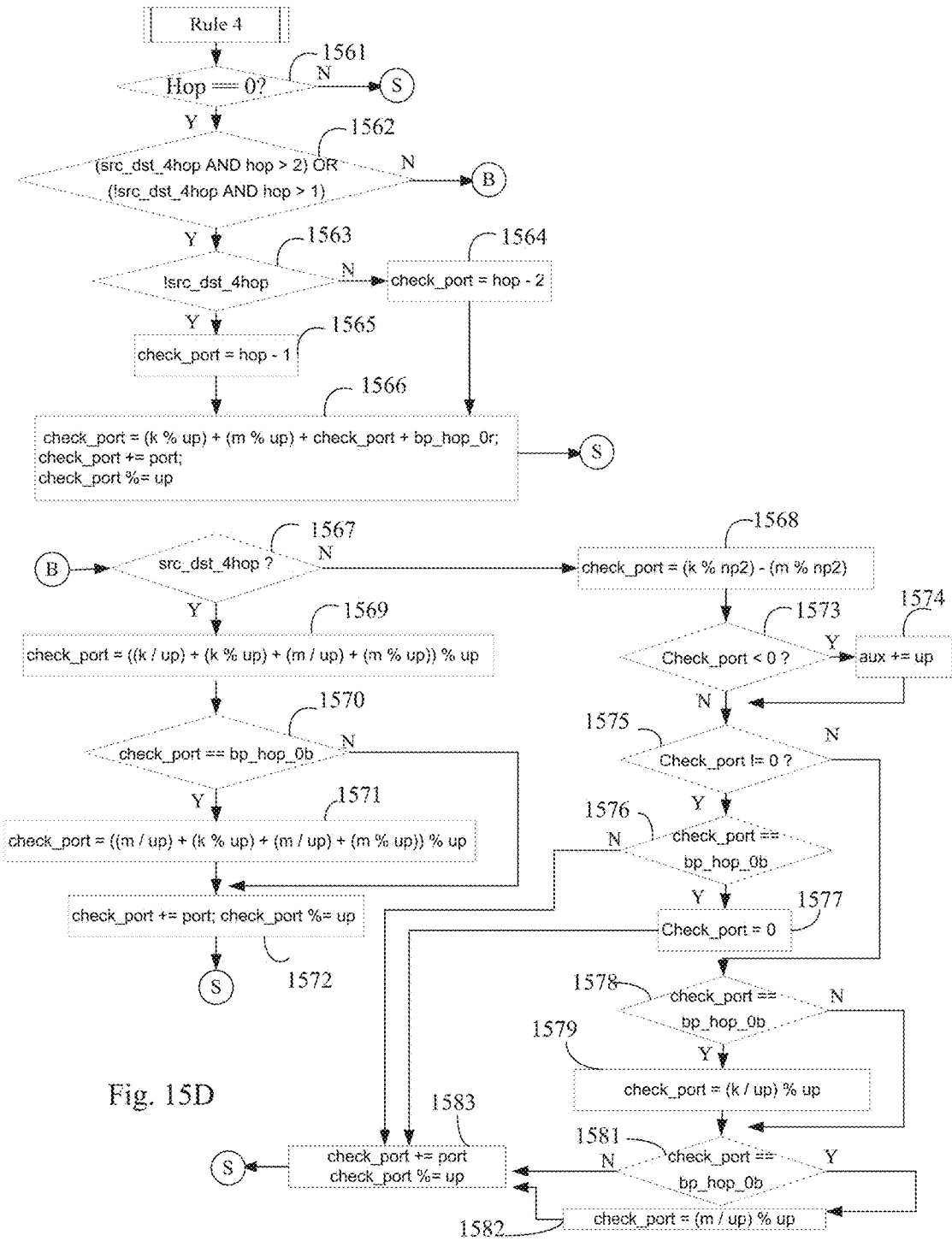
FIGS. 15D and 15E depict a flowchart illustrating the steps performed while applying a fourth rule.
Figure 15E:
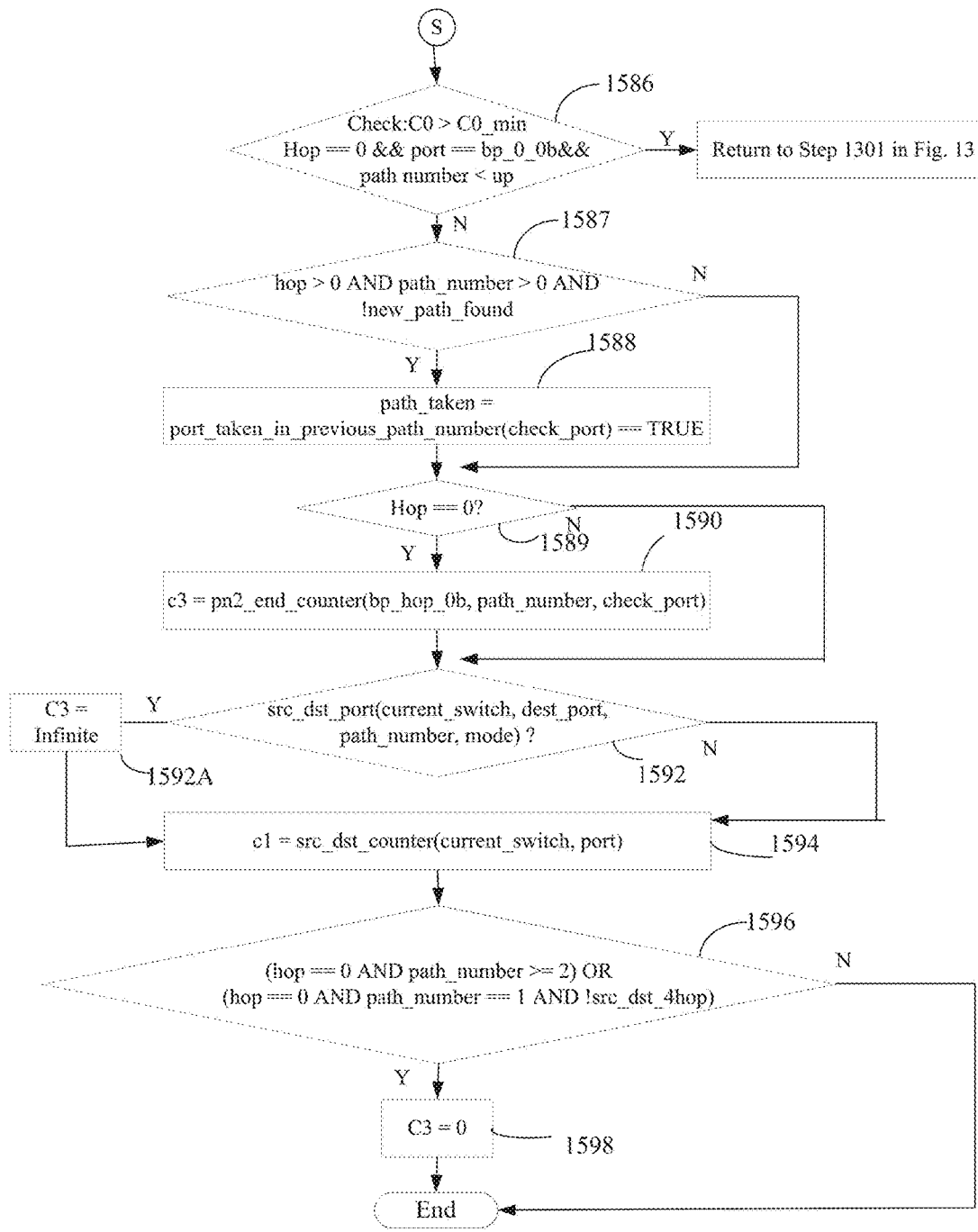

FIGS. 15D and 15E depict a flowchart illustrating the steps performed while applying a fourth rule.

The process commences in step 1561, wherein a query is made to determine whether the hop parameter is equal to zero. If the response to the query is affirmative, the process continues to step 1562, else the process continues to step 1585 (FIG. 15E).

In step 1562 a query is made to determine whether at least one of the following two conditions is satisfied: condition (a) whether the source node and destination node are four hops away and the parameter hop is greater than two, or condition (b) whether the source node and the destination node are not four hops away and the parameter hop is greater than one. If the response to the query in step 1562 is affirmative, the process continues to step 1563, else the process continues to step 1567.

In step 1563, a query is made to determine whether the source-destination node pair is not separated by a distance of four hops. If the response to the query is negative, the process continues to step 1564, else the process continues to step 1565.

In step 1564, the check_port parameter is initialized to a value of hop−2, whereafter the process continues to step 1566. In step 1565, the check_port parameter is initialized to a value of hop−1, whereafter the process continues to step 1566.

In step 1566, the port is selected taking into account: source switch position (i.e., k), destination switch position (i.e., m), port computed in current switch, and the first hop in full redundant path (i.e., hp_hop_0r), by using the using the equations depicted in step 1566. Thereafter, the process continues to step 1586 (FIG. 15E).

The process in step 1567 performs a query to determine whether the source node and the destination node are separated by a distance of four hops. If the response to the query is affirmative, the process continues to step 1569, else the process continues to step 1568.

In step 1569, the value of the parameter check_port is computed as follows: checkport=((k/up)+(k % up)+(m/up)+(m % up)) % up. Further, in step 1570, the process determines whether the value of the check_port parameter is equal to the port that is utilized by the base path in the bottom level switch. If the response to the query of step 1570 is affirmative, the process continues to step 1571, wherein the value of the check_port parameter is updated as: check_port=((m/up)+(k % up)+(m/up)+(m % up)) % up. If the response to the query in step 1570 is negative, the process continues to step 1572, wherein the value of the check_port parameter is updated as: check_port=check_port+port, and further check_port=check_port % up. Thereafter, the process continues to step 1586 in FIG. 15E.

If the response to the query of step 1567 is negative (i.e., the source node and the destination node are located in the same sub-group, or in other words, the distance between the source node and the destination is not four hops), the value of the check_port parameter is initialized as check_port=(k % np2)−(m % np2).

Further, in step 1573 the process performs a query to determine if the value of the check_port parameter is less than zero. If the response the query is negative, the process continues to step 1576, else the process continues to step 1574.

In step 1574, the value of the aux parameter is incremented by value up (i.e., number of upward ports on a switch), whereafter the process continues to step 1575.

In step 1575, a query is made to determine whether the check_port parameter is not equal to zero. If the response to the query is negative, the process continues to step 1578, else the process continues to step 1576.

In step 1576, a query is made to determine whether the value of the check_port parameter is equal to the port number that is used by the base path in the bottom level switch. If the response to the query is negative, the process continues to step 1583. However, if the response to the query is affirmative, the process continues to step 1577, wherein the value of the check_port parameter is made zero, whereafter the process continues to step 1583.

In step 1578, the process performs a query to determine whether the value of the check_port parameter is equal to the port number that is used by the base path in the bottom level switch. If the response to the query is negative, the process continues to step 1581. However, if the response to the query is affirmative, the process continues to step 1579, wherein the value of the check_port parameter is computed as: check_port=(k/up) % up, whereafter the process continues to step 1581.

In step 1581, the process performs a query to determine whether the value of the check_port parameter is equal to the port number that is used by the base path in the bottom level switch. If the response to the query is negative, the process continues to step 1583. However, if the response to the query in step 1581 is affirmative, the process continues to step 1582, wherein the value of the check_port parameter is computed as: check_port=(m/up) % up, whereafter the process continues to step 1583.

In step 1583, the value of the check_port parameter is updated as: check_port=check_port+port, and further check_port=check_port % up. Thereafter, the process continues to step 1586 in FIG. 15E.

Turning to FIG. 15E, in step 1586, the process verifies if the counter c0 is greater than $c0_{min}$ and whether the condition: hop==0 && port==bp_0_0b && path_number<up is valid. If these conditions are valid, the process exits the flowchart of FIG. 15E, and continues to step 1301 in FIG. 13. However, if the above conditions are not valid, the process continues to step 1587. The query in step 1586 is performed in order to split paths after first hop, when the number of redundant paths is greater than the upwards paths number (i.e., the number of upwards ports in a switch denoted as "up").

In step 1587, a query is made to determine whether the following conditions: hop greater than 0, AND path_number is greater than 0 AND no new path is found, are valid. If the response to the query in step 1587 is negative, the process continues to step 1589, else the process continues to step 1588.

In step 1588, path_taken is assigned the value TRUE only if the port with the number check_port has already been taken by a previous path, to ensure that the current path is preferably a path not taken before. Otherwise, the parameter path_taken is assigned the value FALSE. Thereafter, the process continues to step 1589, wherein a query is made to determine if value of the parameter hop is zero. If the response to the query is affirmative, the process continues to step 1590, else the process continues to step 1592.

In step 1590, the c3 counter is updated based on the pn2_end_counter (described previously). Specifically, the value of the pn2_end_counter is read for the output port taken by the base path in the first hop (i.e. bp_hop_0b), the parameter path_number and the parameter check_port.

By one embodiment, src_dst_port( ) function, obtains the stored port that is to be taken in current switch (parameter current_switch) when going to destination port (the parameter dest_port), taking into account the path number (parameter path_number) and the current mode (parameter mode). In step 1592, a query is made to determine if a value for src_dst_port is already stored for these four parameters. If the response to the query is affirmative, the process continues to step 1592A, wherein the value of counter c3 is made infinite. Thereafter, the process continues to step 1594. If the response to the query in step 1592 is negative, the process continues to step 1594.

In step 1594, the value for counter c1 of the current switch and port is obtained. Further, the process continues to step 1596, wherein a query is made to determine whether the following conditions: (hop==0 AND path_number>=2) OR (hop==0 AND path_number==1 AND !src_dst_4hop) is valid. If the response to the query is affirmative, the process continues to step 1598, wherein the value of c3 counter is set to zero, whereafter the process terminates. Note that if the response to the query in step 1596 is negative, the process of FIG. 15E terminated.

FIGS. 16A-16D illustrate a flowchart depicting the steps performed in computing a routing path for a source-destination pair.

The process commences in step 1601, wherein a query is made to determine whether the current switch under consideration is the destination switch. If the response to the query is affirmative, the process simply terminates (shown by connector 'A' in FIG. 16D). However, if the response to the query is negative, the process continues to step 1603, wherein the counters: $c0_{min}$, $c1_{min}$, $c2_{min}$, $c3_{min}$, $c4_{min}$, $c5_{min}$, and $c6_{min}$ are initialized to infinity.

Further, in step 1605 the parameter best_port (i.e., the best port to be taken in the current switch to reach the next switch in the routing path) and the parameter port_up (i.e., the port to be taken in the current switch) are both initialized to zero.

The process in step 1607 executes the function of computing the best port in the current switch. Details regarding this function are described previously with reference to FIG. 13.

In step 1609, a query is made to determine whether the switch under consideration is a bottom level switch (parameter b_level), or, if the current switch under consideration is not a bottom level switch and the current path being computed is a base path (i.e. path_number==0), whether no best port has been computed and stored yet (i.e. !src_dst_port (current_switch, dest_port, path_number, mode)). Note that the parameter src_dst_port obtains the stored port to take in the current switch when going to the destination port taking into account the path number and the mode of operation.

If the response to the query is negative, the process continues to step 1613. However, if the response to the query is affirmative, the process continues to step 1611 wherein a check_best_port function is executed to recheck the computed best port. Details regarding the check_best_port function are described later with reference to FIG. 18.

In step 1613, a query is made to determine if the path number of the currently computed path is zero. If the response to the query is negative, the process continues to step 1617. However, if the response to the query is affirmative, the process continues to step 1615, wherein the value of the counter: counter(current_switch, best_port) is incremented by one. Specifically, as described previously with reference to FIG. 6, this counter is incremented in every base path for every switch/port traversed.

In step 1617, a query is made to determine the value of the parameter case3. Specifically, a query is made to determine whether the following condition is valid: src_dst_counter (current_switch, best_port)>0 AND hop==0 ANT b_level AND 2_level AND path_number>0. If the response to query is negative, the process continues to step 1621 wherein case3 is assigned FALSE. However, if the response to the query is affirmative, the process continues to step 1619, wherein the parameter case3 is assigned TRUE only if more than one minimal path exists from the next switch to the destination switch.

Further, the process in step 1623 increments the value of the counter src_dst_counter by INC, which was determined in step 1124 (in FIG. 11B). Specifically, the process increments the temporary switch/port counter. Note that this counter is reset every time that a new source-destination pair is computed. The purpose of this counter is to split redundant paths for the same source-destination pair between them. This counter is incremented for every base/redundant path in every switch/port traversed for the current source-destination pair.

Figure 16A:
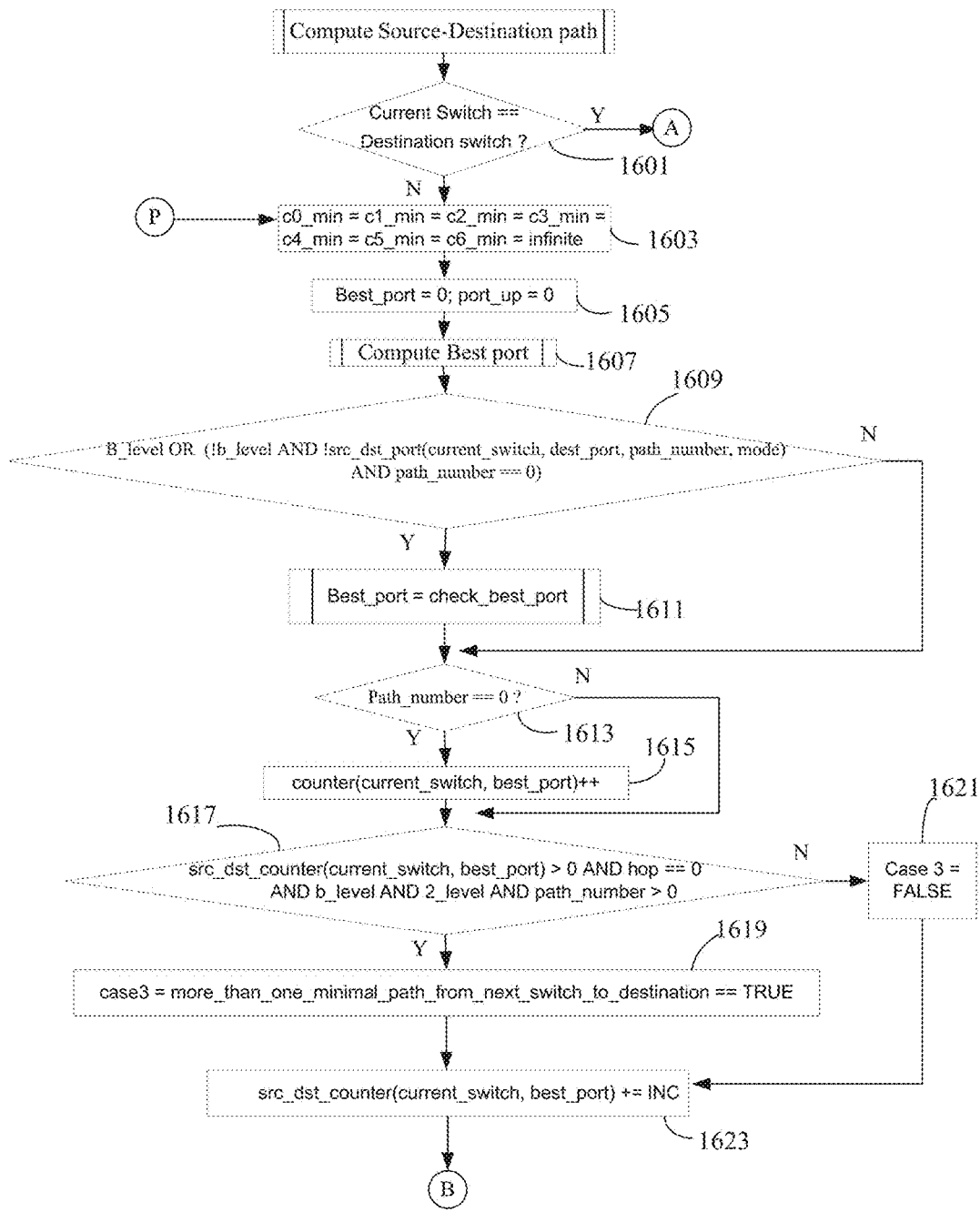
FIGS. 16A, 16B, 16C, and 16D illustrate a flowchart depicting the steps performed in computing a source-destination path.
Figure 16B:
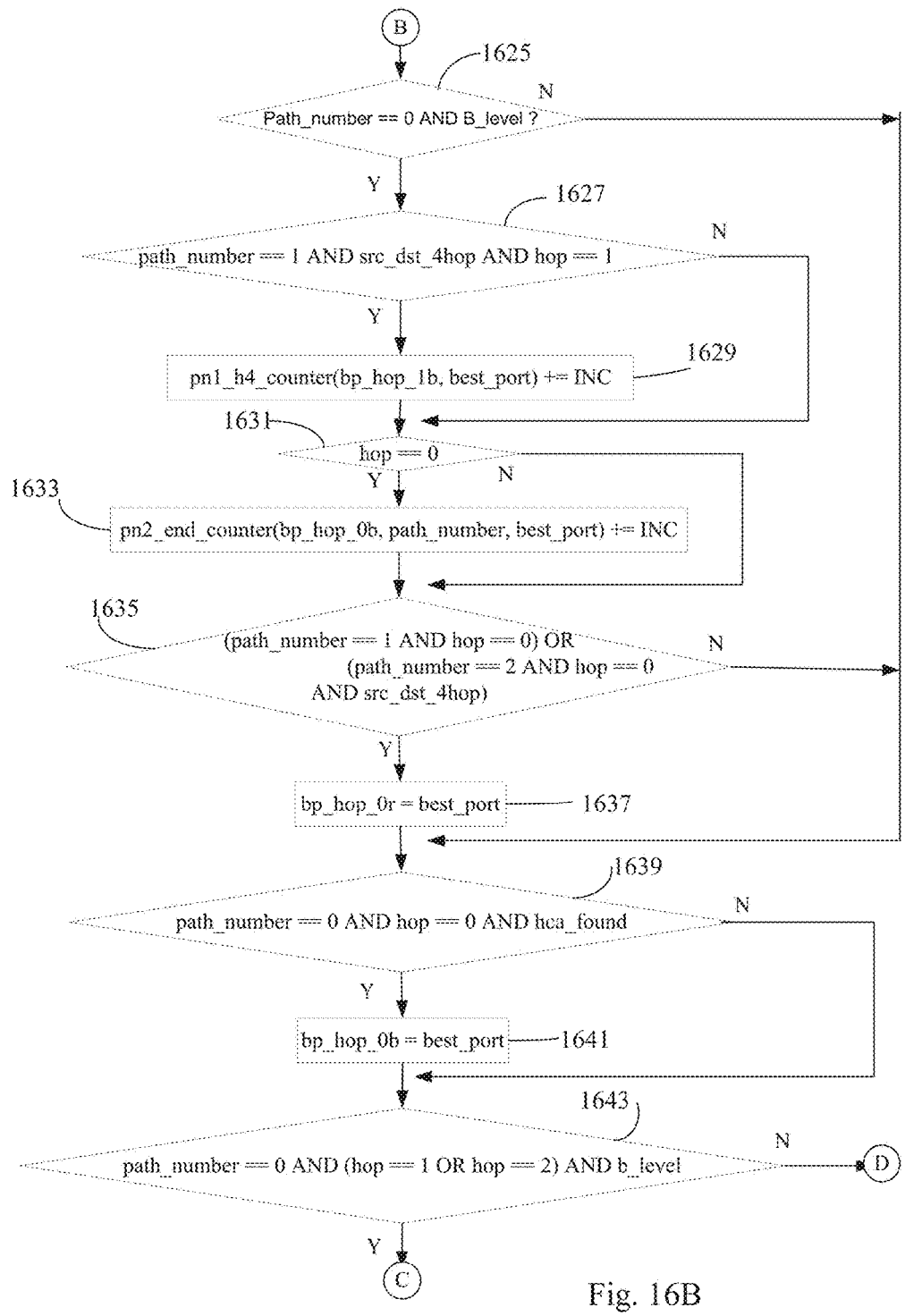

Further, the process continues to step 1625 as shown in FIG. 16B, wherein a query is made to determine whether the path number (of the path currently under consideration) is zero and whether the switch under consideration is a bottom level switch. If the response to the query is affirmative, the process continues to step 1627, whereas if the response to the query is negative, the process continues to step 1639.

The process in step 1627 performs a query to determine whether the pn1_h4_counter( ) (described previously with reference to FIG. 8B) is to be incremented. Note that the pn1_h4_counter( ) is incremented when it is the first redundant path being computed, and there are four hops from source to destination (i.e. the source and destination are in different groups of a 3-level fat-tree), and the hop number is 1 (i.e., the second hop, i.e. a middle level switch in a 3-level fat-tree). As stated previously with reference to FIG. 8B, there is a different counter for every port number selected in the second hop in the base path together with the current selected port number in the second hop. Furthermore, this counter takes into account two port numbers for the second hop in the base path and second hop in the first redundant path that can be in different switches in contrast to other counters. As such, this counter is very useful for regular fat-trees.

If the response to the query in step negative, the process continues to step 1631. If the response to the query if affirmative, the process continues to step 1629, wherein the value of the counter: pn1_h4_counter( ) is incremented by INC, which was determined in step 1124 (in FIG. 11B).

Further, the process in step 1631 performs a query to determine whether the value of parameter hop is zero. Note that this query is performed in order to determine whether the counter: pn2_end_counter( ) (described previously with reference to FIG. 9B) is to be incremented by INC. This counter is incremented when a redundant path different to the one described before in pn1_h4_counter. There is a different counter for every port number selected in the first hop in the base path together with the current selected port number in the second hop and the current redundant path number. This counter takes into account two port numbers for the first hop in the base path and second hop in the current path that can be in different switches in contrast to other counters. Also it takes into account the redundant path number. As such, the above step is useful for regular fat-trees.

If the response to the query in step 1631 is affirmative, the process continues to step 1633 wherein the value of the counter is incremented by one. However, if the response to the query is negative, the process continues to step 1635.

Further, the process in step 1635 makes a query to determine whether the following condition is valid: (path_number==1 AND hop==0) OR (path_number==2 AND hop==0 AND src_dst_4hop). If the response to the query is affirmative, the process continues to step 1637 wherein the computed best port is assigned to the parameter hp_hop_0r (i.e., the parameter corresponding to the port selected in hop zero for the first full redundant path). However, if the response to the query in step 1635 is negative, the process continues to step 1639.

In step 1639, a further query is performed to determine if the following condition is valid: path_number==0 AND hop==0 AND hca_found (i.e. a Boolean parameter indicating that a the current switch has a host channel adapter attached, in other words, that the switch is a bottom switch). If the response to the query is affirmative, the process continues to step 1641, wherein the computed best port is assigned to the parameter bp_hop_0b (i.e., the output port that is taken by a base path in a bottom level switch). However, if the response to the query is negative, the process continues to step 1643.

Figure 16C:
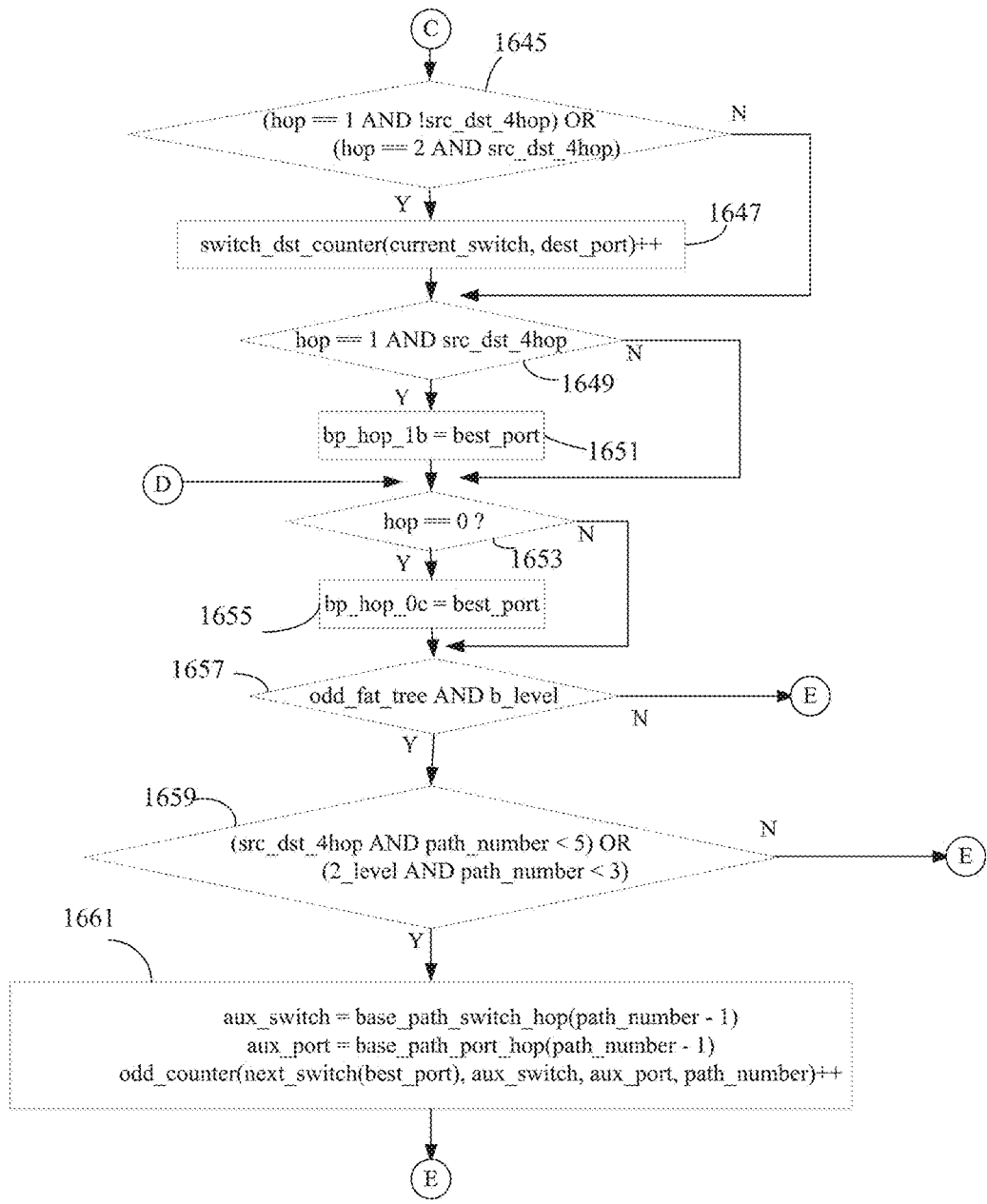

In step 1643, another query is performed to determine whether the condition: path_number==0 AND (hop==1 OR hop==2) AND b_level (i.e., the current switch being a bottom level switch) is valid. If the response to the query is affirmative, the process continues to step 1645 (FIG. 16C). However, if the response to the query is negative, the process continues to step 1653 as shown in FIG. 16C.

In step 1645 another query is made to determine whether the condition (hop==1 AND !src_dst_4hop) OR (hop==2 AND src_dst_4hop) is valid. If the response to the query is affirmative, the process continues to step 1647, else the process continues to step 1649. In step 1647 the value of the counter switch_dst_counter is incremented by one.

In step 1649, the process performs a further query to determine whether the parameter hop is equal to one and the source-destination nodes are different subgroups. If the response to the query is affirmative, the process continues to step 1651, wherein the computed best_port is assigned to the parameter bp_hop_1b. However, if the response to the query is negative, the process continues to step 1653, wherein a further query is made to determine whether the parameter hop is equal to zero.

Figure 16D:
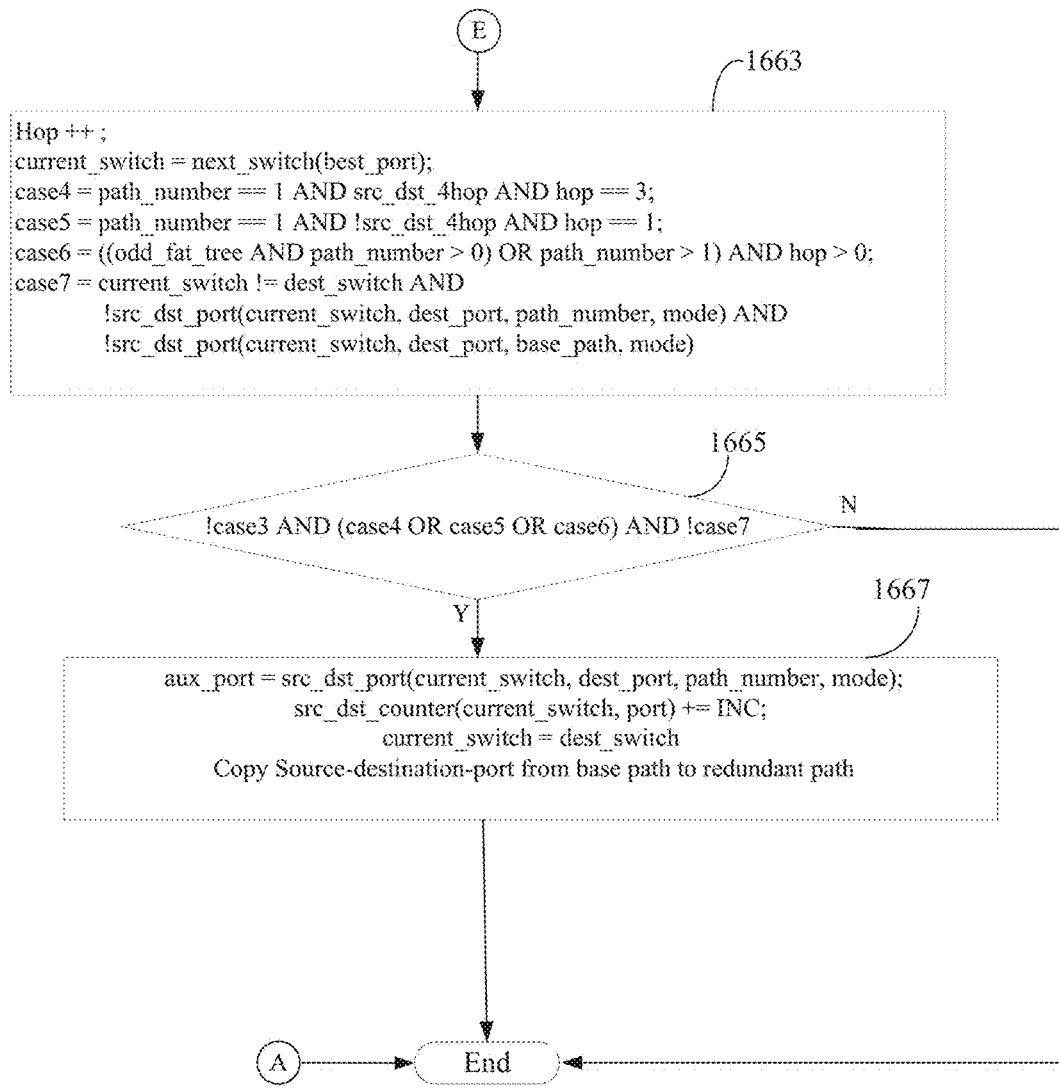

If the response to the query in step 1653 is affirmative, the process continues to step 1655, wherein the computed best_port is assigned to parameter bp_hop_0c (i.e., the port selected in hop zero for the current redundant path). However, if the response to the query in step 1653 is negative, the process continues to step 1657 wherein the process performs a further query to determine whether the input tree is an odd fat tree and the switch under consideration is a bottom level switch. If the response to the query of step 1657 is affirmative, the process continues to step 1659, else if the response to the query is negative, the process continues to step 1663 (as shown in FIG. 16D).

In step 1659, a further query is performed to determine whether the condition: (src_dst_4hop AND path_number<5) OR (2_level AND path_number<3) is valid. If the response to the query is affirmative, the process continues to step 1661, wherein the switch and port traversed by the base path during hop number path_number−1 are retrieved. Furthermore, odd_counter is incremented by one. It must be appreciated that odd_counter is used by one embodiment for odd fat-trees and is incremented taking into account the next switch through the current best_port, the current redundant path number, the switch selected in the base path for the hop number path_number−1 and the port selected for the same hop. For example, if current path_number is 1, the switch and port taken into account in the base path are for the first hop (bottom level). If the current path is 2, then the switch and port taken into account in the base path are for the second hop (middle level in a 3-level fat tree). Note that the first hop is referred to herein as hop 0, and second hop as hop 1 and so on.

Further, the process in step 1663 increments the hop number by one for the next iteration, and updates the current switch as the next switch that is reached using the best port. Moreover, the values for Boolean parameters case4, case5, case6, and case7 are determined to be one of TRUE and FALSE, based on at least the path number, hop, the source-destination being in different subgroups, and the mode of operation.

Further, the process continues to step 1665, wherein a query is made to determine whether the following condition is valid: (case3==FALSE) AND (case4==TRUE OR case5==TRUE OR case6==TRUE) AND case7==FALSE. If the response to query is negative, the process continues in FIG. 16D and terminates. However, if the response to the query is affirmative, the process continues to step 1667 wherein the src_dst_counter is updated, and the source-destination port from the base path is copied to the redundant path, after which the process terminates.

Figure 17A:
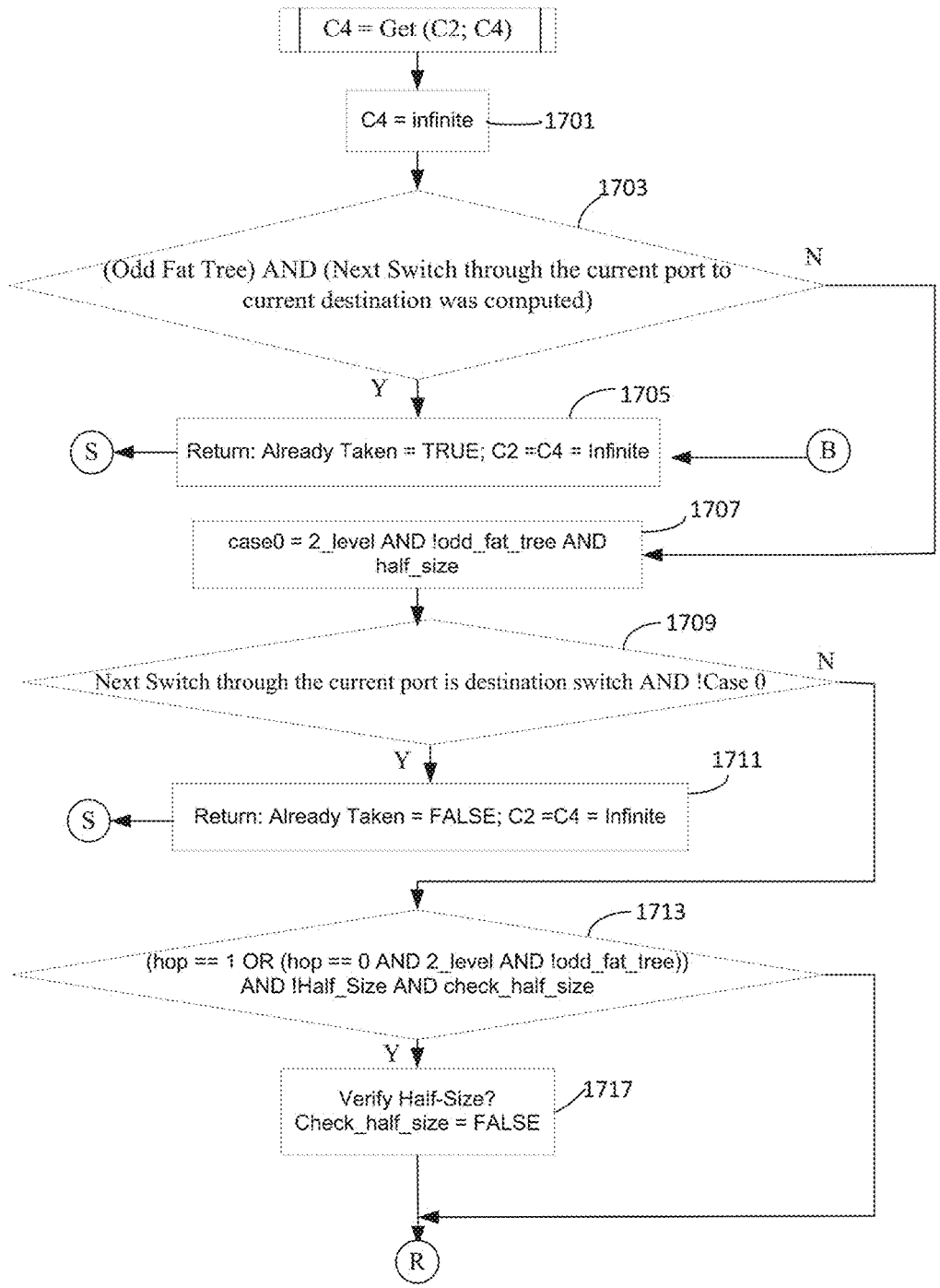
FIGS. 17A and 17B depict a flowchart illustrating the steps performed in executing a function that is performed to obtain counters of a switch.
Figure 17B:
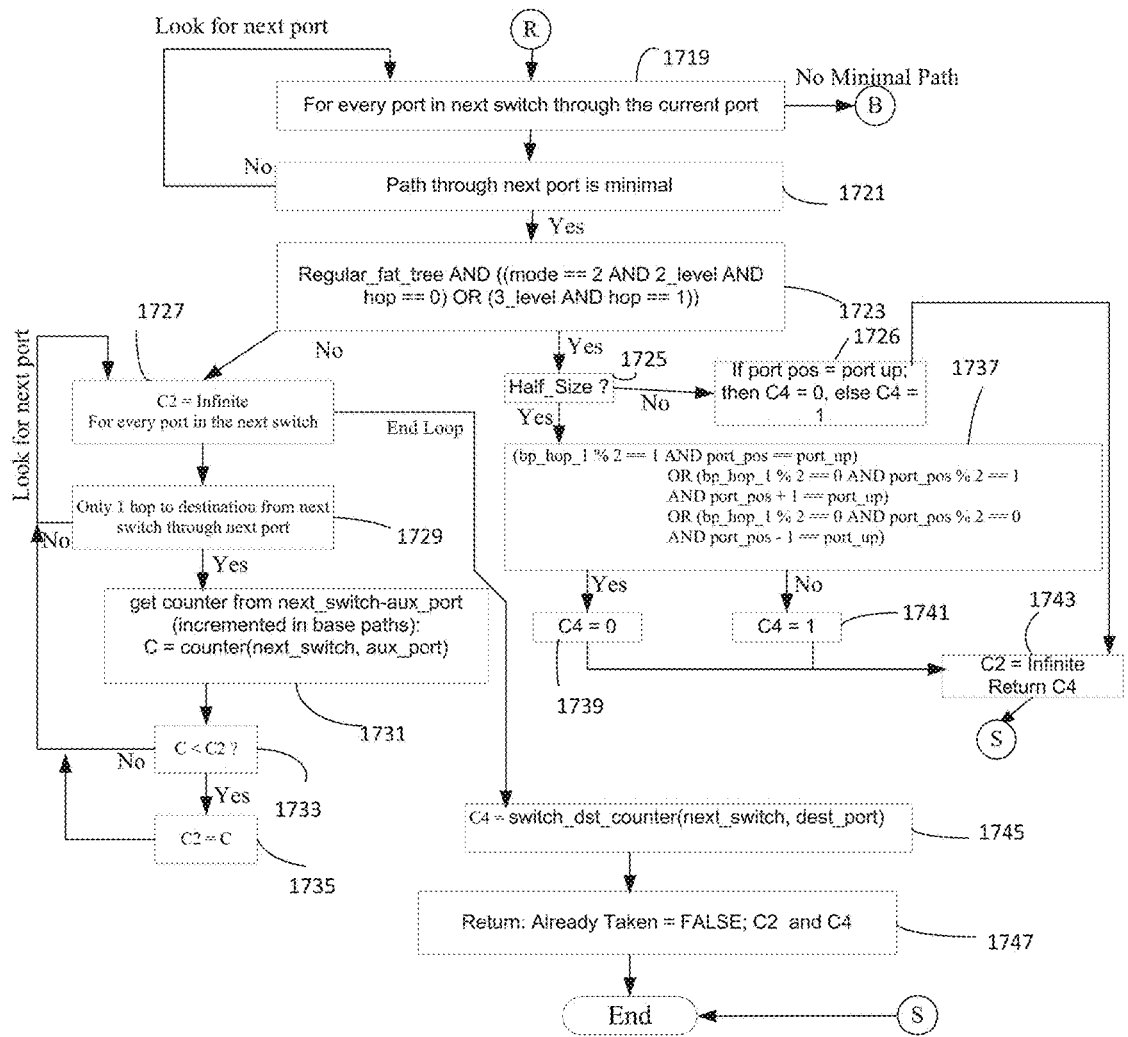

Turning now to FIGS. 17A and 17B, there is depicted a flowchart illustrating the steps performed in executing a function that is performed to obtain counters of a switch. Specifically, the flowchart of FIGS. 17A and 17B depict a flowchart illustrating the steps performed to obtain value of c2 and c4 counters of a switch. Note that the function Get that carries out these steps is called in step 1510 (depicted in FIG. 15A).

The process begins in step 1701, wherein the value of counter c4 is initialized to infinity.

Further, in step 1703, a query is made to determine whether the input tree is an Odd fat tree, and whether the next switch through the current port to the destination was previously computed. If the response to the query is affirmative, the process continues to step 1705. If the response to the query is negative, the process continues to step 1707.

In step 1705, the process returns the values of counters c2 and c4 as infinite, and further returns a true value (i.e., a value of 1, or TRUE) for the parameter already_taken. Note that the parameter already_taken corresponds to the scenario that the next switch through the current port was previously computed. Upon returning the values of counters c2 and c4 in step 1705, the process terminates (as shown by connector 'S').

When the response to the query in step 1703 is negative, the process in step 1707 assigns a Boolean value for the parameter case0 based on a number of levels in the input tree, whether the input tree topology is not an odd fat tree and whether the input tree is a half-size tree.

Further, in step 1709, a query is made to determine whether the next switch through the current port is the destination switch and whether the parameter case0 is FALSE. If the response to the query in step 1709 is negative, the process continues to step 1713. However, if the response to the query is affirmative, the process continues to step 1711, wherein the parameter already_taken is assigned as FALSE, and the counters c2 and c4 are assigned a value of infinity. Thereafter, the process of FIG. 17A terminates.

In step 1713, a query is made to determine whether the following condition is valid: (hop==1 OR (hop==0 AND 2_level AND !odd_fat_tree)) AND !Half_Size AND check_half_size. If the response to the query in step 1713 is negative, the process continues to step 1719. If the response to the query is affirmative, the process continues to step 1717.

Further, in step 1717, a query is made to determine whether the input tree is a half-size tree. If the input tree is a half size tree, a Boolean parameter check_half_size is assigned FALSE.

The process further proceeds to step 1719 (as shown in FIG. 17B), wherein for every port in the next switch through the current port under consideration, the process determines whether the path through the next port is minimal (step 1721).

If the response to the query in step 1721 is negative, the process loops back to step 1719 and performs the verification process for the next port. Upon performing the verification process for all ports, if it is determined that no minimal path exists, the process loops back to step 1705 (FIG. 17A).

However, if it is determined that the path through a port is minimal, then the process continues to step 1723, wherein a query is made to determine whether the following condition is valid: regular_fat_tree AND ((mode==2 AND 2_level AND hop==0) OR (3_level AND hop==1)). If the response to the query is affirmative, the process continues to step 1725. However, if the response to the query is negative the process continues to step 1727.

In step 1727 counter c2 is initialized to infinity, and every port in the next switch is analyzed to determine whether it is one hop away from the destination switch (step 1729).

If the response to the query in step 1729 is negative, the process loops back to step 1727 to analyze the next port of the switch. However, if the response to the query in step 1729 is affirmative, the process continues to step 1731, wherein a parameter C is assigned the value of counter: counter(next_switch, auxiliary_port).

Further, the process continues to step 1733, wherein a query is made to determine whether the value of the parameter C is less that the value of value of counter c2. If the response to the query is negative, the process loops back to step 1727. However, if the response to the query in step 1733 is affirmative, the process continues to step 1735, wherein the counter c2 is assigned the value of the parameter C. Thereafter, the process loops back to step 1727.

In this manner, in step 1727, upon analyzing all the ports of the switch, the process continues to step 1745, wherein the value of counter c4 is assigned based on the switch_dst_counter (as described previously with reference to FIG. 10) of the next switch. Thereafter, the process proceeds to step 1747, wherein the parameter already_taken is assigned FALSE, and the respective values of counters c2 and c4 are returned. Upon returning the values of counters c2 and c4, the process terminates.

If the response to the query in step 1723 is affirmative, the process continues to step 1725, wherein a query is made to determine whether the input tree is half-size. If the response to the query is negative, the process continues to step 1726, wherein the counter c4 is assigned a value of 0 based on a parameter port_pos (i.e., port position) being equal to the port_up parameter, else the value of counter c4 is assigned as one. Thereafter, the process continues to step 1743, wherein the counter c2 is assigned a value of infinity, and the respective values of counters c2 and c4 are returned.

If the response to the query in step 1725 is affirmative, the process continues to step 1737, wherein the process determines whether the following condition is valid: (bp_hop_1% 2==1 AND port_pos==port_up) OR (bp_hop_1% 2==0 AND port_pos % 2==1 AND port_pos+1==port_up) OR (bp_hop_1% 2==0 AND port_pos % 2==0 AND port_pos−1==port_up).

If the above condition is valid (i.e., true), the process continues to step 1739, wherein the value of counter c4 is assigned as 0. In contrast, if the condition is not valid (i.e., false), the process continues to step 1741, wherein the value of the counter c4 is assigned as 1.

Thereafter the process continues to step 1743, wherein the value of counter c2 is assigned as infinity, whereafter the process returns the values of counters c2 and c4, and then terminates.

Figure 18:
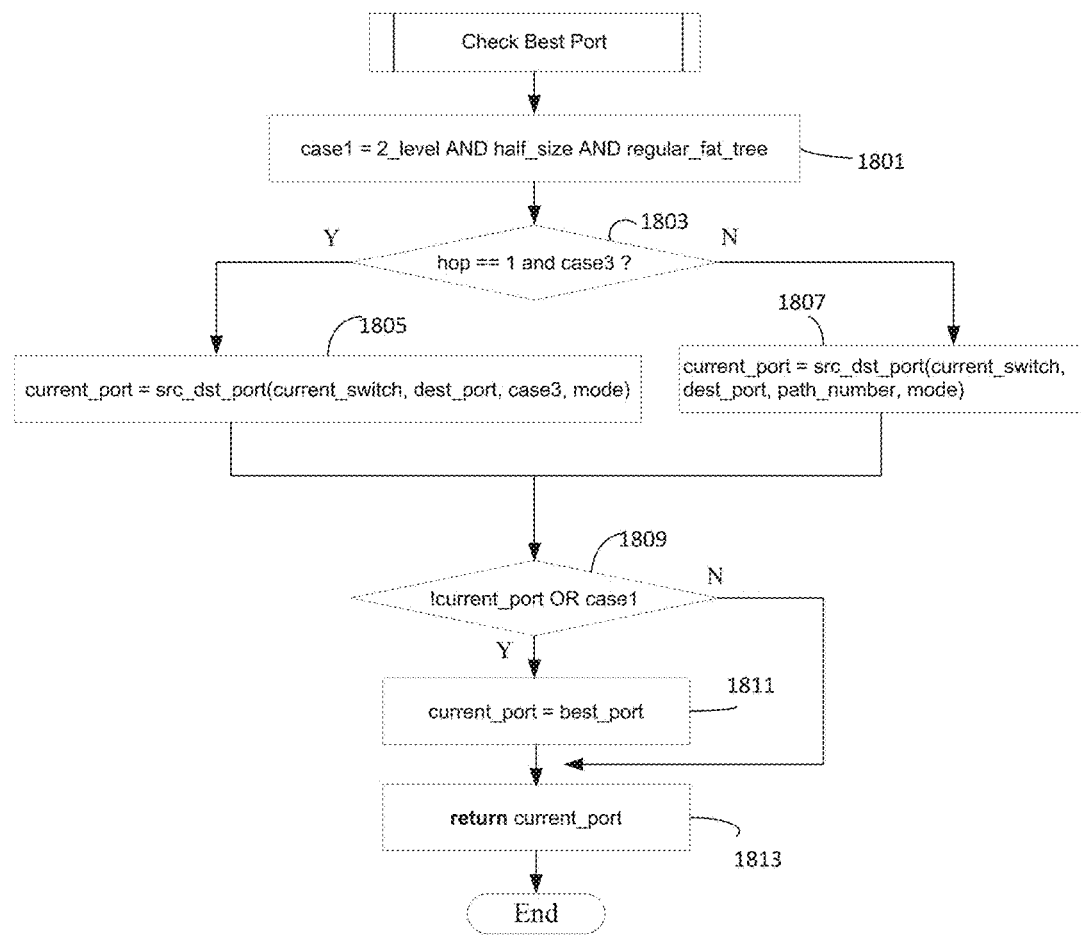
FIG. 18 depicts a flowchart illustrating the steps performed in determining whether a current port of a switch is an optimal port.

FIG. 18 depicts a flowchart illustrating the steps performed in determining whether a current port of a switch is an optimal port (i.e. best port).

The process commences in step 1801 wherein, case1 is assigned TRUE if the input tree topology is two level AND half size AND the topology is a regular fat tree.

Further, in step 1803, a query is made to determine whether hop is equal to one and case3 is TRUE. Note that for case3, there is a stored port if any redundant path from the current switch to the destination port was computed previously. Therefore, the path number is not taking into account when case3==TRUE. If the response to the query in step 1803 is affirmative, the process continues to step 1805 wherein current port is set as: src_dst_port(current_switch, dest_port, case3, mode).

However, if the response to the query in step 1803 is negative, the process in step 1807 sets the value of the current port as: src_dst_port(current_switch, dst_port, path_number, mode).

Further, the process continues to step 1809, wherein a query is made to determine whether no current port is stored OR case1 is TRUE.

If the response to the query is affirmative, the process continues to step 1811, else the process continues to step 1813.

In step 1811 the best port is stored as the current port, whereafter in step 1813, the current port is returned to the function that initiated a call to the check best port function of FIG. 18, whereafter the process of FIG. 18 terminates.

Figure 19:
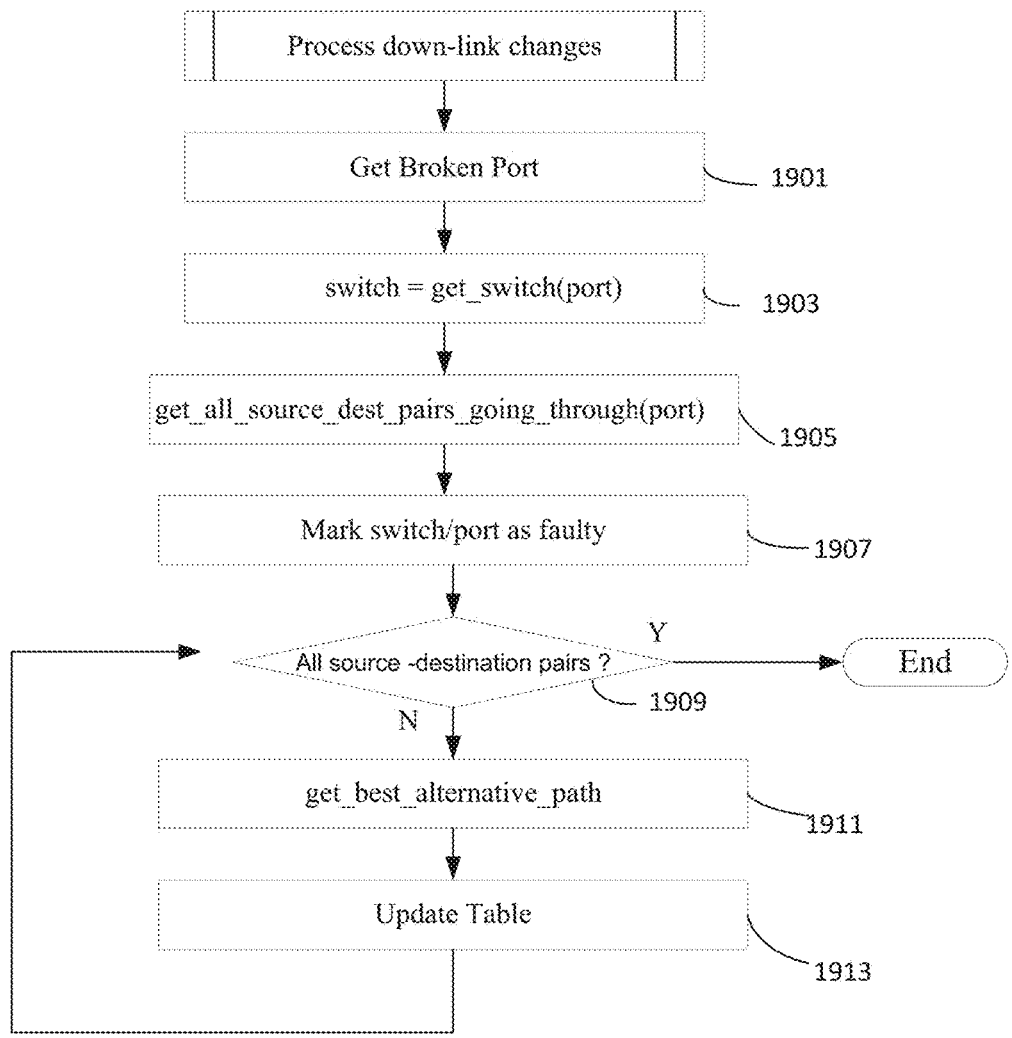
FIG. 19 depicts a flowchart illustrating the steps performed in processing down-link changes in the input network.

FIG. 19 depicts a flowchart illustrating the steps performed in processing down-link (i.e., a failed link or port) changes in the input network.

The process commences in step 1901, wherein a faulty port (also referred to herein as a broken port) is identified. Further, the process in step 1903 determines the switch which includes the faulty port.

In step 1905, all source-destination pairs that utilize the faulty port are determined, and the corresponding switch identified as the switch which includes the faulty port is marked as a faulty switch (step 1907).

Further, the process continues to step 1909, wherein a query is made to determine if all the source-destination pairs that utilize the faulty port (determined in step 1905) are processed. If the response to the query is affirmative, the process terminates. However, if the response to the query in step 1909 is negative, the process continues to step 1911, wherein for the source-destination pair that is under consideration (and that which uses the faulty port), an alternate path (e.g., lowest number of hops redundant path) is assigned as the base path for the source-destination pair. It must be appreciated that the alternate path does not utilize the faulty port of the switch.

The process then continues to step 1913, wherein for the source-destination pair under consideration, the base path is updated to reflect the alternate path. Accordingly, a route corresponding to the source-destination pair is updated in the forwarding table of the switches. Thereafter, the process loops back to step 1909 to determine if all source-destination pairs that utilize the failed port have been processed.

Figure 20:
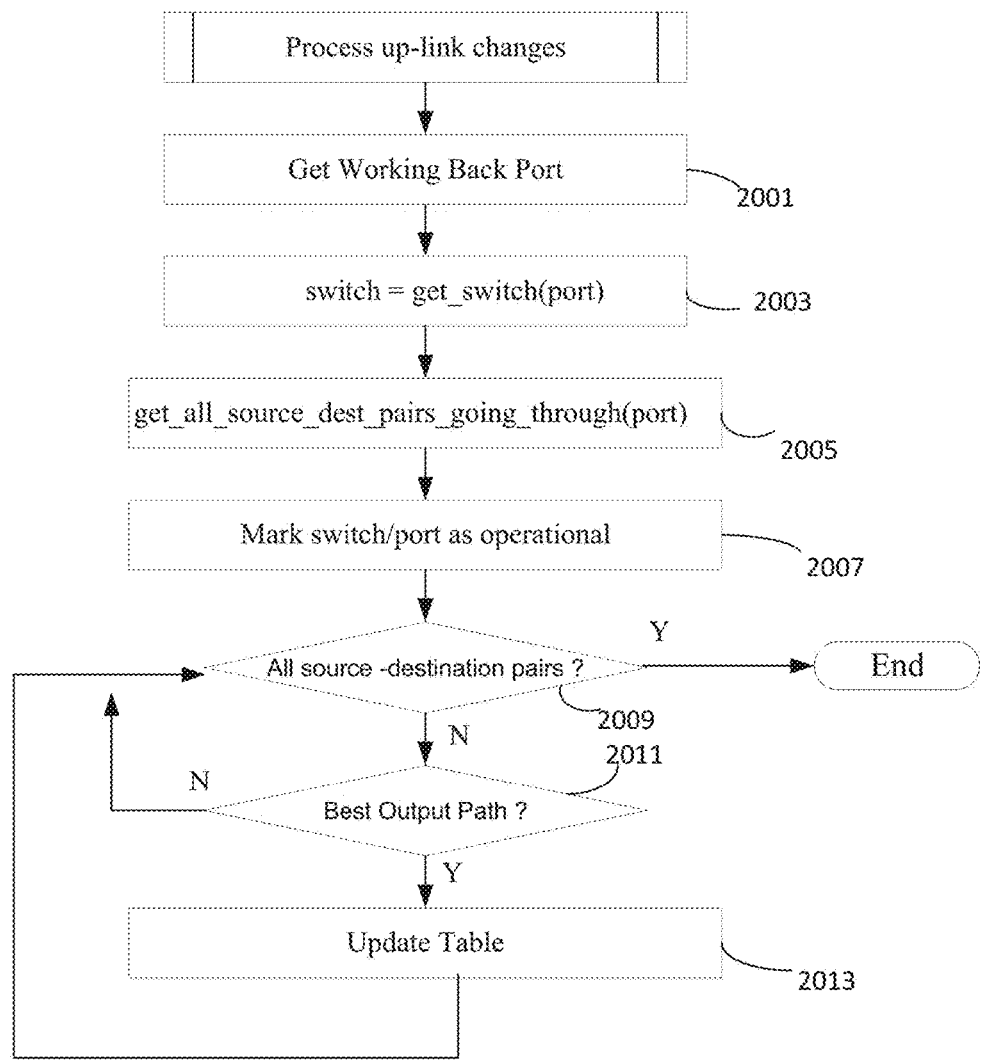
FIG. 20 depicts a flowchart illustrating the steps performed in processing up-link changes in the input network.

FIG. 20 depicts a flowchart illustrating the steps performed in processing up-link changes in the input network. Specifically, FIG. 20 depicts a flowchart depicting the steps performed, for example, when a faulty port has been restored i.e., the faulty port becomes operational.

The process begins in step 2001 wherein the restored port is obtained. Further, in step 2003 the switch to which the restored port belongs to is identified.

Further, the process in step 2005 determines all the source-destination pairs that initially (i.e., before the occurrence of the fault) utilized the restored port in routing of a base path from the source to the destination. In step 2007, the process marks the port and the corresponding switch as operational.

In step 2009, a query is made to determine whether all source-destination pairs utilizing the current switch/restored port have been processed. If the response to the query is affirmative, the process terminates. However, if the response to the query is negative, the process continues to step 2011.

In step 2011, for each of the source-destination pairs, a query is made to determine whether the best output path from the source to the destination can utilize the restored port. If the response to the query is affirmative, the process continues to step 2013, else the process loops back to step 2009.

In step 2013, the restored port is assigned as a port to be used to route a path (e.g., a base path) from the source to the destination. Specifically, by one embodiment, the forwarding tables can be updated to reflect the change in the assigned port to be used for the given source-destination pair. Thereafter, the process loops back to step 2009 to determine if all source-destination pairs that can potentially utilize the newly restored port have been processed.

Figure 21:
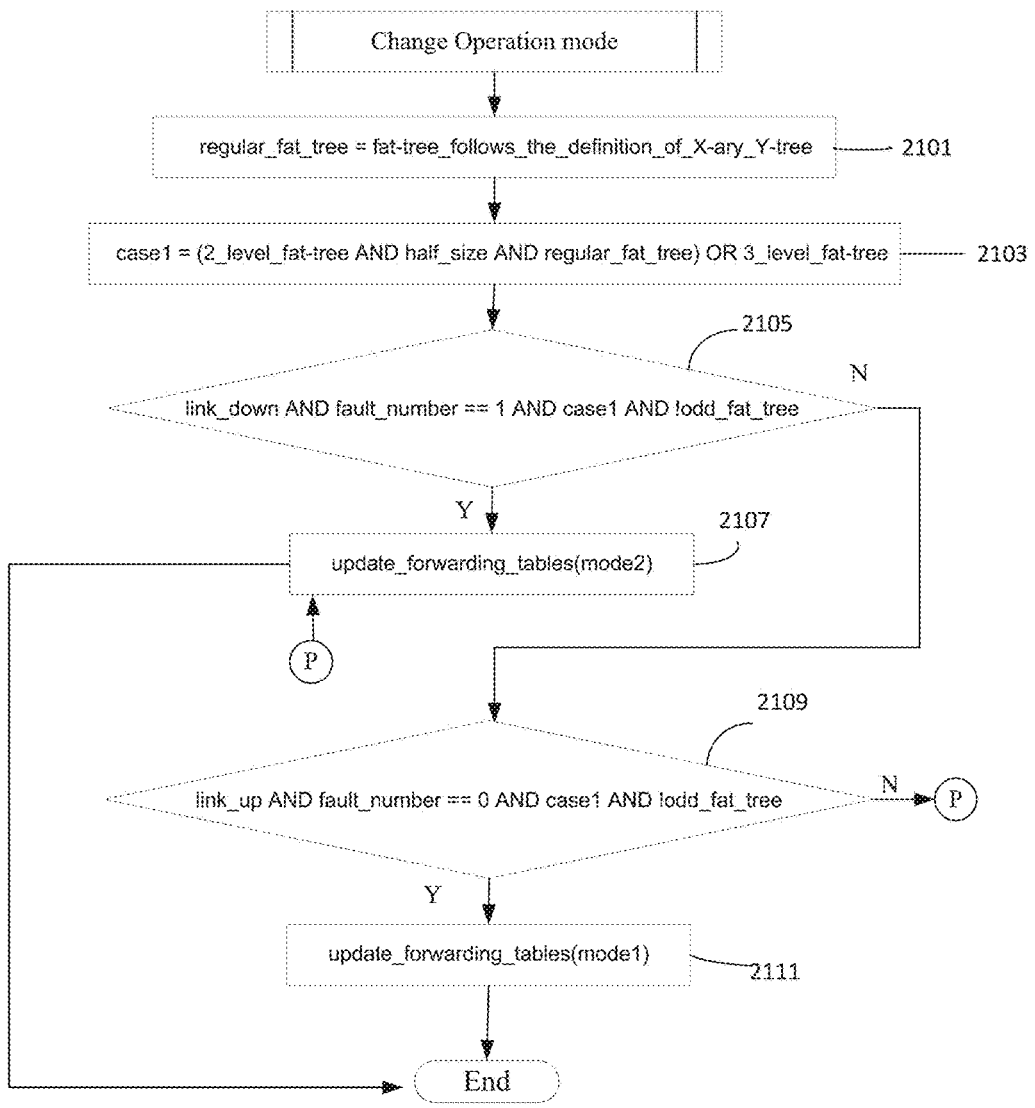
FIG. 21 illustrates an exemplary flowchart depicting the steps performed in changing a mode of operation of the network.

Turning now to FIG. 21 is depicted an exemplary flowchart depicting the steps performed in changing a mode of operation of the network. By one embodiment of the present disclosure, the mode of operation of the network is dependent on a number of levels on the input tree topology, and a type of the input tree topology.

By one embodiment, when the input tree topology is a 2-level fat tree that is both regular and half-size, the mode of operation is both mode 1 and mode 2 as described below. In a similar manner, when the input tree is a 3-level fat tree that is not an Odd fat tree, the mode of operation is both mode 1 and mode 2. In contrast, when the input tree is either a 2-level or a 3-level fat tree that is an Odd fat tree, the mode of operation is only mode 2.

Specifically, by one embodiment of the present disclosure, some topologies have two operational modes with different routing: mode 1, wherein no faults are present in the network; and mode 2, wherein faults are present in the network. In mode 1 of operation, a base path is computed for a given source-destination pair, whereas in mode 2 of operation, another base path and redundant paths are computed for that source-destination pair. The purpose of transitioning from one mode to another mode is to replace the working base paths (for certain types of tree topologies) in the occurrence of faults.

Turning now to FIG. 21, the process commences in step 2101 wherein the input tree is determined to be a regular fat tree if the input tree follows the definition of X-ary Y-tree.

Further, in step 2103, parameter case1 is assigned a value of TRUE, based on the input tree being either a 2-level tree, which is half-size and regular, or the input tree being a 3-level fat tree.

Further, the process continues to step 2105, wherein a query is made to determine whether the occurrence of a fault is a first fault instance (i.e., fault_number is one), parameter case1 is TRUE, and the input tree is not an odd fat tree. If the response to the query is affirmative, the process continues to step 2107, whereas if the response to the query is negative, the process continues to step 2109.

In step 2107, the LFTs are updated in mode2 (i.e., the mode of operation of the network is mode 2), whereafter the process of FIG. 21 terminates. However, if the response to the query in step 2105 is negative, the process in step 2109 performs another query to determine whether the network has completely recovered of all faults and there are no more faults in the network, the value of parameter case1 is TRUE, and the input tree topology is not an odd fat tree.

If the response to the query in step 2109 is affirmative, the process continues to step 2111, wherein the LFTs are updated in mode1 of operation. Upon updating the routing paths, the process of FIG. 21 terminates. However, if the response to the query is negative the process loops back to step 2107 to operate in the second mode.

Each of the functions of the described embodiments may be implemented by one or more processing circuits. A processing circuit includes a programmed processor (for example, processor 2203 in FIG. 22), as a processor includes circuitry. A processing circuit also includes devices such as an application-specific integrated circuit (ASIC) and circuit components that are arranged to perform the recited functions.

Figure 22:
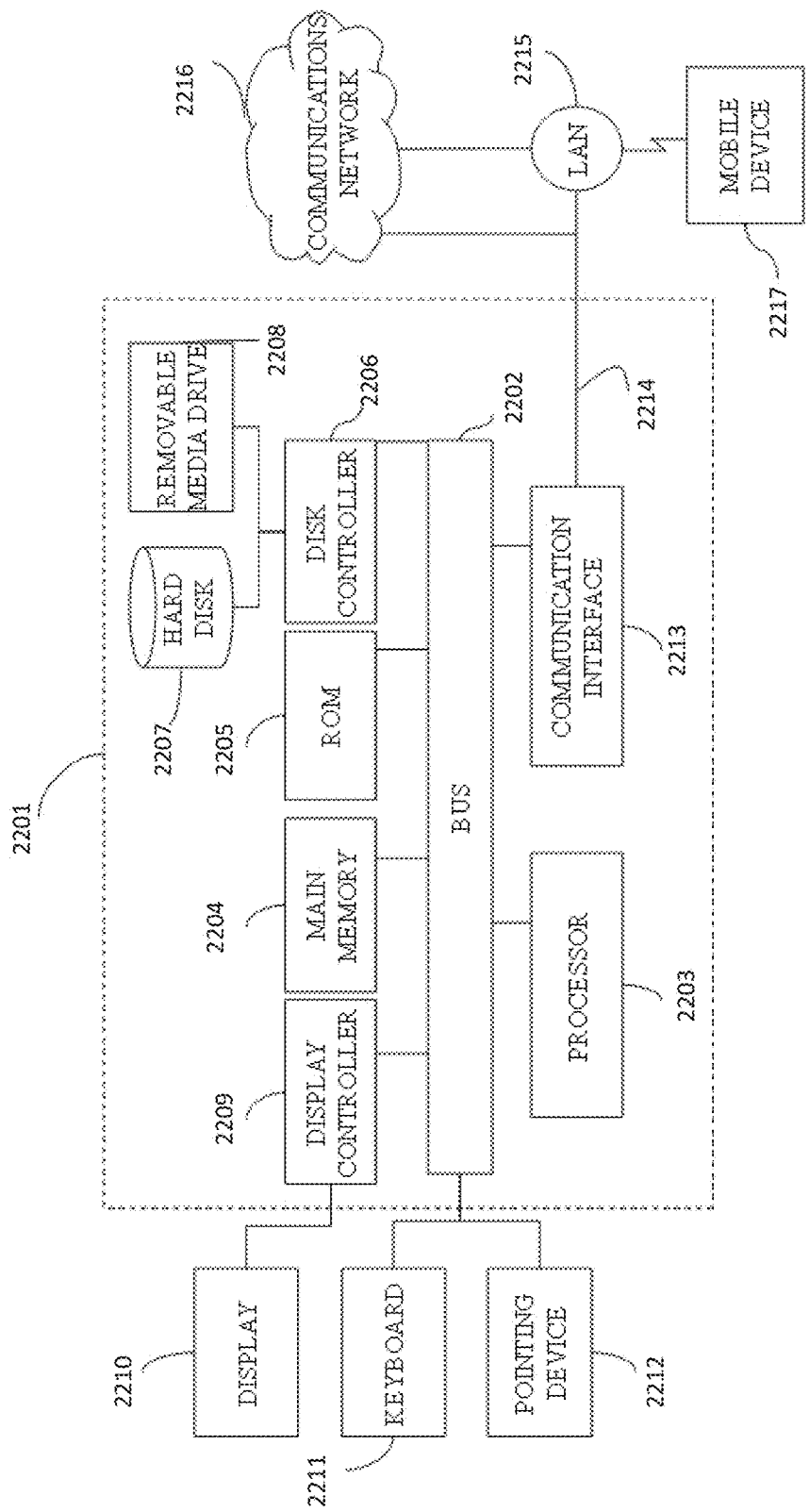
FIG. 22 illustrates according to one embodiment, an exemplary computing device.

The various features discussed above may be implemented by a fabric-controller i.e., a computer system or programmable logic. FIG. 22 illustrates such a computer system 2201. In one embodiment, the computer system 2201 is a particular, special-purpose machine when the processor 2203 is programmed to compute balanced routing paths for fat-tree network topologies.

The computer system 2201 includes a disk controller 2206 coupled to the bus 2202 to control one or more storage devices for storing information and instructions, such as a magnetic hard disk 2207, and a removable media drive 2208 (e.g., floppy disk drive, read-only compact disc drive, read/write compact disc drive, compact disc jukebox, tape drive, and removable magneto-optical drive). The storage devices may be added to the computer system 2201 using an appropriate device interface (e.g., small computer system interface (SCSI), integrated device electronics (IDE), enhanced-IDE (E-IDE), direct memory access (DMA), or ultra-DMA).

The computer system 2201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 2201 may also include a display controller 2209 coupled to the bus 2202 to control a display 2210, for displaying information to a computer user. The computer system includes input devices, such as a keyboard 2211 and a pointing device 2212, for interacting with a computer user and providing information to the processor 2203. The pointing device 2212, for example, may be a mouse, a trackball, a finger for a touch screen sensor, or a pointing stick for communicating direction information and command selections to the processor 2203 and for controlling cursor movement on the display 2210.

The processor 2203 executes one or more sequences of one or more instructions contained in a memory, such as the main memory 2204. Such instructions may be read into the main memory 2204 from another computer readable medium, such as a hard disk 2207 or a removable media drive 2208. One or more processors in a multi-processing arrangement may also be employed to execute the sequences of instructions contained in main memory 2204. In alternative embodiments, hard-wired circuitry may be used in place of or in combination with software instructions. Thus, embodiments are not limited to any specific combination of hardware circuitry and software.

As stated above, the computer system 2201 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 2201, for driving a device or devices for implementing the features of the present disclosure, and for enabling the computer system 2201 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the present disclosure.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 2203 for execution. A computer readable medium may take many forms, including but not limited to, non-volatile media or volatile media. Non-volatile media includes, for example, optical, magnetic disks, and magneto-optical disks, such as the hard disk 2207 or the removable media drive 2208. Volatile media includes dynamic memory, such as the main memory 2204. Transmission media, on the contrary, includes coaxial cables, copper wire and fiber optics, including the wires that make up the bus 2202. Transmission media also may also take the form of acoustic or light waves, such as those generated during radio wave and infrared data communications.

Various forms of computer readable media may be involved in carrying out one or more sequences of one or more instructions to processor 2203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 2201 may receive the data on the telephone line and place the data on the bus 2202. The bus 2202 carries the data to the main memory 2204, from which the processor 2203 retrieves and executes the instructions. The instructions received by the main memory 2204 may optionally be stored on storage device 2207 or 2208 either before or after execution by processor 2203.

The computer system 2201 also includes a communication interface 2213 coupled to the bus 2202. The communication interface 2213 provides a two-way data communication coupling to a network link 2214 that is connected to, for example, a local area network (LAN) 2215, or to another communications network 2216 such as an InfiniBand network, Omni-Path network, or the Internet. For example, the communication interface 2213 may be a network interface card to attach to any packet switched LAN. As another example, the communication interface 2213 may be a host channel adapter (HCA) card. Wireless links may also be implemented. In any such implementation, the communication interface 2213 sends and receives electrical, electromagnetic or optical signals that carry digital data streams representing various types of information.

The network link 2214 typically provides data communication through one or more networks to other data devices. For example, the network link 2214 may provide a connection to another computer through a local network 2215 (e.g., a LAN) or through equipment operated by a service provider, which provides communication services through a communications network 2216. The local network 2214 and the communications network 2216 use, for example, electrical, electromagnetic, or optical signals that carry digital data streams, and the associated physical layer (e.g., CAT 5 cable, CAT 6 cable, coaxial cable, optical fiber, etc.). The signals through the various networks and the signals on the network link 2214 and through the communication interface 2213, which carry the digital data to and from the computer system 2201 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 2201 can transmit and receive data, including program code, through the network(s) 2215 and 2216, the network link 2214 and the communication interface 2213. Moreover, the network link 2214 may provide a connection through a LAN 2215 to a mobile device 2217 such as a tablet, personal digital assistant (PDA), laptop computer, or cellular telephone.

What is claimed is:

1. A method of providing balanced routing paths in a computational grid, comprising:
   determining a type of topology of the computational grid, the computational grid having a plurality of levels, wherein each level includes a plurality of switches;
   determining whether the type of topology of the computational grid is a fat-tree;
   upon determining that the topology is a fat-tree:
      determining whether the fat-tree is odd;
      upon determining that the fat-tree is not odd, determining whether the fat-tree is a regular fat-tree;
      computing a first set of routing paths for the computational grid based on the determining of whether the fat-tree is odd and whether the fat-tree is a regular fat-tree;
   upon determining that the topology is not a fat-tree:
      computing a second set of routing paths for the computational grid using a topology agnostic routing technique; and
   configuring forwarding tables in said switches with the first set of computed routing paths when the topology is determined to be a fat-tree and with the second set of computed routing paths when the topology is determined to not be a fat-tree.

2. The method according to claim 1, wherein computing a first set of routing paths comprises:
   initializing a set of port allocation counters for each switch port of the computational grid;
   selecting a source switch and a destination switch from the computational grid;
   selecting a path identifier representing a path to be computed from the source switch to the destination switch;
   selecting a preferred port in each hop of the path based on prioritization rules and the port allocation counters;
   updating the port allocation counters, and continuing the selecting of source switch, destination switch, path identifier and preferred port until each of the destination switches is reachable from the selected source switch via multiple redundant routing paths.

3. The method according to claim 2, further comprising:
   detecting a topology-changing event in the computational grid;
   identifying switch ports that are negatively affected by the topology-changing event;
   marking the negatively affected switch ports as faulty in the first set of routing paths;
   selecting, for the negatively affected switch ports, alternative routing paths from the multiple redundant routing paths that circumvent the faulty switch ports;
   updating forwarding tables in the switches with the alternative routing paths;
   waiting for further topology-changing events in the computational grid.

4. The method according to claim 3, further comprising:
   identifying switch ports that are positively affected by the topology-changing event;
   marking the positively affected switch ports as operational in the first set of routing paths;
   determining whether routing paths that contain the positively affected switch ports are better than other routing paths among the multiple redundant routing paths, and upon positive such determining, marking the better output ports as preferred output ports and updating the forwarding tables in the switches with the preferred output ports.

5. The method according to claim 2, wherein the selecting the preferred port further comprises:
   selecting a starting port number before selecting the preferred port;
   selecting the preferred port in each hop of the path based on the starting port number.

6. The method according to claim 2, wherein the selecting the preferred port in each hop of the path further comprises:
   calculating the preferred port in each hop of the path before selection of the preferred port in each hop of the path.

7. The method according to claim 6, wherein the calculating the preferred port in each hop of the path further comprises:
determining a routing rule to be applied to determine the preferred port in each hop of the path; and
applying a port prioritization based on applying the routing rule.

8. The method according to claim 6,
wherein the selecting the preferred port in each hop of the path further comprises:
checking whether a port was previously determined for a particular destination and replacing the calculated preferred port with the previously determined port when the checking determines that the port was previously determined and the topology is not a regular half size two-level fat-tree.

9. The method according to claim 7, wherein determining a routing rule to be applied to determine the preferred port in each hop of the path further comprises:
determining a type of rule to be applied based on a path number, a type of the fat-tree, a hop number, and a number of hops to reach a destination.

10. The method according to claim 9, wherein when the path number is zero or when the switch under consideration is a non-bottom level switch, a first type of rule is determined to be applied.

11. The method according to claim 10, wherein when the fat-tree is odd and the path number is greater than zero and less than five and at least one additional condition is met, a second type of rule is determined to be applied.

12. The method according to claim 11, when the first and second types of rule are not determined to be applied, the source and destination switches of the path belong to different sub-groups and the path number is one, a third type of rule is determined to be applied.

13. The method according to claim 12, when the first, second and third types of rule are not determined to be applied, a fourth type of rule is determined to be applied.

14. The method according to claim 10, wherein the first type of rule includes setting a counter to a value which is computed based on a predetermined function that is performed to obtain counters of a respective switch.

15. The method according to claim 2, further comprising:
performing a change in an operation mode of the computational grid, wherein the operation mode includes a first mode corresponding to no faults in the computational grid and a second mode corresponding to faults in the computational grid.

16. The method according to claim 1, wherein the topology agnostic routing technique is MROOTS.

17. A device for providing balanced routing paths in a computational grid, comprising:
processing circuitry configured to
determine a type of topology of the computational grid, the computational grid having a plurality of levels, wherein each level includes a plurality of switches,
determine whether the type of topology of the computational grid is a fat-tree,
determine whether the fat-tree is odd, upon determining that the topology is a fat-tree,
determine whether the fat-tree is a regular fat-tree, upon determining that the fat-tree is not odd,
compute a first set of routing paths for the computational grid based on the determination of whether the fat-tree is odd and whether the fat-tree is a regular fat-tree,
compute a second set of routing paths for the computational grid using a topology agnostic routing technique, upon determining that the topology is not a fat-tree, and
configure forwarding tables in said switches with the first set of computed routing paths when the topology is determined to be a fat-tree and with the second set of computed routing paths when the topology is determined to not be a fat-tree.

18. A non-transitory computer readable medium having stored thereon a program that when executed by a computer causes the computer to implement a method of providing balanced routing paths in a computational grid, comprising:
determining a type of topology of the computational grid, the computational grid having a plurality of levels, wherein each level includes a plurality of switches;
determining whether the type of topology of the computational grid is a fat-tree;
upon determining that the topology is a fat-tree:
determining whether the fat-tree is odd;
upon determining that the fat-tree is not odd, determining whether the fat-tree is a regular fat-tree;
computing a first set of routing paths for the computational grid based on the determining of whether the fat-tree is odd and whether the fat-tree is a regular fat-tree;
upon determining that the topology is not a fat-tree:
computing a second set of routing paths for the computational grid using a topology agnostic routing technique; and
configuring forwarding tables in said switches with the first set of computed routing paths when the topology is determined to be a fat-tree and with the second set of computed routing paths when the topology is determined to not be a fat-tree.

* * * * *